United States Patent
Ogawa et al.

(10) Patent No.: US 9,951,275 B2
(45) Date of Patent: *Apr. 24, 2018

(54) LIQUID CRYSTAL DISPLAY DEVICE

(71) Applicant: DIC CORPORATION, Tokyo (JP)

(72) Inventors: Shinji Ogawa, Kita-adachi-gun (JP); Yoshinori Iwashita, Kita-adachi-gun (JP); Junichiro Koike, Sakura (JP); Hiroshi Maki, Sakura (JP); Masami Shishikura, Sakura (JP); Ryosuke Asami, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/771,737

(22) PCT Filed: Mar. 12, 2014

(86) PCT No.: PCT/JP2014/056465
§ 371 (c)(1),
(2) Date: Aug. 31, 2015

(87) PCT Pub. No.: WO2015/045441
PCT Pub. Date: Apr. 2, 2015

(65) Prior Publication Data
US 2016/0009997 A1    Jan. 14, 2016

(30) Foreign Application Priority Data
Sep. 24, 2013   (JP) .................................. 2013-196908

(51) Int. Cl.
*C09K 19/30* (2006.01)
*C09K 19/42* (2006.01)
(Continued)

(52) U.S. Cl.
CPC ...... *C09K 19/3066* (2013.01); *C09K 19/3003* (2013.01); *C09K 19/322* (2013.01);
(Continued)

(58) Field of Classification Search
None
See application file for complete search history.

(56) References Cited

U.S. PATENT DOCUMENTS 7,763,401 B2    7/2010   Araki
8,269,921 B2    9/2012   Ohkuma et al.
(Continued)

FOREIGN PATENT DOCUMENTS

CN    101133138 A1    2/2008
EP    1 369 712 A1    12/2003
(Continued)

OTHER PUBLICATIONS

International Search Report dated Jun. 10, 2014, issued in counterpart International Application No. PCT/JP2014/056465 (2 pages).
(Continued)

*Primary Examiner* — Chanceity N Robinson
*Assistant Examiner* — Anna Malloy
(74) *Attorney, Agent, or Firm* — Westerman, Hattori, Daniels & Adrian, LLP

(57) ABSTRACT

A liquid crystal display device which prevents a decrease in the voltage holding ratio (VHR) of a liquid crystal layer and an increase in ion density (ID) therein and which overcomes problems of defective display such as voids, uneven alignment, and screen burn-in. The liquid crystal display device prevents a decrease in the voltage holding ratio (VHR) of a liquid crystal layer and an increase in ion density (ID) therein and reduces defective display such as screen burn-in; hence, such a liquid crystal display device is particularly useful as liquid crystal display devices of a VA mode and (Continued)

PSVA mode which involve active matrix driving and can be applied to the liquid crystal display devices of liquid crystal TV sets, monitors, mobile phones, and smartphones.

14 Claims, 2 Drawing Sheets

(51) Int. Cl.
*C09K 19/44* (2006.01)
*G02B 5/20* (2006.01)
*G02F 1/1333* (2006.01)
*G02F 1/1335* (2006.01)
*C09K 19/32* (2006.01)
*C09K 19/04* (2006.01)
*C09K 19/12* (2006.01)
*G02F 1/1337* (2006.01)

(52) U.S. Cl.
CPC .............. *C09K 19/42* (2013.01); *C09K 19/44* (2013.01); *G02B 5/20* (2013.01); *G02F 1/133365* (2013.01); *G02F 1/133512* (2013.01); *G02F 1/133514* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *G02F 2001/133742* (2013.01)

(56) References Cited

U.S. PATENT DOCUMENTS

| | | | |
|---|---|---|---|
| 8,389,073 B2 | 3/2013 | Hirata et al. | |
| 8,860,912 B2 | 10/2014 | Kaneoya et al. | |
| 8,885,124 B2 | 11/2014 | Kaneoya et al. | |
| 9,120,968 B2 | 9/2015 | Kaneoya et al. | |
| 9,193,906 B2 * | 11/2015 | Ogawa | C09K 19/3003 |
| 9,298,033 B2 * | 3/2016 | Ogawa | C09K 19/3003 |
| 9,464,231 B2 * | 10/2016 | Ogawa | C09K 19/44 |
| 2003/0151708 A1 | 8/2003 | Funakura et al. | |
| 2005/0280762 A1 | 12/2005 | Lee et al. | |
| 2006/0115606 A1 * | 6/2006 | Ichinose | C09K 19/12 428/1.1 |
| 2006/0257763 A1 | 11/2006 | Araki | |
| 2009/0103011 A1 * | 4/2009 | Bernatz | C09K 19/12 349/86 |
| 2010/0220268 A1 * | 9/2010 | Ohtani | C09D 11/322 349/106 |
| 2010/0271569 A1 | 10/2010 | Ohkuma et al. | |
| 2011/0010928 A1 | 1/2011 | Tsuchiya et al. | |
| 2011/0272631 A1 * | 11/2011 | Saito | C09K 19/12 252/299.61 |
| 2011/0297881 A1 | 12/2011 | Hirata et al. | |
| 2011/0311852 A1 | 12/2011 | Mineya | |
| 2012/0229744 A1 | 9/2012 | Hattori et al. | |
| 2012/0236246 A1 | 9/2012 | Furusato et al. | |
| 2012/0262653 A1 * | 10/2012 | Shimizu | G02F 1/133707 349/106 |
| 2013/0169906 A1 | 7/2013 | Nakanishi et al. | |
| 2014/0104524 A1 | 4/2014 | Lee et al. | |
| 2014/0211137 A1 * | 7/2014 | Kaneoya | C09K 19/3066 349/108 |
| 2015/0268395 A1 * | 9/2015 | Ogawa | G02F 1/133514 349/106 |
| 2015/0315471 A1 * | 11/2015 | Ogawa | C09K 19/44 349/106 |
| 2016/0075948 A1 * | 3/2016 | Ogawa | C09K 19/3066 349/106 |

FOREIGN PATENT DOCUMENTS

| | | | |
|---|---|---|---|
| JP | 08-171917 A | 7/1996 | |
| JP | 09-293537 A | 11/1997 | |
| JP | 2000-19321 A | 1/2000 | |
| JP | 2000-192040 A | 7/2000 | |
| JP | 2002-309255 A | 10/2002 | |
| JP | 2005-281559 A | 10/2005 | |
| JP | 2006-294512 A | 10/2006 | |
| JP | 2006-317602 A | 11/2006 | |
| JP | 2008-047307 A | 2/2008 | |
| JP | 2009-058546 A | 3/2009 | |
| JP | 2009-109542 A | 5/2009 | |
| JP | 2009-163014 A | 7/2009 | |
| JP | 2009-289661 A | 12/2009 | |
| JP | 2000-19321 A | 8/2010 | |
| JP | 2010-189560 A | 9/2010 | |
| JP | 2010-250117 A | 11/2010 | |
| JP | 2010-256509 A | 11/2010 | |
| JP | 2011-129528 A | 3/2011 | |
| JP | 2011-141356 A | 7/2011 | |
| JP | 2011-186043 A | 9/2011 | |
| JP | 2013-96944 A | 5/2013 | |
| TW | 200813624 A | 3/2008 | |
| TW | 200829965 A | 7/2008 | |
| TW | 201031735 A | 9/2010 | |
| TW | 201124479 A | 7/2011 | |
| TW | 201139343 A | 11/2011 | |
| TW | 201142502 A | 12/2011 | |
| TW | 201224065 A | 6/2012 | |
| TW | 201229574 A | 7/2012 | |
| TW | 201239071 A | 10/2012 | |
| TW | 201245426 A | 11/2012 | |
| TW | 201321484 A | 6/2013 | |
| WO | 2010/095506 A1 | 8/2010 | |
| WO | 2011086904 A | 7/2011 | |
| WO | 2011/092973 A1 | 8/2011 | |
| WO | WO 2013094537 A1 * | 6/2013 | ......... C09K 19/3066 |
| WO | 2013115164 A | 8/2013 | |
| WO | 2013133383 A | 9/2013 | |
| WO | WO 2014054133 A1 * | 4/2014 | ......... C09K 19/3003 |

OTHER PUBLICATIONS

International Search Report dated Aug. 20, 2013, issued in application No. PCT/JP2013/065713 (2 pages).
International Search Report and Written Opinion dated Aug. 20, 2013, issued in International Application No. PCT/JP2013/065713 (4 pages).
Non-Final Office Action dated Apr. 26, 2016, issued in U.S. Appl. No. 14/787,874 (18 pages).
Final Office Action dated Sep. 26, 2016, issued in U.S. Appl. No. 14/787,874 (12 pages).
Extended European Search Report dated Dec. 19, 2014, issued in application No. PCT/JP2012/074062 (3 pages).
International Search Report dated Nov. 13, 2012, issued in application No. PCT/JP2012/074062(3 pages).
Non-Final Office Action dated Jul. 23, 2015, issued in U.S. Appl. No. 14/115,305 (9 pages).
Non-Final Office Action dated Dec. 1, 2015, issued in U.S. Appl. No. 14/115,305 (9 pages).
Final Office Action dated Mar. 11, 2016, issued in U.S. Appl. No. 14/115,305 (8 pages).
Non-Final Office Action dated Aug. 31, 2016, issued in U.S. Appl. No. 14/115,305 (9 pages).
Final Office Action dated Dec. 22, 2016, issued in U.S. Appl. No. 14/115,305 (10 pages).
International Search Report dated Dec. 18, 2012, issued in application No. PCT/JP2012/074376(4 pages).
Non-Final Office Action dated Nov. 5, 2015, issued in U.S. Appl. No. 14/347,154 (18 pages).
Supplementary European Search Report dated Dec. 1, 2014, issued in European Patent Application No. 12876587 (2 pages).
International Search Report, dated Dec. 4, 2012, issued in application No. PCT/JP2012/075660 (2 pages).

(56) References Cited

OTHER PUBLICATIONS

Non-Final Office Action dated Feb. 25, 2015, issued in U.S. Appl. No. 14/344,823 (21 pages).
Notice of Allowance dated Jul. 17, 2015, issued in U.S. Appl. No. 14/344,823 (9 pages).
Notice of Allowance dated Apr. 3, 2015, issued in U.S. Appl. No. 13/868,503 (11 pages).
Non-Final Office Action dated Feb. 26, 2015, issued in U.S. Appl. No. 14/230,495 (23 pages).
Final Office Action dated Sep. 2, 2015, issued in U.S. Appl. No. 14/230,495 (10 pages).
Notice of Allowance dated Dec. 10, 2015, issued in U.S. Appl. No. 14/230,495 (5 pages).
Notice of Allowance dated Oct. 9, 2015, issued in U.S. Appl. No. 14/115,305 (5 pages).

\* cited by examiner

LIQUID CRYSTAL DISPLAY DEVICE

TECHNICAL FIELD

The present invention relates to a liquid crystal display device.

BACKGROUND ART

Liquid crystal display devices have been applied to, for example, watches, calculators, a variety of household electrical appliances, measuring equipment, panels used in automobiles, word processors, electronic notebooks, printers, computers, and television sets. Representative examples of types of liquid crystal display devices include a TN (twisted nematic) type, an STN (super twisted nematic) type, a DS (dynamic scattering) type, a GH (guest•host) type, an IPS (in-plane switching) type, an OCB (optically compensated birefringence) type, an ECB (electrically controlled birefringence) type, a VA (vertical alignment) type, a CSH (color super homeotropic) type, and an FLC (ferroelectric liquid crystal) type. Regarding a drive system, multiplex driving has become popular instead of typical static driving; and an active matrix (AM) in which, for example, a TFT (thin film transistor) or a TFD (thin film diode) is used for driving has become standard rather than a passive matrix in recent years.

As illustrated in FIG. 1, in a general color liquid crystal display device, a transparent electrode layer (3*a*) as a common electrode and a color filter layer (2) are disposed between one of two substrates (1) and one of alignment films (4) provided so as to correspond thereto, a pixel electrode layer (3*b*) is disposed between the other substrate and the other alignment film, the substrates are disposed such that the alignment films face each other, and a liquid crystal layer (5) is disposed therebetween.

The color filter layer is a color filter consisting of a black matrix, a red layer (R), a green layer (G), a blue layer (B), and optionally a yellow layer (Y).

Impurities remaining in liquid crystal materials used in a liquid crystal layer have a large effect on the electrical properties of a display device, and the impurities have been therefore highly controlled. In terms of materials used in alignment films, it has been known that impurities remaining in the alignment films directly contacting a liquid crystal layer shift to the liquid crystal layer with the result that the impurities affect the electrical properties of the liquid crystal layer; hence, the relationship between the properties of liquid crystal display devices and impurities contained in the materials of alignment films have been being studied.

Also in terms of materials used in a color filter layer, such as organic pigments, it is believed that impurities contained therein have an effect on a liquid crystal layer as in the materials of alignment films. However, since an alignment film and a transparent electrode are disposed between the color filter layer and the liquid crystal layer, it has been believed that direct effect thereof on the liquid crystal layer is significantly smaller than that of the materials of the alignment film. In general, however, the thickness of the alignment film is only not more than 0.1 µm, and the thickness of the transparent electrode that is a common electrode disposed on the color filter layer side is not more than 0.5 µm even in the case where the thickness is increased to enhance the electric conductivity. Hence, the color filter layer and the liquid crystal layer are not in a state in which they are completely isolated from each other, and the color filter layer may therefore cause problems owing to impurities which are contained in the color filter layer and which pass through the alignment film and the transparent electrode, such as a decrease in the voltage holding ratio (VHR) of the liquid crystal layer and defective display including voids due to increased ion density (ID), uneven alignment, and screen burn-in.

Techniques for overcoming defective display caused by impurities present in a pigment contained in the color filter layer have been studied, such as a technique in which dissolution of impurities in liquid crystal is controlled by use of a pigment in which the amount of an extract from the pigment by ethyl formate is at a predetermined level or lower (Patent Literature 1) and a technique in which dissolution of impurities in liquid crystal is controlled by use of a specific pigment for a blue layer (Patent Literature 2). These techniques, however, are substantially not different from merely reducing the impurity content in a pigment and are insufficient in improvements to overcome defective display even in a current situation in which a technique for purifying pigments has been advanced.

In another disclosed technique, attention is paid to the relationship between organic impurities contained in a color filter layer and a liquid crystal composition, the degree in which the organic impurities are less likely to be dissolved in a liquid crystal layer is represented by the hydrophobic parameter of liquid crystal molecules contained in the liquid crystal layer, and the hydrophobic parameter is adjusted to be at a predetermined level or more; furthermore, since such a hydrophobic parameter has a correlation with a —$OCF_3$ group present at an end of a liquid crystal molecule, a liquid crystal composition is prepared so as to contain a predetermined amount or more of a liquid crystal compound having a —$OCF_3$ group at an end of each liquid crystal molecule thereof (Patent Literature 3).

Also in such disclosure, however, the technique is substantially for reducing effects of impurities present in a pigment on the liquid crystal layer, and a direct relationship between the properties of a colorant itself used in the color filter layer, such as a dye or a pigment, and the structure of a liquid crystal material is not considered; thus, problems of defective display in highly-developed liquid crystal display devices have not been overcome.

CITATION LIST

Patent Literature

PTL 1: Japanese Unexamined Patent Application Publication No. 2000-19321

PTL 2: Japanese Unexamined Patent Application Publication No. 2009-109542

PTL 3: Japanese Unexamined Patent Application Publication No. 2000-192040

SUMMARY OF INVENTION

Technical Problem

It is an object of the present invention to provide a liquid crystal display device in which a specific liquid crystal composition and a color filter that gives a specific slope parameter indicating the degree of the agglomeration of an organic pigment are used to prevent a decrease in the voltage holding ratio (VHR) of a liquid crystal layer and an increase in ion density (ID) therein and to overcome problems of defective display such as voids, uneven alignment, and screen burn-in.

Solution to Problem

In order to achieve the above-mentioned object, the inventors have intensively studied a structural combination of a color filter containing an organic pigment and a liquid crystal material used for forming a liquid crystal layer and found that a liquid crystal display device including a specific liquid crystal material and a color filter that gives a specific slope parameter enables prevention of a decrease in the voltage holding ratio (VHR) of the liquid crystal layer and an increase in ion density (ID) therein and eliminates problems of defective display such as voids, uneven alignment, and screen burn-in, thereby accomplishing the present invention.

In particular, the present invention provides a liquid crystal display device including a first substrate, a second substrate, a liquid crystal composition layer disposed between the first substrate and the second substrate, a color filter including a black matrix and at least RGB three-color pixels, a pixel electrode, and a common electrode, wherein the liquid crystal composition layer contains a liquid crystal composition containing a compound represented by General Formula (I) in an amount of 30 to 50%

[Chem. 1]

(I)

(where $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; and A represents a 1,4-phenylene group or a trans-1,4-cyclohexylene group), a compound represented by General Formula (II-1) in an amount of 5 to 30%

[Chem. 2]

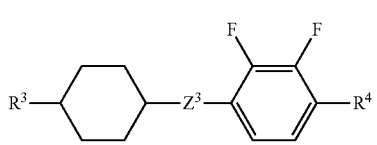

(II-1)

(where $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; and $Z^3$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—), and a compound represented by General Formula (II-2) in an amount of 25 to 45%

[Chem. 3]

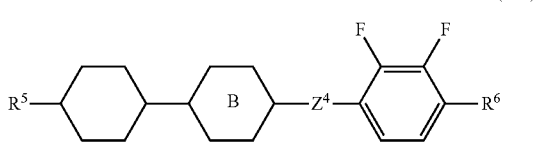

(II-2)

(where $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or trans-1,4-cyclohexylene group which is optionally substituted with a fluorine atom; and $Z^4$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—); and the color filter contains an organic pigment, wherein in the case where the organic pigment contained in the color filter is subjected to scattering profile analysis including a step (A) of measuring the ultra-small angle X-ray profile of the organic pigment on the basis of ultra-small angle X-ray scattering, a step (B) of calculating a point of curvature on the scattering profile, a step (C) of calculating an analysis region (c1) determined from the point of curvature, and a step (D) of calculating a slope parameter in the analysis region c1, the slope parameter in the analysis region (c1) is not more than 2.

Advantageous Effects of Invention

In the liquid crystal display device of the present invention, using a specific liquid crystal composition and a color filter that gives a specific slope parameter indicating the degree of the agglomeration of an organic pigment enables prevention of a decrease in the voltage holding ratio (VHR) of a liquid crystal layer, prevention of an increase in ion density (ID) therein, and elimination of defective display such as voids, uneven alignment, and screen burn-in.

REFERENCE SIGNS LIST

1 Substrate
2 Color filter layer
2*a* Color filter layer that gives specific slope parameter
3*a* Transparent electrode layer (common electrode)
3*b* Pixel electrode layer
4 Alignment film
5 Liquid crystal layer
5*a* Liquid crystal layer containing specific liquid crystal composition

DESCRIPTION OF EMBODIMENTS

Figure 1:
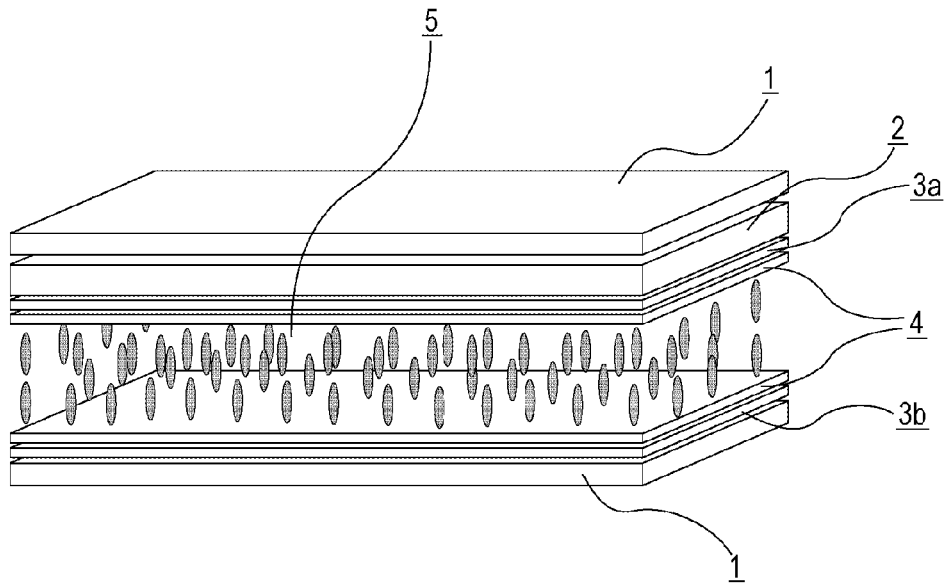
FIG. 1 illustrates an example of typical liquid crystal display devices generally used.
Figure 2:
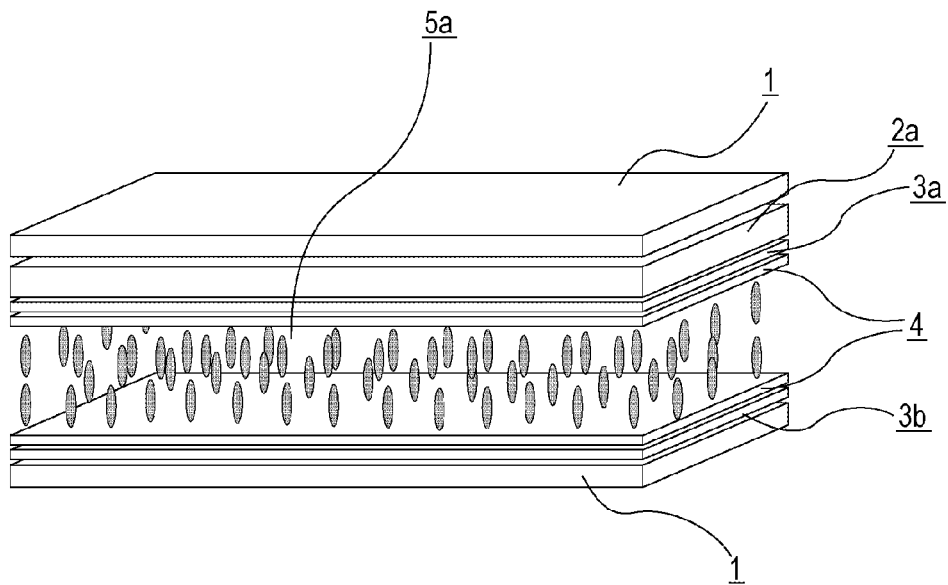
FIG. 2 illustrates an example of the liquid crystal display device of the present invention.

FIG. 2 illustrates an example of the liquid crystal display device of the present invention. In the liquid crystal display device, a transparent electrode layer (3a) as a common electrode and a color filter layer (2a) that gives a specific slope parameter are disposed between one of two substrates (1) of first and second substrates and one of alignment films (4) provided so as to correspond thereto, a pixel electrode layer (3b) is disposed between the other substrate and the other alignment film, the substrates are disposed such that the alignment films face each other, and a liquid crystal layer (5a) containing a specific liquid crystal composition is disposed therebetween.

In the display device, the two substrates are attached to each other with a sealant and sealing material placed at the peripheries thereof, and particulate spacers or spacer columns formed of resin by photolithography are disposed between the substrates to maintain the distance therebetween in many cases.

(Liquid Crystal Layer)

The liquid crystal layer of the liquid crystal display device of the present invention is composed of a liquid crystal composition containing a compound represented by General Formula (I) in an amount of 30 to 50%

[Chem. 4]

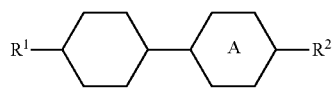

(I)

(where $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; and A represents a 1,4-phenylene group or a trans-1,4-cyclohexylene group), a compound represented by General Formula (II-1) in an amount of 5 to 30%

[Chem. 5]

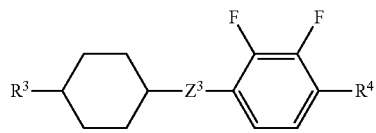

(II-1)

(where $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; and $Z^3$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—), and a compound represented by General Formula (II-2) in an amount of 25 to 45%

[Chem. 6]

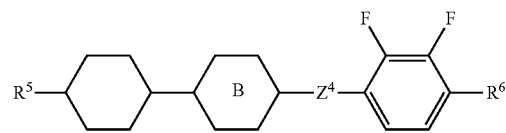

(II-2)

(where $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or trans-1,4-cyclohexylene group which is optionally substituted with a fluorine atom; and $Z^4$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—).

The amount of the compound represented by General Formula (I) in the liquid crystal layer of the liquid crystal display device of the present invention is from 30 to 50%, preferably 32 to 48%, and more preferably 34 to 46%.

In General Formula (I), $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; in the case where A is a trans-1,4-cyclohexylene group, $R^1$ and $R^2$ preferably each independently represent an alkyl group having 1 to 5 carbon atoms, an alkenyl group having 2 to 5 carbon atoms, an alkoxy group having 1 to 5 carbon atoms, or an alkenyloxy group having 2 to 5 carbon atoms; and more preferably an alkyl group having 2 to 5 carbon atoms, an alkenyl group having 2 to 4 carbon atoms, an alkoxy group having 1 to 4 carbon atoms, or an alkenyloxy group having 2 to 4 carbon atoms.

$R^1$ preferably represents an alkyl group; in this case, an alkyl group having 2, 3, or 4 carbon atoms is especially preferred. In the case where $R^1$ represents an alkyl group having 3 carbon atoms, $R^2$ is preferably an alkyl group having 2, 4, or 5 carbon atoms or an alkenyl group having 2 or 3 carbon atoms, and more preferably an alkyl group having 2 carbon atoms.

In the case where A represents a 1,4-phenylene group, $R^1$ and $R^2$ preferably each independently represent an alkyl group having 1 to 5 carbon atoms, an alkenyl group having 4 or 5 carbon atoms, an alkoxy group having 1 to 5 carbon atoms, or an alkenyloxy group having 3 to 5 carbon atoms; and more preferably an alkyl group having 2 to 5 carbon atoms, an alkenyl group having 4 or 5 carbon atoms, an alkoxy group having 1 to 4 carbon atoms, or an alkenyloxy group having 2 to 4 carbon atoms.

$R^1$ preferably represents an alkyl group; in this case, an alkyl group having 1, 3, or 5 carbon atoms is especially preferred. In addition, $R^2$ preferably represents an alkoxy group having 1 or 2 carbon atoms.

The amount of a compound represented by General Formula (I) in which at least one of the substituents $R^1$ and $R^2$ is an alkyl group having 3 to 5 carbon atoms preferably accounts for not less than 50%, more preferably not less than 70%, and further preferably not less than 80% of the total amount of compounds represented by General Formula (I). Moreover, the amount of a compound represented by General Formula (I) in which at least one of the substituents $R^1$ and $R^2$ is an alkyl group having 3 carbon atoms preferably accounts for not less than 50%, more preferably not less than 70%, further preferably not less than 80%, and most preferably 100% of the total amount of compounds represented by General Formula (I).

One or more compounds represented by General Formula (I) can be used, and at least one compound in which A represents a trans-1,4-cyclohexylene group and at least one compound in which A represents a 1,4-phenylene group are preferably used.

The amount of a compound represented by General Formula (I) in which A represents a trans-1,4-cyclohexylene group preferably accounts for not less than 50%, more preferably not less than 70%, and further preferably not less than 80% of the total amount of compounds represented by General Formula (I).

In particular, the compound represented by General Formula (I) is preferably any of the following compounds represented by General Formulae (Ia) to (Ik).

[Chem. 7]

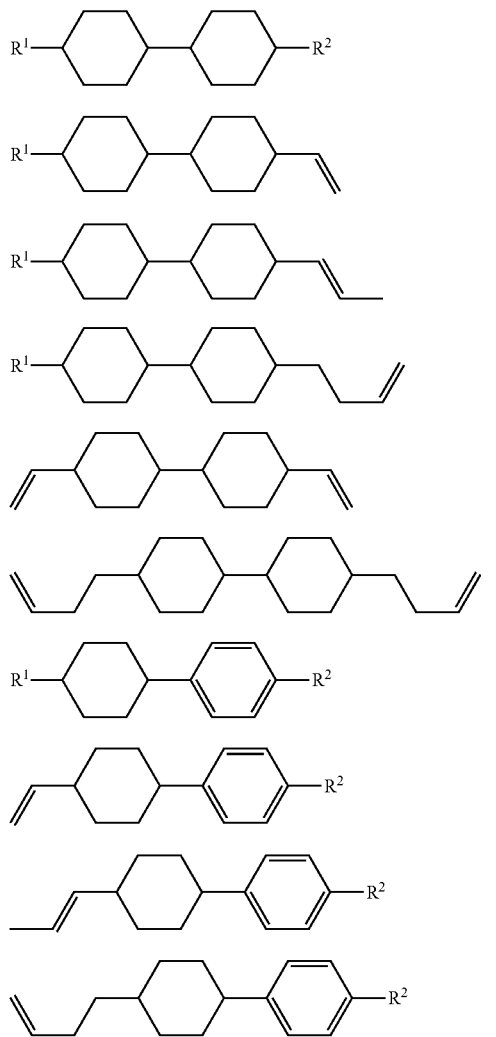

(Ia)
(Ib)
(Ic)
(Id)
(Ie)
(If)
(Ig)
(Ih)
(Ii)
(Ij)

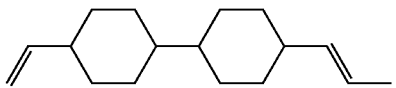

(Ik)

(where $R^1$ and $R^2$ each independently represent an alkyl group having 1 to 5 carbon atoms or an alkoxy group having 1 to 5 carbon atoms and preferably have the same meanings as $R^1$ and $R^2$ in General Formula (I), respectively) Among General Formulae (Ia) to (Ik), General Formulae (Ia), (Ic), and (Ig) are preferred; General Formulae (Ia) and (Ig) are more preferred; and General Formula (Ia) is especially preferred. In the case of focusing on a response speed, General Formula (Ib) is also preferred; in the case of further focusing on a response speed, General Formulae (Ib), (Ic), (Ie), and (Ik) are preferred, and General Formulae (Ic) and (Ik) are more preferred. Dialkenyl compounds represented by General Formula (Ik) are preferred in the case of especially focusing on a response speed.

From this viewpoint, the amount of compounds represented by General Formulae (Ia) and (Ic) is preferably not less than 50%, more preferably not less than 70%, further preferably not less than 80%, and most preferably 100% relative to the total amount of compounds represented by General Formula (I). The amount of a compound represented by General Formula (Ia) is preferably not less than 50%, more preferably not less than 70%, and further preferably not less than 80% relative to the total amount of compounds represented by General Formula (I).

The amount of the compound represented by General Formula (II-1) in the liquid crystal layer of the liquid crystal display device of the present invention is from 5 to 30%, preferably 8 to 27%, and more preferably 10 to 25%. In General Formula (II-1), $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; preferably an alkyl group having 1 to 5 carbon atoms or an alkenyl group having 2 to 5 carbon atoms; more preferably an alkyl group having 2 to 5 carbon atoms or an alkenyl group having 2 to 4 carbon atoms; further preferably an alkyl group having 3 to 5 carbon atoms or an alkenyl group having 2 carbon atoms; and especially preferably an alkyl group having 3 carbon atoms.

$R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; preferably an alkyl group having 1 to 5 carbon atoms or an alkoxy group having 1 to 5 carbon atoms; more preferably an alkyl group having 1 to 3 carbon atoms or an alkoxy group having 1 to 3 carbon atoms; further preferably an alkyl group having 3 carbon atoms or an alkoxy group having 2 carbon atoms; and especially preferably an alkoxy group having 2 carbon atoms.

$Z^3$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—; preferably a single bond, —CH$_2$CH$_2$—, —COO—, —OCH$_2$—, —CH$_2$O—, —OCF$_2$—, or —CF$_2$O—; and more preferably a single bond or —CH$_2$O—.

The liquid crystal layer of the liquid crystal display device of the present invention can contain at least one compound represented by General Formula (II-1) and preferably contains one or two compounds represented by General Formula (II-1).

In particular, the compound represented by General Formula (II-1) is preferably any of compounds represented by General Formulae (II-1a) to (II-1d).

[Chem. 8]

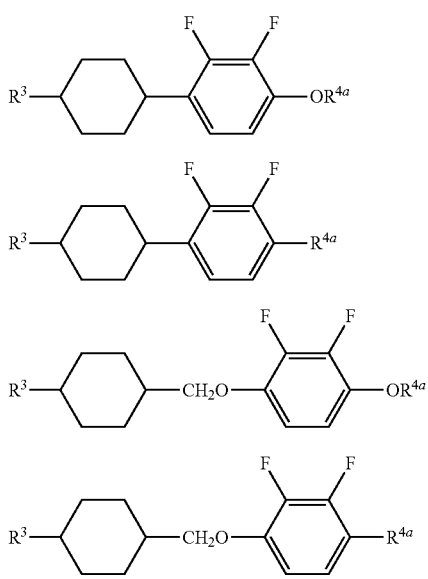

(where $R^3$ represents an alkyl group having 1 to 5 carbon atoms or an alkenyl group having 2 to 5 carbon atoms; and $R^{4a}$ represents an alkyl group having 1 to 5 carbon atoms)

In General Formulae (II-1a) and (II-1c), $R^3$ preferably has the same meaning as $R^3$ in General Formula (II-1). $R^{4a}$ preferably represents an alkyl group having 1 to 3 carbon atoms, more preferably an alkyl group having 1 or 2 carbon atoms, and especially preferably an alkyl group having 2 carbon atoms.

In General Formulae (II-1b) and (II-1d), $R^3$ preferably has the same meaning as $R^3$ in General Formula (II-1). $R^{4a}$ preferably represents an alkyl group having 1 to 3 carbon atoms, more preferably an alkyl group having 1 or 3 carbon atoms, and especially preferably an alkyl group having 3 carbon atoms.

Among General Formulae (II-1a) to (II-1d), in order to increase the absolute value of dielectric anisotropy, General Formulae (II-1a) and (II-1c) are preferred, and General Formula (II-1a) is more preferred.

The liquid crystal layer of the liquid crystal display device of the present invention preferably contains at least one of compounds represented by General Formulae (II-1a) to (II-1d), also preferably one or two of them, and also preferably one or two of compounds represented by General Formula (II-1a).

The amount of the compound represented by General Formula (II-2) in the liquid crystal layer of the liquid crystal display device of the present invention is from 25 to 45%, preferably 28 to 42%, and more preferably 30 to 40%.

In General Formula (II-2), $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; preferably an alkyl group having 1 to 5 carbon atoms or an alkenyl group having 2 to 5 carbon atoms; more preferably an alkyl group having 2 to 5 carbon atoms or an alkenyl group having 2 to 4 carbon atoms; further preferably an alkyl group having 3 to 5 carbon atoms or an alkenyl group having 2 carbon atoms; and especially preferably an alkyl group having 3 carbon atoms.

$R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; preferably an alkyl group having 1 to 5 carbon atoms or an alkoxy group having 1 to 5 carbon atoms; more preferably an alkyl group having 1 to 3 carbon atoms or an alkoxy group having 1 to 3 carbon atoms; further preferably an alkyl group having 3 carbon atoms or an alkoxy group having 2 carbon atoms; and especially preferably an alkoxy group having 2 carbon atoms.

B represents a 1,4-phenylene group or trans-1,4-cyclohexylene group which is optionally substituted with a fluorine atom, preferably an unsubstituted 1,4-phenylene group or trans-1,4-cyclohexylene group, and more preferably the trans-1,4-cyclohexylene group.

$Z^4$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—; preferably a single bond, —CH$_2$CH$_2$—, —COO—, —OCH$_2$—, —CH$_2$O—, —OCF$_2$-, or —CF$_2$O—; and more preferably a single bond or —CH$_2$O—.

In particular, the compound represented by General Formula (II-2) is preferably any of compounds represented by General Formulae (II-2a) to (II-2f).

[Chem. 9]

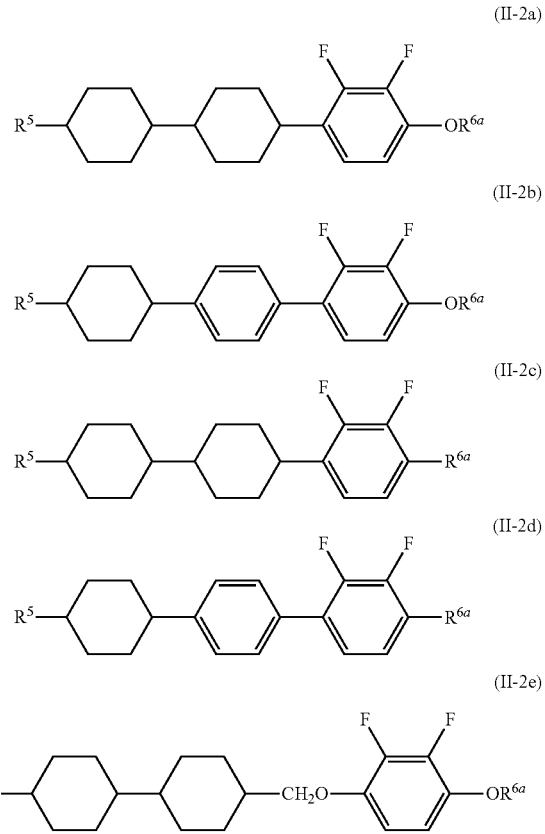

-continued

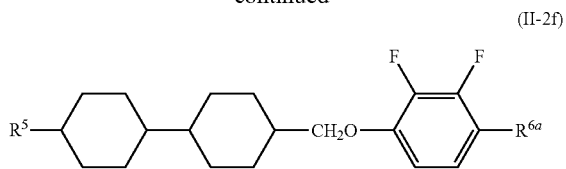
(II-2f)

(where R[5] represents an alkyl group having 1 to 5 carbon atoms or an alkenyl group having 2 to 5 carbon atoms, and R[6a] represents an alkyl group having 1 to 5 carbon atoms; R[5] and R[6a] preferably have the same meanings as R[5] and R[6] in General Formula (II-2), respectively)

In General Formulae (II-2a), (II-2b), and (II-2e), R[5] preferably has the same meaning as R[5] in General Formula (II-2). R[6a] is preferably an alkyl group having 1 to 3 carbon atoms, more preferably an alkyl group having 1 or 2 carbon atoms, and especially preferably an alkyl group having 2 carbon atoms.

In General Formulae (II-2c), (II-2d), and (II-2f), R[5] preferably has the same meaning as R[5] in General Formula (II-2). R[6a] is preferably an alkyl group having 1 to 3 carbon atoms, more preferably an alkyl group having 1 or 3 carbon atoms, and especially preferably an alkyl group having 3 carbon atoms.

Among General Formulae (II-2a) to (II-2f), in order to increase the absolute value of dielectric anisotropy, General Formulae (II-2a), (II-2b), and (II-2e) are preferred.

One or more compounds represented by General Formula (II-2) can be used; it is preferred that at least one compound in which B represents a 1,4-phenylene group and at least one compound in which B represents a trans-1,4-cyclohexylene group be used.

The liquid crystal layer of the liquid crystal display device of the present invention preferably further contains a compound represented by General Formula (III).

[Chem. 10]

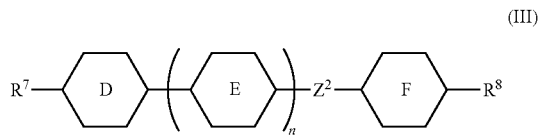
(III)

(where R[7] and R[8] each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; D, E, and F each independently represent a 1,4-phenylene group or trans-1,4-cyclohexylene which is optionally substituted with a fluorine atom; Z[2] represents a single bond, —OCH$_2$—, —OCO—, —CH$_2$O—, —COO—, or —OCO—; n represents 0, 1, or 2; and the compound represented by General Formula (III) excludes the compounds represented by General Formulae (I), (II-1), and (II-2).

The amount of the compound represented by General Formula (III) is preferably in the range of 3 to 35%, more preferably 5 to 33%, and further preferably 7 to 30%.

In General Formula (III), R[7] represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

In the case where D represents trans-1,4-cyclohexylene, R[7] preferably represents an alkyl group having 1 to 5 carbon atoms or an alkenyl group having 2 to 5 carbon atoms, more preferably an alkyl group having 2 to 5 carbon atoms or an alkenyl group having 2 to 4 carbon atoms, further preferably an alkyl group having 3 to 5 carbon atoms or an alkenyl group having 2 or 3 carbon atoms, and especially preferably an alkyl group having 3 carbon atoms.

In the case where D represents a 1,4-phenylene group which is optionally substituted with a fluorine atom, R[7] preferably represents an alkyl group having 1 to 5 carbon atoms or an alkenyl group having 4 or 5 carbon atoms, more preferably an alkyl group having 2 to 5 carbon atoms or an alkenyl group having 4 carbon atoms, and further preferably an alkyl group having 2 to 4 carbon atoms.

R[8] represents an alkyl group having 1 to 8 carbon atoms, an alkenyl group having 2 to 8 carbon atoms, an alkoxy group having 1 to 8 carbon atoms, or an alkenyloxy group having 3 to 8 carbon atoms.

In the case where F represents trans-1,4-cyclohexylene, R[8] preferably represents an alkyl group having 1 to 5 carbon atoms or an alkenyl group having 2 to 5 carbon atoms, more preferably an alkyl group having 2 to 5 carbon atoms or an alkenyl group having 2 to 4 carbon atoms, further preferably an alkyl group having 3 to 5 carbon atoms or an alkenyl group having 2 or 3 carbon atoms, and especially preferably an alkyl group having 3 carbon atoms.

In the case where F represents a 1,4-phenylene group which is optionally substituted with a fluorine atom, R[8] preferably represents an alkyl group having 1 to 5 carbon atoms or an alkenyl group having 4 or 5 carbon atoms, more preferably an alkyl group having 2 to 5 carbon atoms or an alkenyl group having 4 carbon atoms, and further preferably an alkyl group having 2 to 4 carbon atoms.

In the case where R[7] and R[8] each represent an alkenyl group and where any one of D and F bonded to R[7] and R[8], respectively, is a 1,4-phenylene group which is optionally substituted with a fluorine atom, an alkenyl group having 4 or 5 carbon atoms is preferably any of the following structures.

[Chem. 11]

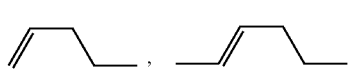

(where the right end of each of the structures is bonded to the ring structure)

Also in this case, an alkenyl group having 4 carbon atoms is more preferred.

D, E, and F each independently represent a 1,4-phenylene group or trans-1,4-cyclohexylene which is optionally substituted with a fluorine atom; preferably a 2-fluoro-1,4-phenylene group, a 2,3-difluoro-1,4-phenylene group, a 1,4-phenylene group, or trans-1,4-cyclohexylene; more preferably a 2-fluoro-1,4-phenylene group, a 2,3-difluoro-1,4-phenylene group, or a 1,4-phenylene group; especially preferably a 2,3-difluoro-1,4-phenylene group or a 1,4-phenylene group.

Z[2] represents a single bond, —OCH$_2$—, —COO—, —CH$_2$O—, or —COO—; preferably a single bond, —CH$_2$O—, or —COO—; and more preferably a single bond.

n represents 0, 1, or 2; and preferably 0 or 1. In the case where Z[2] does not represent a single bond but represents a substituent, n preferably represents 1. In the case where n represents 1, the compound represented by General Formula (III) is preferably any of compounds represented by General Formulae (III-1a) to (III-1e) in terms of an enhancement in negative dielectric anisotropy or any of compounds represented by General Formulae (III-1f) to (III-1j) in terms of an increase in a response speed.

In the case where n represents 2, the compound represented by General Formula (III) is preferably any of compounds represented by General Formulae (III-2a) to (III-2i) in terms of an enhancement in negative dielectric anisotropy or any of compounds represented by General Formulae (III-2j) to (III-2g) and (III-2i) to (III-2l) in terms of an increase in a response speed.

[Chem. 12]

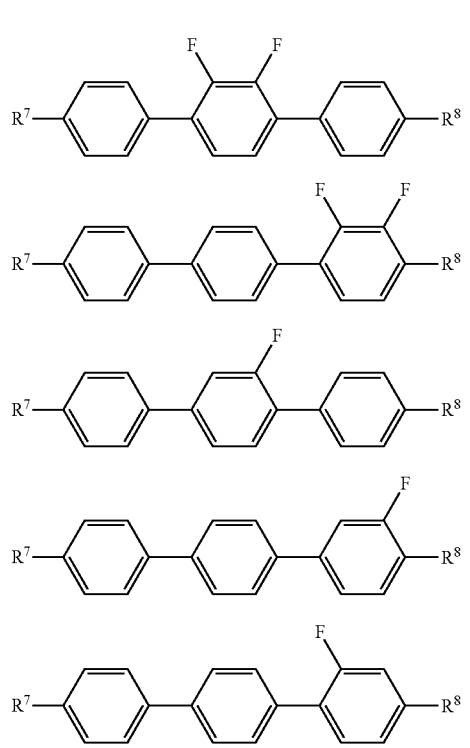

[Chem. 13]

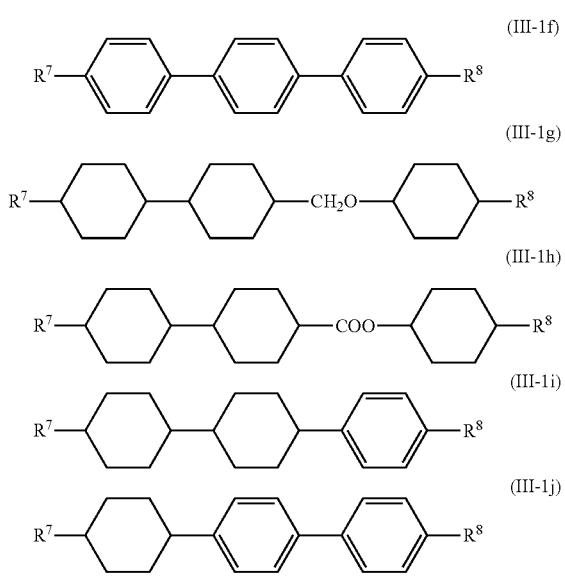

[Chem. 14]

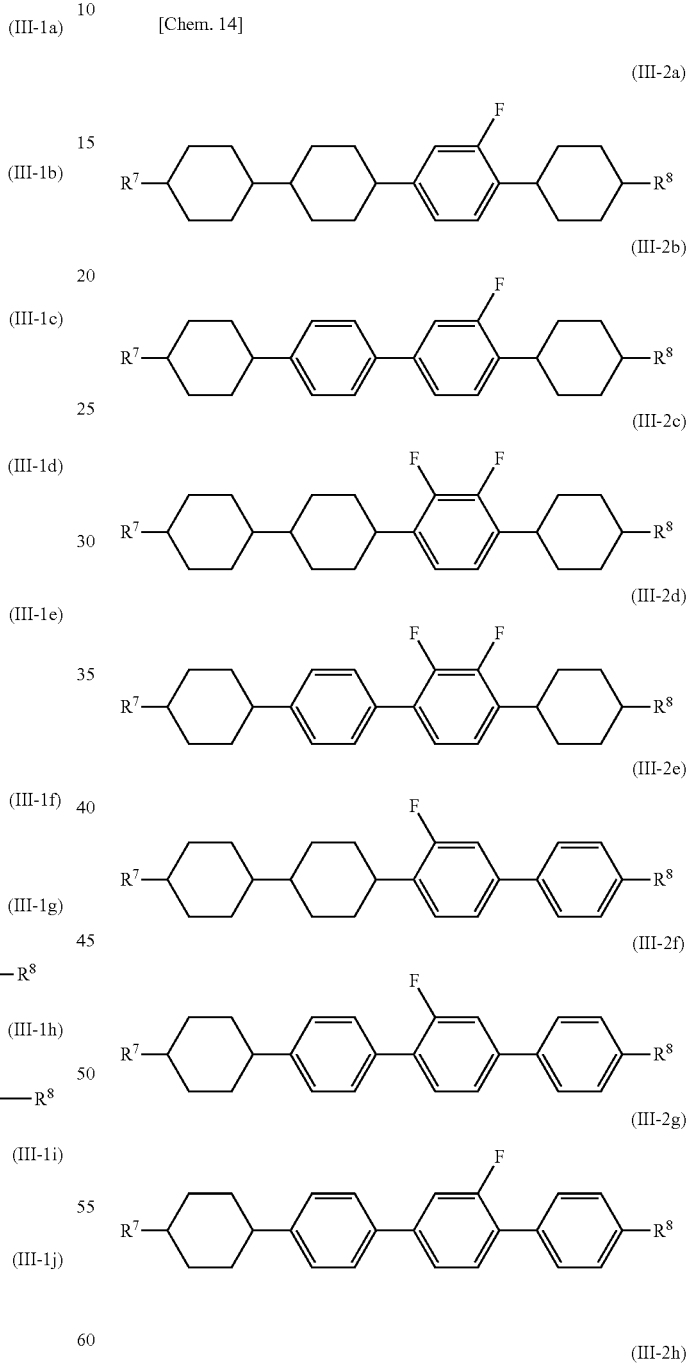

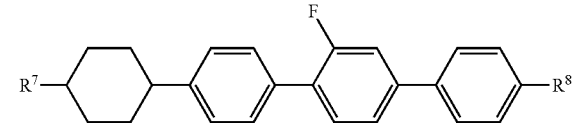

(where $R^7$ and $R^8$ each independently represent an alkyl group having 1 to 5 carbon atoms, an alkenyl group having 2 to 5 carbon atoms, or an alkoxy group having 1 to 5 carbon atoms; $R^7$ and $R^8$ preferably have the same meanings as $R^7$ and $R^8$ in General Formula (III), respectively)

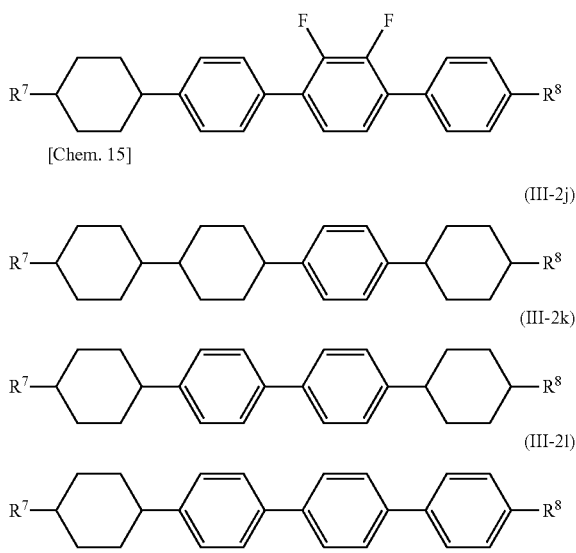

(where $R^7$ and $R^8$ each independently represent an alkyl group having 1 to 5 carbon atoms, an alkenyl group having 2 to 5 carbon atoms, or an alkoxy group having 1 to 5 carbon atoms; $R^7$ and $R^8$ preferably have the same meanings as $R^7$ and $R^8$ in General Formula (III), respectively)

In the case where n represents 0, the compound represented by General Formula (III) is preferably a compound represented by General Formula (III-3a) in terms of an enhancement in negative dielectric anisotropy or a compound represented by General Formula (III-3b) in terms of an increase in a response speed.

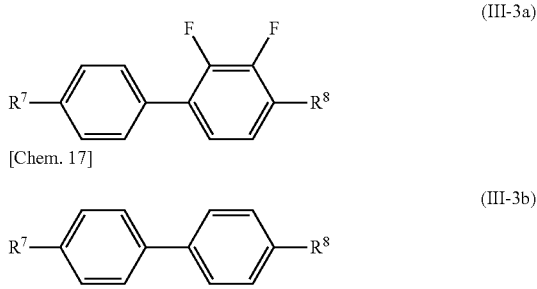

(where $R^7$ and $R^8$ each independently represent an alkyl group having 1 to 5 carbon atoms, an alkenyl group having 2 to 5 carbon atoms, or an alkoxy group having 1 to 5 carbon atoms; $R^7$ and $R^8$ preferably have the same meanings as $R^7$ and $R^8$ in General Formula (III), respectively)

$R^7$ preferably represents an alkyl group having 2 to 5 carbon atoms, and more preferably an alkyl group having 3 carbon atoms. $R^8$ preferably represents an alkoxy group having 1 to 3 carbon atoms, and more preferably an alkoxy group having 2 carbon atoms.

Each of the compounds represented by General Formulae (II-1) and (II-2) is a compound having a negative dielectric anisotropy with a relatively large absolute value; the total amount thereof is preferably in the range of 30 to 65%, more preferably 40 to 55%, and especially preferably 43 to 50%.

The compound represented by General Formula (III) includes a compound having a positive dielectric anisotropy and a compound having a negative dielectric anisotropy. In the case where a compound represented by General Formula (III) and having a negative dielectric anisotropy with an absolute value of not less than 0.3 is used, the total amount of compounds represented by General Formulae (II-1), (II-2), and (III) is preferably in the range of 35 to 70%, more preferably 45 to 65%, and especially preferably 50 to 60%.

It is preferred that the amount of the compound represented by General Formula (I) be in the range of 30 to 50% and that the amount of the compounds represented by General Formulae (II-1), (II-2), and (III) be in the range of 35 to 70%; it is more preferred that the amount of the compound represented by General Formula (I) be in the range of 35 to 45% and that the amount of the compounds represented by General Formulae (II-1), (II-2), and (III) be in the range of 45 to 65%; and it is especially preferred that the amount of the compound represented by General Formula (I) be in the range of 38 to 42% and that the amount of the compounds represented by General Formulae (II-1), (II-2), and (III) be in the range of 50 to 60%.

The total amount of the compounds represented by General Formulae (I), (II-1), (II-2), and (III) is preferably in the range of 80 to 100%, more preferably 90 to 100%, and especially preferably 95 to 100% relative to the total amount of the composition.

The liquid crystal layer of the liquid crystal display device of the present invention can be used in a wide range of nematic phase-isotropic liquid phase transition temperature ($T_{ni}$); this temperature range is preferably from 60 to 120° C., more preferably from 70 to 100° C., and especially preferably from 70 to 85° C.

The dielectric anisotropy is preferably in the range of −2.0 to −6.0, more preferably −2.5 to −5.0, and especially preferably −2.5 to −4.0 at 25° C.

The refractive index anisotropy is preferably from 0.08 to 0.13, and more preferably from 0.09 to 0.12 at 25° C. In particular, the refractive index anisotropy is preferably from 0.10 to 0.12 for a thin cell gap or is preferably from 0.08 to 0.10 for a thick cell gap.

The rotational viscosity (γ1) is preferably not more than 150, more preferably not more than 130, and especially preferably not more than 120.

In the liquid crystal layer of the liquid crystal display device of the present invention, it is preferred that the function Z of the rotational viscosity and the refractive index anisotropy have a specific value.

$$Z=\gamma 1/\Delta n^2 \qquad \text{[Math. 1]}$$

(where γ1 represents rotational viscosity, and Δn represents refractive index anisotropy)

Z is preferably not more than 13000, more preferably not more than 12000, and especially preferably not more than 11000.

In the case where the liquid crystal layer of the liquid crystal display device of the present invention is used in an active-matrix display device, the liquid crystal layer needs to have a specific resistance of not less than $10^{12}$ (Ω·m), preferably $10^{13}$ (Ω·m), and more preferably not less than $10^{14}$ (Ω·m).

In addition to the above-mentioned compounds, the liquid crystal layer of the liquid crystal display device of the present invention may contain, for example, general nematic liquid crystal, smectic liquid crystal, cholesteric liquid crystal, antioxidants, ultraviolet absorbers, and polymerizable monomers, depending on the application thereof.

The polymerizable monomer is preferably a difunctional monomer represented by General Formula (V).

[Chem. 18]

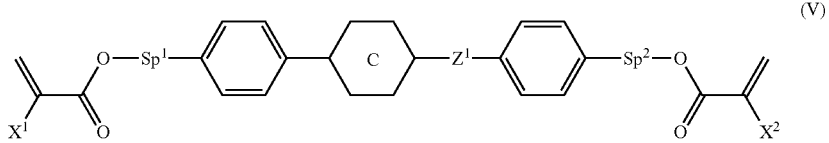

(V)

(where $X^1$ and $X^2$ each independently represent a hydrogen atom or a methyl group;

$Sp^1$ and $Sp^2$ each independently represent a single bond, an alkylene group having 1 to 8 carbon atoms, or —O—$(CH_2)_s$— (where s represents an integer from 2 to 7, and the oxygen atom is bonded to an aromatic ring);

$Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where $Y^1$ and $Y^2$ each independently represent a fluorine atom or a hydrogen atom), —C≡C—, or a single bond; and C represents a 1,4-phenylene group, a trans-1,4-cyclohexylene group, or a single bond, and in each 1,4-phenylene group in the formula, any hydrogen atom is optionally substituted with a fluorine atom)

Diacrylate derivatives in which $X^1$ and $X^2$ each represent a hydrogen atom and dimethacrylate derivatives in which $X^1$ and $X^2$ are each a methyl group are preferred, and compounds in which one of $X^1$ and $X^2$ represents a hydrogen atom and in which the other one thereof represents a methyl group are also preferred. Among these compounds, the rate of polymerization is the highest in diacrylate derivatives and the lowest in dimethacrylate derivatives, and the rate of polymerization of unsymmetrical compounds is intermediate therebetween. Hence, an appropriate compound can be employed on the basis of the intended application. In PSA display devices, dimethacrylate derivatives are especially preferred.

$Sp^1$ and $Sp^2$ each independently represent a single bond, an alkylene group having 1 to 8 carbon atoms, or —O—$(CH_2)_s$—; in an application to PSA display devices, at least one of $Sp^1$ and $Sp^2$ is preferably a single bond, and compounds in which $Sp^1$ and $Sp^2$ each represent a single bond and compounds in which one of $Sp^1$ and $Sp^2$ is a single bond and in which the other one thereof represents an alkylene group having 1 to 8 carbon atoms or —O—$(CH_2)_s$— are preferred. In this case, an alkyl group having a carbon number of 1 to 4 is preferably employed, and s preferably ranges from 1 to 4.

$Z^1$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond; more preferably —COO—, —OCO—, or a single bond; and especially preferably a single bond.

C represents a 1,4-phenylene group of which any hydrogen atom is optionally substituted with a fluorine atom, a trans-1,4-cyclohexylene group, or a single bond; and a 1,4-phenylene group and a single bond are preferred. In the case where C does not represent a single bond but represents a ring structure, $Z^1$ preferably represents a linking group as well as a single bond; in the case where C represents a single bond, $Z^1$ is preferably a single bond.

From these viewpoints, a preferred ring structure between $Sp^1$ and $Sp^2$ in General Formula (V) is particularly as follows.

In General Formula (V), in the case where C represents a single bond and where the ring structure consists of two rings, the ring structure is preferably represented by any of Formulae (Va-1) to (Va-5), more preferably Formulae (Va-1) to (Va-3), and especially preferably Formula (Va-1).

[Chem. 19]

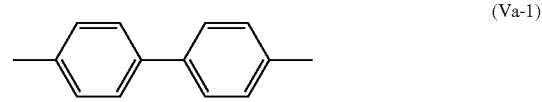

(Va-1)

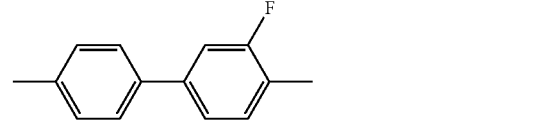

(Va-2)

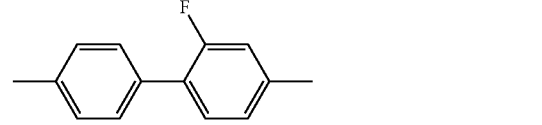

(Va-3)

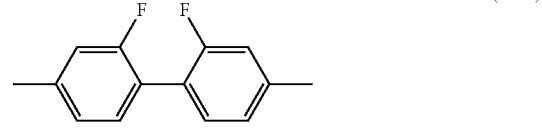

(Va-4)

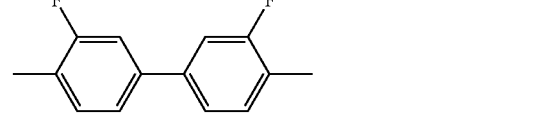

(Va-5)

(in the formulae, the two ends of each structure are bonded to $Sp^1$ and $Sp^2$, respectively)

Polymerizable compounds having such skeletons enable uneven display to be reduced or eliminated in PSA liquid crystal display devices because such polymerizable compounds have optimum alignment regulating force after being polymerized and thus produce a good alignment state.

Accordingly, the polymerizable monomer is especially preferably any of compounds represented by General Formulae (V-1) to (V-4), and most preferably the compound represented by General Formula (V-2).

[Chem. 20]

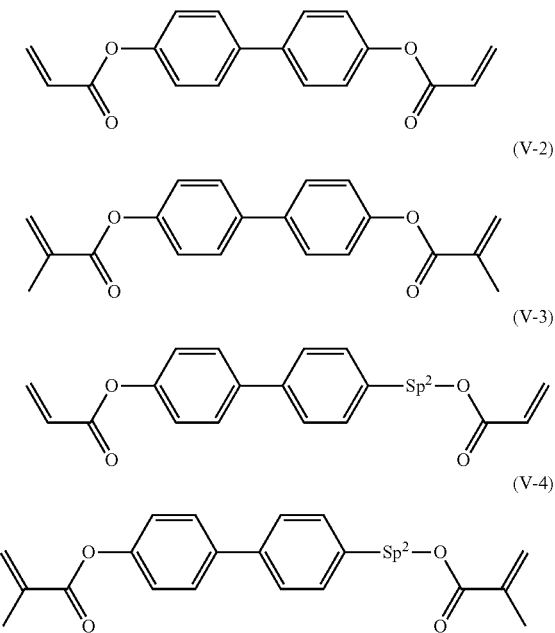

(in the formulae, Sp² represents an alkylene group having 2 to 5 carbon atoms)

In the case where the polymerizable monomer is added, polymerization is carried out even without a polymerization initiator; however, a polymerization initiator may be used to promote the polymerization. Examples of the polymerization initiator include benzoin ethers, benzophenones, acetophenones, benzyl ketals, and acyl phosphine oxides. In order to enhance storage stability, a stabilizer may be added. Examples of usable stabilizers include hydroquinones, hydroquinone monoalkylethers, tertiary butylcatechol, pyrogallols, thiophenols, nitro compounds, β-naphthylamines, β-naphthols, and nitroso compounds.

The polymerizable-monomer-containing liquid crystal layer is useful in liquid crystal display devices, and especially useful in liquid crystal display devices driven by an active matrix; hence, such a liquid crystal layer can be used in liquid crystal display devices of a PSA mode, PSVA mode, VA mode, IPS mode, and ECB mode.

The polymerizable monomer contained in the polymerizable-monomer-containing liquid crystal layer is polymerized by being irradiated with ultraviolet with the result that liquid crystal molecules can be aligned, and such a liquid crystal layer is used in liquid crystal display devices in which the birefringence of the liquid crystal composition is utilized to control the amount of light that is to be transmitted. Such a liquid crystal layer is useful in liquid crystal display devices, such as an AM-LCD (active matrix liquid crystal display device), a TN (twisted nematic liquid crystal display device), an STN-LCD (super twisted nematic liquid crystal display device), an OCB-LCD, and an IPS-LCD (in-plane switching liquid crystal display device), particularly useful in an AM-LCD, and can be used in transmissive or reflective liquid crystal display devices.

(Color Filter)

The color filter used in the present invention contains an organic pigment, so that light having a specific wavelength can be absorbed and that light having another specific wavelength can be transmitted.

Any substrate can be used provided that light can pass through it, and a proper substrate may be selected on the basis of application. Examples thereof include substrates made of resins or inorganic materials, and a glass substrate is particularly preferred.

The color filter includes the substrate and the organic pigment, and the organic pigment may be dispersed in the substrate or present only on the surface of the substrate. The organic pigment may be dispersed in resin, and the resin may be formed into a shape; alternatively, the organic pigment may be dispersed in the form of a coating on the surface of the substrate.

The color filter can have any shape; arbitrary shapes including a plate, a film, a lens, a sphere, a shape partially having a three-dimensional roughness, and a shape having a fine uneven surface profile can be employed.

[Organic Pigment]

Examples of the organic pigment used in the present invention include phthalocyanine pigments, insoluble azo pigments, azo lake pigments, anthraquinone pigments, quinacridone pigments, dioxazine pigments, diketopyrrolopyrrole pigments, anthrapyrimidine pigments, anthanthrone pigments, indanthrone pigments, flavanthrone pigments, perinone pigments, perylene pigments, thioindigo pigments, triarylmethane pigments, isoindolinone pigments, isoindolin pigments, metal complex pigments, quinophthalone pigments, and dye lake pigments.

A proper pigment can be determined on the basis of the wavelength of light to be transmitted.

In the case of a red color filter, a red pigment can be used; specifically, pigments having a high light transmittance for light with a wavelength ranging from 600 nm to 700 nm can be employed. Such pigments can be used alone or in combination. Specific examples of a preferred pigment include C.I. Pigment Red 81, 122, 177, 209, 242, and 254 and Pigment Violet 19. Among these, C.I. Pigment Red 254 is particularly preferred and has a maximum light transmittance for light having a wavelength from 660 nm to 700 nm.

The red color filter can further contain at least one organic pigment selected from the group consisting of C.I. Pigment Orange 38 and 71 and C.I. Pigment Yellow 150, 215, 185, 138, and 139 for toning.

In the case of a green color filter, a green pigment can be used; in particular, pigments having a maximum light transmittance for light having a wavelength from 500 nm to 600 nm can be employed. Such pigments can be used alone or in combination. Specific examples of a preferred pigment include C.I. Pigment Green 7, 36, and 58. Among these, C.I. Pigment Green 58 is particularly preferred and has a maximum light transmittance for light having a wavelength from 510 nm to 550 nm.

The green color filter can further contain at least one organic pigment selected from the group consisting of C.I. Pigment Yellow 150, 215, 185, and 138 for toning.

In the case of a blue color filter, a blue pigment can be used; in particular, pigments having a maximum light transmittance for light having a wavelength from 400 nm to 500 nm can be employed. Such pigments can be used alone or in combination. Specific examples of a preferred pigment include C.I. Pigment Blue 15:3 and 15:6 and triarylmethane pigments such as C.I. Pigment Blue 1 and/or a triarylmethane pigment represented by General Formula (1) (in the formula, $R^1$ to $R^6$ each independently represent a hydrogen atom, an optionally substituted alkyl group having 1 to 8 carbon atoms, or an optionally substituted aryl group; in the case where $R^1$ to $R^6$ are each an optionally substituted alkyl group, $R^1$, $R^3$, and $R^5$ may be combined to adjoining $R^2$, $R^4$, and $R^6$ to form ring structures, respectively; $X^1$ and $X^2$ each independently represent a hydrogen atom, a halogen atom, or an optionally substituted alkyl group having 1 to 8 carbon atoms; Z— is at least one anion selected from heteropolyoxometalate anion represented by $(P_2Mo_yW_{18-y}O_{62})6-/6$ in which y is an integer of 0, 1, 2, or 3, heteropolyoxometalate anion represented by $(SiMoW_{11}O_{40})4-/4$, and lacunary Dawson-type phosphotungstic acid heteropolyoxometalate anion; and in the case where one molecule has multiple structures represented by General Formula (1), these structures may be the same as or different from each other).

In General Formula (1), $R^1$ to $R^6$ may be the same as or different from each other. Hence, —NRR moieties (RR represents any of combinations of $R^1$ and $R^2$, $R^3$ and $R^4$, and $R^5$ and $R^6$) may be symmetric or asymmetric.

C.I. Pigment Blue 15:3 has a maximum light transmittance for light having a wavelength from 440 nm to 480 nm, C.I. Pigment Blue 15:6 has a maximum light transmittance for light having a wavelength from 430 nm to 470 nm, and the triarylmethane pigment has a maximum light transmittance for light having a wavelength from 410 nm to 450 nm.

The blue color filter can further contain at least one organic pigment selected from the group consisting of C.I. Pigment Violet 23 and 37 and C.I. Pigment Blue 15, 15:1, 15:2, and 15:4 for toning.

[Chem. 21]

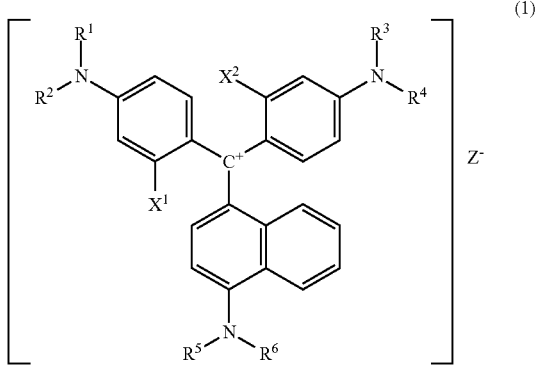

(1)

In the case where the color filter can be produced by a technique in which pigment dispersions prepared from the above-mentioned organic pigments are applied onto substrates, such pigment dispersions may contain known pigment dispersants and solvents in addition to the organic pigments. Dispersion liquids in which the organic pigments have been preliminarily dispersed in solvents or pigment dispersants are prepared, and the prepared dispersion liquids can be applied to a substrate; examples of a technique for the application include spin coating, roller coating, an ink jet technique, spray coating, and printing.

The organic pigments applied to the substrate are dried, and production of the color filter may be completed in this state. In the case where the pigment dispersions contain curable resins, curing by exposure to heat or an active energy ray may be carried out to complete the production of the color filter. Furthermore, an additional step may be carried out, in which a volatile component in the coating is removed by heating with a heater, such as a hot plate or an oven, at 100 to 280° C. for a predetermined time (post-baking).

[State of Pigment Particles in Color Filter]

In the color filter used in the present invention, the slope parameter that can be the index of the degree of the agglomeration of an organic pigment is not more than 2. In the color filter, the state of the organic pigment that is present in the completed color filter has the largest effect on a reduction in defective display such as voids, uneven alignment, and screen burn-in. Defining the slope parameter, which can be the index of the degree of the agglomeration of the organic pigment particles that are present in the completed color filter, enables the color filter to eliminate the above-mentioned defective display. The smaller the slope parameter is, the smaller the degree of the agglomeration is; hence, the slope parameter is preferably 1.5 or less.

In the organic pigments, coarse particles having a particle size greater than 1000 nm have an adverse effect on a display state and are therefore not preferred; hence, its content needs to be not more than 1%. The content may be measured by observing the surface of the color filter with, for instance, an appropriate optical microscope.

[Ultra-Small Angle X-Ray Scattering Profile]

The slope parameter that indicates the degree of the agglomeration of an organic pigment can be calculated through analysis of an ultra-small angle X-ray scattering profile obtained by ultra-small angle X-ray scattering.

In particular, the calculation of the slope parameter includes the following steps: obtaining the ultra-small angle X-ray scattering profile of an organic pigment (measured scattering profile) on the basis of ultra-small angle X-ray scattering (step (A)), calculating the point of curvature on the scattering profile (step (B)), determining an analysis region (c1) defined from the point of curvature (step (C)), and calculating the slope parameter in the analysis region c1 (step (D)).

In the ultra-small angle X-ray scattering (USAXS), diffuse scattering and diffraction caused not only in a small angle region at a scattering angle of $0.1<(2\theta)<10°$ but also in an ultra-small angle region at a scattering angle of $0°<(2\theta)\leq0.1°$ are simultaneously observed. In small angle X-ray scattering, in the case where a substance has regions each having a size approximately from 1 to 100 nm and a different electron density, the diffuse scattering of an X-ray can be observed on the basis of such a difference in the electron density; in the ultra-small angle X-ray scattering, in the case where a substance has regions each having a size approximately from 1 to 1000 nm and a different electron density, the diffuse scattering of an X-ray can be observed on the basis of such a difference in the electron density. The slope parameter of a measuring object is determined on the basis of the scattering angle and scattering intensity thereof.

The main techniques which enable the ultra-small angle X-ray scattering are two techniques: use of an advanced technology for controlling an optical system, in which the width of the wavelength of an incident X-ray and a beam diameter are narrowed to reduce the background scattering intensity in an ultra-small angle region; and accurate measurement of part having a small scattering angle with a distance between the sample and a detector, so-called camera length, being elongated as much as possible. The former is mainly employed for ultra-small angle X-ray scattering with small equipment used in a laboratory.

A program usable for obtaining a slope parameter from an small-angle X-ray scattering profile can be a general program which can be used for differential calculus or a data interpolation process; for example, a program such as MATLAB (commercially available from The MathWorks, Inc.) is preferably used. In fitting by a least squares method for calculating the slope parameter, a program such as Excel (commercially available from Microsoft Corporation) can be used in addition to the above-mentioned program.

In measurement of the scattering profile of the organic pigment, sufficient scattering intensity can be measured when the brightness of an incident X-ray in an X-ray scattering apparatus is not less than $10^6$ Brilliance (photons/sec/mm²/mrad²/0.1% bandwidth), and preferably not less than $10^7$ Brilliance. In the case where the substrate of a coating is, for example, glass, an X-ray is easily absorbed, and thus the brightness of the incident X-ray is significantly insufficient; hence, in order to accurately measure the scattering profile of the organic pigment, the brightness of the incident X-ray is preferably not less than $10^{16}$ Brilliance, and more preferably not less than $10^{18}$ Brilliance.

In order to use a high-brightness X-ray source with not less than $10^{16}$ Brilliance, for instance, the light sources of a large-scale synchrotron radiation facilities, such as SPring-8 in Hyogo Prefecture and Photon Factory in Ibaraki Prefecture, can be used. In such facilities, an appropriate camera length can be determined to select the intended scattering region. Moreover, several types of metal absorber plates called attenuator can be used on the incident light side in order to produce sufficient scattering intensity, to prevent a sample from being damaged, and to protect a detector; and the exposure time is properly adjusted to be approximately between 0.5 and 60 seconds, so that measurement conditions suitable for a wide range of purposes can be selected. Examples of the attenuator include thin films made of Au, Ag, or molybdenum.

In a specific process of the measurement, in the step (A), a color filter is attached to, for example, the sample holder or sample stage of a commercially available X-ray diffractometer, and then scattering intensity I is measured at each of scattering angles (2θ) less than 10° to obtain a small angle X-ray scattering profile (measured scattering profile).

In an ultra-small angle scattering apparatus which is used for analyzing a coating on a glass substrate by synchrotron radiation, white light taken from a circular accelerator called a storage ring is monochromatized with a double crystal monochromator in order to employ a beam having a wavelength in an X-ray region (e.g., 1 Å) as a source, the beam is radiated to the coating attached to a sample stage, a two-dimensional detector is exposed to a scattered light for a predetermined time, the obtained scattering profile that is concentric circular is averaged to be one dimensional, the resulting profile is converted to scattering intensities I corresponding to scattering angles (2θ) less than 10°, thereby obtaining a small angle X-ray scattering profile (measured scattering profile). This procedure is defined as the step (A).

In the step (B), a point of curvature is calculated in a region of a scattering vector $q<0.5$ [nm⁻¹] or lower in the measured scattering profile. The term "point of curvature" herein refers to the curved part of an upwardly convex curve of a scattering profile shown in a graph as the double logarithmic plot of a scattering vector q and scattering intensity I.

The values of the scattering vector q and scattering intensity I are converted into logarithms Log(q) and Log(I) with a base of 10, respectively. For the sake of convenience, it is assumed that a scattering profile based on the function y=f(x) shown in a graph having X and y coordinates is represented by the function Log(I)=F(Log(q)). Furthermore, when Log(q)=Q and Log(I)=J are defined, the scattering profile is described as J=F(Q), which is referred to as a scattering profile function.

The scattering profile function represented by J=F(Q) is smoothened by a spline function; then, from the function G(Q) obtained by the smoothing, a first derivative function G'(Q)=dG(Ω)/dQ is determined. The function G(Q) obtained by the smoothing by a spline function and the first derivative function G'(Q) can be introduced by, for instance, a technique disclosed in Non-Patent Literature 1.

Then, in the first derivative function G'(Q), the minimum value G'min and its x coordinate X_gmin are determined in the direction from Q=0 to the side on which Q becomes negative. Moreover, the maximum value G'max and its x coordinate X_gmax are determined in the same direction.

Subsequently, the half value G'c=(G'max−G'min)/2 between the maximum value G'max and the minimum value G'min is obtained.

In the range of x coordinates between the X_gmax and the X_gmin, the point showing the half value G'c corresponds to the point of curvature on the initial scattering profile function F(Q). The x coordinate of the point of curvature in this case is represented by Q=$Q_0$. In terms of the scattering vector q, the x coordinate of the point of curvature on the scattering profile is represented by q=$q_0$ from the relational expression Log($q_0$)=$Q_0$.

In the step (C), the analysis region (c1) for obtaining the slope of the scattering profile is calculated. In a region in which Q is smaller than x coordinate $Q_0$ of the point of curvature, in other words, in the region of Q<$Q_0$, the part at which the first derivative function G'(Q) becomes substantially flat is defined as the analysis region c1.

In this case, in the initial scattering profile function F(Q) not subjected to the derivation, the analysis region c1 is part of the profile that can be approximated to a straight line having a certain slope.

The ends 1 and 2 of the analysis region c1 are determined so that the analysis region c1 is a region defined by the ends 1 and 2. The value of the x axis at the end 1 is Q=$Q_1$ and represented by Log(q)=Log($q_1$), and the value thereof at the end 2 is Q=$Q_2$ and represented by Log(q)=Log($q_2$).

The end 1 of the analysis region c1 is determined as follows. The difference between the maximum value G'max and the value G'($Q_1$) at a point that can be the end 1 is calculated (Δ=G'max−G'($Q_1$)). The data are reviewed in series from the x coordinate $Q_0$ of the point of curvature in the direction in which Q becomes smaller, and the first point showing the difference Δ<0.1 is determined as the end 1. At the end 1, the x coordinate is Q=$Q_1$ and q=$q_1$.

In determination of the end 2, the optimum value needs to be determined on the basis of obtained data. Specifically, in a region with small q, the effect of, for example, parasitic scattering in the vicinity of a beam stopper used in an experiment becomes strong, which enhances scattering intensity; hence, the slope of the scattering profile is changed by a factor other than the scattering derived from pigment particles. Accordingly, it is not necessarily appropriate that the end 2 is defined on the ultra-small angle region side having sufficiently small Q to make the analysis region c1 wide. In addition, defining a point close to the end 1 as the end 2 causes, for instance, the large effect of the noises of the data; hence, it eventually does not help to calculate the slope parameter in the analysis region c1 by a least squares method in the subsequent step (D).

The x coordinate of the end 2 needs to be determined from such points of view. The value of the x coordinate at the end 2 is $Q_2$=Log($q_2$). It is desirable that the preliminarily determined value of $q_1$ be used to determine the value of $q_2$ to enable the scattering profile to be approximated to a straight line as wide as possible in the range of $q_2$=$q_1$/2 to $q_1$/3.

In the step (D), the slope parameter of the scattering profile in the analysis region c1 defined by the ends 1 and 2 is calculated. In this analysis region c1, the scattering intensity I and the scattering vector q are in the relationship of $I(q) \propto q^{-d_M}$. Accordingly, the scattering profile function Log(I)=F(Log(q)), which represents a scattering profile on the basis of the double logarithmic plot, is represented by Equation (1) as a theoretical correlation function in the analysis region c1.

$$\text{Log}(I) = -d_M \times \text{Log}(q) + C \quad (C: \text{constant}) \qquad (1)$$

In Equation (1), $d_M$ is the slope parameter in the analysis region c1, and C is a constant.

The function fitting of the theoretical correlation function represented by Equation (1) to the scattering profile in the analysis region c1 is performed by a least squares method to calculate the slope parameter $d_M$.

The variables in the functional fitting are the above-mentioned $d_M$ and C. The function fitting is carried out such that the residual sum of squares Z of the theoretical correlation function and the scattering profile function becomes minimum by a least squares method; and the smaller the residual sum of squares Z is, the higher the accuracy of the fitting is. In general, at the residual sum of squares Z of lower than 2%, the fitting may be regarded as resulting in the convergence. The residual sum of squares Z is preferably lower than 1%, and more preferably lower than 0.5%.

If the function fitting in this step does not well converge, in other words, if the minimum value of the residual sum of squares Z is not less than 2%, this means that the data in the analysis region c1 have a large variation or are greatly depart from the linear form. It is believed that one of the causes of it is that the analysis region c1 is inappropriate. In particular, it is considered that the data include unnecessary scattering contribution because the analysis region c1 is too large; in such a case, the end 2 determined in the step (C) may be adjusted to be closer to the end 1, and then the step (D) is repeated.

Another cause is assumed, in which the data of scattering intensity obtained in the case of measurement with an X-ray having an insufficient intensity have a large variation. In this case, the measurement data need to be obtained through ultra-small angle scattering in an experiment facility in which an intenser X-ray that enables the data of scattering intensity at a good S/N ratio to be obtained can be radiated.

In the case where a clear curved part cannot be found on the scattering profile, that is, in the case where the difference between the maximum value G'max and the minimum value G'min is in the relationship of ΔG'max−min<0.1, a virtual point of curvature $Q_0$ (or $q_0$) needs to be determined. If a clear curved part can be found on the scattering profile in another sample of a color filter using the same pigment, the point of curvature $Q_0$ in this sample can be employed as the point of curvature $Q_0$ in the sample with no clear curved part. If a clear curved part cannot be found on the scattering profile and a substitute $Q_0$ cannot be used, any part on the scattering profile within q<0.5 and Q<Log(0.5) can be determined as the analysis region c1. In this analysis region c1, the slope parameter $d_M$ may be determined by a least squares method.

The slope parameter $d_M$ may be called mass fractal dimensionality from a physical viewpoint; being able to accurately determine a slope parameter $d_M$ in the analysis region c1 means that the scattered light intensity I is represented by $I(q) \propto q^{-d_M}$ and follows the power law of the scattering vector q. Hence, $d_M$ does not show a value greater than or equal to 3 in principle. If $d_M$ shows a value greater than or equal to 3, this is considered to result from the above-mentioned causes of an inappropriate analysis region c1 and data having many noises; thus, after the analysis region c1 is reconsidered or the analysis is carried out again with a highly intense X-ray, the steps (A) to (D) are redone to obtain the slope parameter of the scattering profile as an analytical result.

As described above, being able to accurately determine a slope parameter $d_M$ in the analysis region c1 means that the mass fractal dimensionality has been able to be clearly determined; in principle and from a physical viewpoint, it shows that the agglomerate of the organic pigment contained in the color filter has a fractal structure having a self-similarity. The larger the slope parameter represented by $d_M$ is, the bigger the structure of agglomerate with self-similarity is, which means that the degree of agglomeration is large. Thus, the $d_M$ can be defined as the quantitative index of the degree of the agglomeration of the pigment in the color filter.

(Alignment Film)

In the liquid crystal display device of the present invention, in the case where alignment films need to be provided on the liquid crystal composition sides of the first and second substrates to align the molecules of the liquid crystal composition, the alignment films are disposed between a color filter and the liquid crystal layer in the liquid crystal display device. Each alignment film, however, has a thickness of not more than 100 nm even when the thickness is large; hence, the alignment films do not completely block the interaction between a colorant used in the color filter, such as a pigment, and a liquid crystal compound used in the liquid crystal layer.

In a liquid crystal display device in which an alignment film is not used, the interaction between a colorant used in the color filter, such as a pigment, and a liquid crystal compound used in the liquid crystal layer is larger.

The material of the alignment films can be a transparent organic material such as polyimide, polyamide, BCB (benzocyclobutene polymer), or polyvinyl alcohol; in particular, polyimide alignment films formed though imidizing of a polyamic acid synthesized from diamine such as an aliphatic or alicyclic diamine (e.g., p-phenylenediamine and 4,4'-diaminodiphenyl methane), an aliphatic or alicyclic tetracarboxylic acid anhydride such as butanetetracarboxylic acid anhydride or 2,3,5-tricarboxycyclopentyl acetic acid anhydride, and an aromatic tetracarboxylic acid anhydride such as pyromellitic acid dianhydride are preferred. In this case, rubbing is generally carried out to give an alignment function; however, in the case where each alignment film is used as, for instance, a vertical alignment film, the alignment film can be used without the alignment function being developed.

Materials usable for the alignment films may be materials in which compounds contain, for instance, a chalcone, cinnamate, cinnamoyl, or azo group. Such materials may be used in combination with another material such as polyimide or polyamide; in this case, the alignment films may be rubbed or treated by a photo-alignment technique.

In general formation of alignment films, the above-mentioned material of the alignment films is applied onto substrates by, for example, spin coating to form resin films; besides, uniaxial stretching or a Langmuir-Blodgett technique can be employed.

(Transparent Electrode)

In the liquid crystal display device of the present invention, the material of a transparent electrode can be a conductive metal oxide. Usable metal oxides are indium oxide ($In_2O_3$), tin oxide ($SnO_2$), zinc oxide (ZnO), indium tin oxide ($In_2O_3$—$SnO_2$), indium zinc oxide ($In_2O_3$—ZnO), niobium-doped titanium dioxide ($Ti_{1-x}Nb_xO_2$), fluorine-doped tin oxide, graphene nanoribbon, and metal nanowires;

among these, zinc oxide (ZnO), indium tin oxide (In$_2$O$_3$—SnO$_2$), and indium zinc oxide (In$_2$O$_3$—ZnO) are preferred. A transparent conductive film formed of any of such materials can be patterned by photo-etching or a technique involving use of a mask.

The liquid crystal display device is combined with a backlight for various applications such as liquid crystal television sets, computer monitors, mobile phones, smart-phone displays, laptops, portable information terminals, and digital signage. Examples of the back light include cold-cathode tube backlights and virtually white backlights with two peak wavelengths or backlights with three peak wavelengths; in the backlight with two or three peak wavelengths, light-emitting diodes using inorganic materials or organic EL devices are used.

EXAMPLES

Although some preferred embodiments of the present invention will now be described in detail with reference to Examples, the present invention is not limited to Examples. In compositions which will be described in Examples and Comparative Examples, the term "%" refers to "mass %".

In Examples, the following properties were measured.

T$_{ni}$: Nematic phase-isotropic liquid phase transition temperature (° C.)

Δn: Refractive index anisotropy at 25° C.

Δ∈: Dielectric anisotropy at 25° C.

η: Viscosity at 20° C. (mPa·s)

γ$_1$: Rotational viscosity at 25° C. (mPa·s)

d$_{gap}$: Gap between first and second substrates in cell (μm)

VHR: Voltage holding ratio (%) at 70° C.

(ratio, represented by %, of a measured voltage to the initially applied voltage, which was obtained as follows: a liquid crystal composition was put into a cell having a thickness of 3.5 μm, and the measurement was carried out under the conditions of an applied voltage of 5 V, a frame time of 200 ms, and a pulse width of 64 μs)

ID: Ion density at 70° C. (pC/cm$^2$)

(ion density obtained as follows: a liquid crystal composition was put into a cell having a thickness of 3.5 μm, and measurement was carried out with an MTR-1 (manufactured by TOYO Corporation) under the conditions of an applied voltage of 20 V and a frequency of 0.05 Hz)

Screen Burn-in:

In evaluation of screen burn-in in a liquid crystal display device, a certain fixed pattern was displayed in a display area for 1000 hours, and then an image was shown evenly on the whole of the screen. Then, the degree of an afterimage of the fixed pattern was visually observed, and result of the observation was evaluated on the basis of the following four criteria:

Excellent: No afterimage observed

Good: Slight afterimage observed, but acceptable

Bad: Afterimage observed, unacceptable

Poor: Afterimage observed, quite inadequate

In Examples, compounds are abbreviated as follows.

(Side Chain)

-n —C$_n$H$_{2n+1}$ linear alkyl group having n carbon atoms n- C$_n$H$_{2n+1}$— linear alkyl group having n carbon atoms —On —OC$_n$H$_{2n+1}$ linear alkoxyl group having n carbon atoms nO— C$_n$H$_{2n+1}$O— linear alkoxyl group having n carbon atoms

—V —CH=CH$_2$

V—CH$_2$=CH—

—V1 —CH=CH—CH$_3$

1V— CH$_3$—CH=CH—

-2V —CH$_2$—CH$_2$—CH=CH$_3$

V2— CH$_3$=CH—CH$_2$—CH$_2$—

-2V1 —CH$_2$—CH$_2$—CH=CH—CH$_3$

1V2-CH$_3$—CH=CH—CH$_2$—CH$_2$ (Ring Structure)

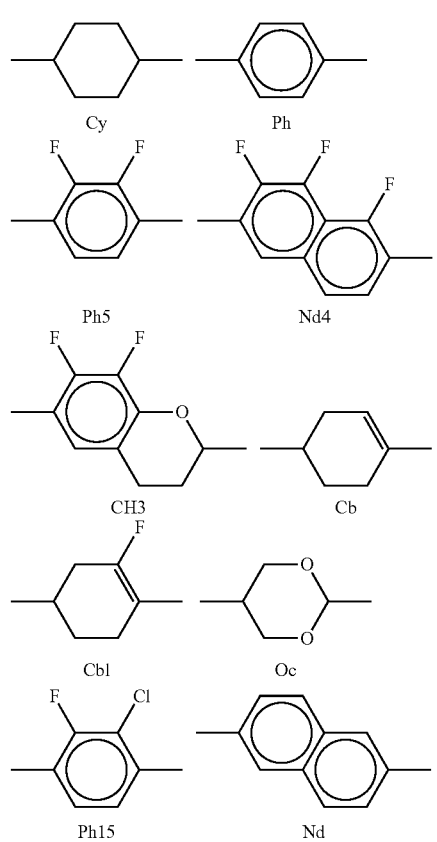

[Chem. 22]

Production of Color Filter

Preparation of Pigment Dispersion Liquid

<Synthesis Example 1> Synthesis of Copolymer a

In a nitrogen flow, 100 parts of xylene was held at 80° C.; and then a mixture of 68 parts of ethyl methacrylate, 29 parts of 2-ethylhexyl methacrylate, 3 parts of thioglycolic acid, and 0.2 parts of a polymerization initiator ("PERBUTYL (registered trademark) O" [active ingredient: t-butyl peroxy-2-ethylhexanoate, manufactured by NOF CORPORATION]) was added dropwise thereto under stirring over 4 hours. After the dropping was completed, 0.5 pats of "PERBUTYL (registered trademark) O" was added thereto every 4 hours, and the resulting product was stirred at 80° C. for 12 hours. After termination of the reaction, xylene was added thereto to adjust the nonvolatile content, thereby producing a xylene solution of a copolymer a with a 50% nonvolatile content.

<Synthesis Example 2> Synthesis of Copolymer b

In a nitrogen flow, 100 parts of xylene was held at 80° C.; and then a mixture of 66 parts of ethyl methacrylate, 28 parts of 2-ethylhexyl methacrylate, 6 parts of thioglycolic acid, and 0.3 parts of a polymerization initiator ("PERBUTYL (registered trademark) O" [active ingredient: t-butyl peroxy-2-ethylhexanoate, manufactured by NOF CORPORATION]) was added dropwise thereto under stirring over 4 hours. After the dropping was completed, 0.5 pats of "PERBUTYL (registered trademark) O" was added thereto every 4 hours, and the resulting product was stirred at 80° C. for 12 hours. After termination of the reaction, a proper amount of xylene was added thereto to adjust the nonvolatile content, thereby producing a xylene solution of a copolymer b with a 50% nonvolatile content.

<Synthesis Example 3> Synthesis of Polymer P

Into a flask equipped with a stirrer, a reflux condenser, a nitrogen inlet, and a thermometer, a mixture of 54.5 parts of xylene, 19.0 parts of the copolymer a, 38.0 parts of the copolymer b, and 7.5 parts of a 15% aqueous solution of polyallylamine ("PAA-05" manufactured by NITTO BOSEKI CO., LTD., number average molecular weight of approximately 5,000) was put and then stirred at 140° C. under a nitrogen flow in order to perform a reaction at 140° C. for 8 hours while water was distilled off with a separator and the xylene was returned to the reaction solution.

After termination of the reaction, a proper amount of xylene was added thereto to adjust the nonvolatile content, thereby producing a polymer P as a modified polyamine having a 40% nonvolatile content. The resin has a weight average molecular weight of 11000 and an amine value of 16.0 mg KOH/g.

<Production Example 1> Production of Powder Pigment 1

FASTOGEN Green A110 manufactured by DIC Corporation (C.I. Pigment Green 58, brominated chlorinated zinc phthalocyanine) was used as a powder pigment 1.

<Production Example 2> Production of Powder Pigment 2

To a mixture composed of 100 parts of the powder pigment 1 obtained in Production Example 1, 300 parts of heptane, and 10 parts of the polymer P, 300 parts of 1.25-mm zirconia beads were added. The resulting mixture was stirred for an hour at normal temperature with Paint Shaker (manufactured by Toyo Seiki Seisaku-sho, Ltd.) and then diluted with 200 parts of heptane. The zirconia beads were separated by filtration to obtain a pigment mixture liquid.

Into a separable flask equipped with a thermometer, a stirrer, a reflux condenser, and a nitrogen gas inlet, 400 parts of the pigment mixture liquid was put. Then, a solution of two parts of 2,2'-azobis(2-methylbutyronitrile) in a polymerizable monomer composition composed of five parts of methyl methacrylate and five parts of ethylene glycol dimethacrylate was added thereto. Stirring was continued at room temperature for 30 minutes, the temperature was subsequently increased to 80° C., and the reaction was continued at this temperature for 15 hours. The temperature was decreased, and then the resulting product was filtered. The obtained wet cake was dried with a hot air dryer at 100° for 5 hours and then ground with a grinder to produce a powder pigment 2.

<Production Example 3> Production of Powder Pigment 3

With a double-arm kneader, 10 parts of the powder pigment 1 obtained in Production Example 1, 100 parts of ground sodium chloride, and 10 parts of diethylene glycol were kneaded at 100° C. for 8 hours. After the kneading, 1000 parts of water at 80° C. was added thereto; and the resulting product was stirred for an hour, filtered, washed with hot water, dried, and ground to obtain a powder pigment 3.

<Production Example 4> Production of Dispersion Liquid 1

To a mixture of 5 parts of the powder pigment 1 obtained in Production Example 1, 33.3 parts of propylene glycol monomethyl ether (PGMA), and 3 parts of the polymer P, 65 parts of 0.5-mm Sepra Beads were added. The resulting mixture was stirred for four hours with Paint Shaker (manufactured by Toyo Seiki Seisaku-sho, Ltd.). The Sepra Beads were separated from the resulting liquid mixture by filtration to obtain a dispersion liquid 1.

<Production Example 5> Production of Dispersion Liquid 2

A dispersion liquid 2 was produced as in Production Example 4 except for the following changes. The powder pigment 2 replaced the powder pigment 1, and AJISPER PB821 (manufactured by Ajinomoto Fine-Techno Co., Inc.) was used in place of the polymer P; in addition, 0.1 part of quinoline was added.

<Production Example 6> Production of Dispersion Liquid 3

A dispersion liquid 3 was produced as in Production Example 5 except that pyrrole was used instead of quinoline in addition to 5 parts of the powder pigment 2, 33.3 parts of PGMA, and 3 parts of AJISPER PB821.

<Production Example 7> Production of Dispersion Liquid 4

A dispersion liquid 4 was produced as in Production Example 6 except that oxazole replaced pyrrole.

<Production Example 8> Production of Dispersion Liquid 5

A dispersion liquid 5 was produced as in Production Example 7 except that pyrrolidine replaced oxazole.

<Production Example 9> Production of Powder Pigment 4 and Dispersion Liquid 6

An ∈-copper phthalocyanine pigment (FASTOGEN Blue EP-193 manufactured by DIC Corporation) was employed as a powder pigment 4. To a mixture of 5 parts of the powder pigment 4, 33.3 parts of propylene glycol monomethyl ether (PGMA), and 3 parts of the polymer P, 65 parts of 0.5-mm Sepra Beads were added. The resulting mixture was stirred for four hours with Paint Shaker (manufactured by Toyo Seiki Seisaku-sho, Ltd.). The Sepra Beads were separated from the resulting liquid mixture by filtration to obtain a dispersion liquid 6.

<Production Example 10> Production of Powder Pigment 5 and Dispersion Liquid 7

A diketopyrrolopyrrole red pigment PR254 ("IRGAPHOR Red B-CF" manufactured by Ciba Specialty Chemicals; R-1) was employed as a powder pigment 5. To a mixture of 5 parts of the powder pigment 5, 33.3 parts of propylene glycol monomethyl ether (PGMA), and 3 parts of the polymer P, 65 parts of 0.5-mm Sepra Beads were added. The resulting mixture was stirred for four hours with Paint Shaker (manufactured by Toyo Seiki Seisaku-sho, Ltd.). The Sepra Beads were separated from the resulting liquid mixture by filtration to obtain a dispersion liquid 7.

Production of Color Filter

<Production Example 11> Production of Color Filter 1

Figure 3:
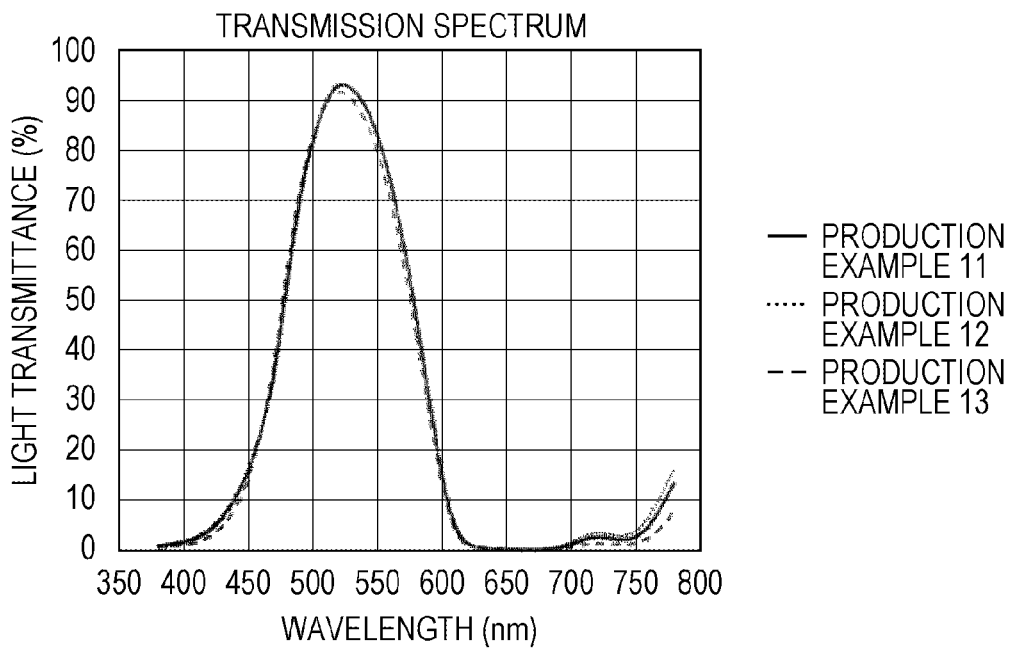
FIG. 3 illustrates transmission spectra in color filters.

A cover glass (borosilicate cover glass manufactured by TGK) was placed on a spin coater (Opticoat MS-A100 manufactured by MIKASA CO., LTD), and 1.5 ml of the dispersion liquid 1 obtained in Production Example 4 was applied thereto at 600 rpm. The obtained coating product was dried in a thermostatic oven at 90° C. for 3 minutes and then heated at 230° C. for 3 hours to produce a color filter 1. The color filter 1 had a maximum light transmittance for light having a wavelength of 523 nm. FIG. 3 illustrates the transmission spectrum therein.

[Analysis of Color Filter 1 by USAXS]

The color filter was fixed to a sample holder made of aluminum. Then, the holder was attached to a sample stage used for transmission measurement. Measurement by ultra-small angle X-ray scattering and calculation of a slope parameter were carried out under the following conditions. Table 1 shows results thereof.

Analytical equipment and an analytical technique were as follows.
Analytical Equipment: Large-scale high-brightness synchrotron radiation facility: a beam line owned by Frontier Soft Matter Beamline Consortium in SPring-8: BL03XU, second hatch
Analytical Mode: Ultra-small angle X-ray scattering (USAXS)
Analytical conditions: wavelength of 0.1 nm, camera length of 6 m, beam spot size of 140 μm×80 μm, no attenuator, exposure time of 30 seconds, and 2θ=0.01 to 1.5° Analytical Software: Fit2D for imaging of two-dimensional data and for conversion into a one-dimensional scattering profile (software obtained from the website of European Synchrotron Radiation Facility [http://www.esrf.eu/computing/scientific/FIT2D/])

The differential calculus of a scattering profile and analysis of a smoothing process were performed with software MATLAB (commercially available from The MathWorks, Inc.). Then, calculation of a point of curvature and determination of an analysis region were performed with software Excel (commercially available from Microsoft Corporation); through these steps, a slope parameter was obtained. Value of Z: within 2% for the purpose of judging linearity <Production Example 12> Production of Color Filter 2

A color filter 2 was produced as in Production Example 11 except that the dispersion liquid 2 was used instead of the dispersion liquid 1. The color filter 2 had a maximum light transmittance for light having a wavelength of 522 nm. FIG. 3 illustrates the transmission spectrum therein. The color filter 2 was subjected to the measurement by ultra-small angle X-ray scattering and the calculation of a slope parameter as in Production Example 11, and Table 1 shows results thereof.

<Production Example 13> Production of Color Filter 3

A color filter 3 was produced as in Production Example 11 except that the dispersion liquid 3 was used instead of the dispersion liquid 1. The color filter 3 had a maximum light transmittance for light having a wavelength of 523 nm. FIG. 3 illustrates the transmission spectrum therein. The color filter 3 was subjected to the measurement by ultra-small angle X-ray scattering and the calculation of a slope parameter as in Production Example 11, and Table 1 shows results thereof.

<Production Example 14> Production of Color Filter 4

Figure 4:
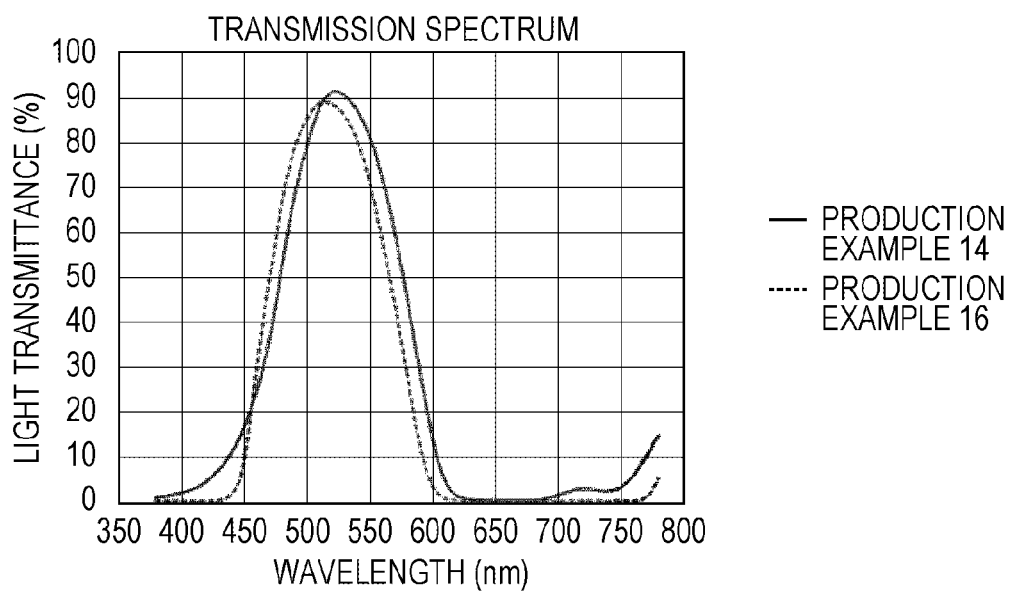
FIG. 4 illustrates transmission spectra in color filters.

A color filter 4 was produced as in Production Example 11 except that the dispersion liquid 4 was used instead of the dispersion liquid 1. The color filter 4 had a maximum light transmittance for light having a wavelength of 523 nm. FIG. 4 illustrates the transmission spectrum therein. The color filter 4 was subjected to the measurement by ultra-small angle X-ray scattering and the calculation of a slope parameter as in Production Example 11, and Table 1 shows results thereof.

<Production Example 15> Production of Color Filter 5

A color filter 5 was produced as in Production Example 11 except that the dispersion liquid 5 was used instead of the dispersion liquid 1. The color filter 5 was subjected to the measurement by ultra-small angle X-ray scattering and the calculation of a slope parameter as in Production Example 11, and Table 1 shows results thereof.

<Production Example 16> Production of Color Filter 6

A cover glass (borosilicate cover glass manufactured by TGK) was placed on a spin coater (Opticoat MS-A100 manufactured by MIKASA CO., LTD), and 1.5 ml of the dispersion liquid 3 obtained in Production Example 6 was applied thereto at 600 rpm. The obtained coating product was dried in a thermostatic oven at 90° C. for 3 minutes to produce a color filter 6. The color filter 6 had a maximum light transmittance for light having a wavelength of 515 nm. FIG. 4 illustrates the transmission spectrum therein. The color filter 6 was subjected to the measurement by ultra-small angle X-ray scattering and the calculation of a slope parameter as in Production Example 11, and Table 1 shows results thereof.

<Production Example 17> Production of Color Filter 7

A color filter 7 was produced as in Production Example 11 except that the dispersion liquid 6 was used instead of the dispersion liquid 1. The color filter 7 had a maximum light transmittance for light having a wavelength of 435 nm. The color filter 7 was subjected to the measurement by ultra-small angle X-ray scattering and the calculation of a slope parameter as in Production Example 11, and Table 1 shows results thereof.

<Production Example 18> Production of Color Filter 8

A color filter 8 was produced as in Production Example 16 except that the dispersion liquid 7 obtained in Production Example 10 was used instead of the dispersion liquid 3 obtained in Production Example 6. The color filter 8 had a maximum light transmittance for light having a wavelength of 435 nm. The color filter 8 was subjected to the measurement by ultra-small angle X-ray scattering and the calculation of a slope parameter as in Production Example 11, and Table 1 shows results thereof.

<Production Example 19> Production of Color Filter 9

A color filter 9 was produced as in Production Example 11 except that the dispersion liquid 7 was used instead of the dispersion liquid 1. The color filter 9 was subjected to the measurement by ultra-small angle X-ray scattering and the calculation of a slope parameter as in Production Example 11, and Table 1 shows results thereof.

<Production Example 20> Production of Color Filter 10

A color filter 10 was produced as in Production Example 16 except that the dispersion liquid 7 obtained in Production Example 10 was used instead of the dispersion liquid 3 obtained in Production Example 6. The color filter 10 was subjected to the measurement by ultra-small angle X-ray scattering and the calculation of a slope parameter as in Production Example 11, and Table 1 shows results thereof.

Examples 1 to 7

Electrodes corresponding to first and second substrates were formed, vertical alignment films were formed on the facing surfaces thereof, the alignment films were slightly rubbed to form a VA cell, and then a liquid crystal composition 1 shown in Table 2 was placed between the first and second substrates. Then, the color filters 1 to 5, 7, and 9 shown in Table 1 were used to produce liquid crystal display devices of Examples 1 to 7 ($d_{gap}$=3.5 μm and alignment film SE-5300). The VHRs and ID of the produced liquid crystal display devices were measured. The liquid crystal display devices were subjected to the evaluation of screen burn-in. Table 3 shows results of the measurement and evaluation.

TABLE 1

| Color filter No. | Analysis region c1 of scattering profile | | Point of curvature q0 [nm$^{-1}$] | Slope parameter |
|---|---|---|---|---|
| | End 2 (q2[nm$^{-1}$]) | End 1 (q1[nm$^{-1}$]) | | |
| Color filter 1 | 0.08 | 0.17 | 0.245 | 0.85 |
| Color filter 2 | 0.07 | 0.14 | 0.219 | 0.78 |
| Color filter 3 | 0.08 | 0.16 | 0.251 | 1,24 |
| Color filter 4 | 0.07 | 0.14 | 0.245 | 1.25 |
| Color filter 5 | 0.10 | 0.19 | 0.245 | 1.62 |
| Color filter 6 | 0.10 | 0.19 | 0.269 | 2.14 |
| Color filter 7 | 0.08 | 0.16 | 0.248 | 0.95 |
| Color filter 8 | 0.08 | 0.16 | 0.270 | 2.10 |
| Color filter 9 | 0.07 | 0.15 | 0.250 | 1.11 |
| Color filter 10 | 0.08 | 0.16 | 0.267 | 2.18 |

TABLE 2

| Liquid crystal composition 1 | |
|---|---|
| $T_{Ni}$/° C. | 81.0 |
| Δn | 0.103 |
| Δε | −2.9 |
| η/mPa · s | 20.3 |
| $γ_1$/mPa · s | 112 |
| $γ_1$/Δn$^2$ × 10$^{-2}$ | 105 |
| 3-Cy-Cy-2 | 24% |
| 3-Cy-Cy-4 | 10% |
| 3-Cy-Cy-5 | 5% |
| 3-Cy-Ph-O1 | 2% |
| 3-Cy-Ph5-O2 | 13% |
| 2-Cy-Ph-Ph5-O2 | 9% |
| 3-Cy-Ph-Ph5-O2 | 9% |
| 3-Cy-Cy-Ph5-O3 | 5% |
| 4-Cy-Cy-Ph5-O2 | 6% |
| 5-Cy-Cy-Ph5-O2 | 5% |
| 3-Ph-Ph5-Ph-2 | 6% |
| 4-Ph-Ph5-Ph-2 | 6% |

TABLE 3

| | Example 1 | Example 2 | Example 3 | Example 4 | Example 5 | Example 6 | Example 7 |
|---|---|---|---|---|---|---|---|
| Liquid crystal composition | Liquid crystal composition 1 | Liquid crystal composition 1 | Liquid crystal composition 1 | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 | Color filter 5 | Color filter 7 | Color filter 9 |
| VHR | 99.5 | 99.6 | 99.3 | 99.3 | 99.1 | 99.4 | 99.4 |
| ID | 20 | 15 | 40 | 39 | 58 | 28 | 32 |
| Screen burn-in | Excellent | Excellent | Excellent | Excellent | Good | Excellent | Excellent |

In the liquid crystal composition 1, the temperature range of the liquid crystal phase was 81° C., which was practical for a liquid crystal composition used in TV; in addition, the liquid crystal composition 1 had a dielectric anisotropy with a large absolute value, low viscosity, and proper Δn.

Each of the liquid crystal display devices of Examples 1 to 7 had a high VHR and small ID. Furthermore, in the evaluation of screen burn-in, no afterimage was observed, or an acceptable degree of slight afterimage was observed, if any.

Examples 8 to 21

As in Example 1, liquid crystal compositions shown in Table 4 were individually placed between the substrates, the color filters 1 to 5, 7, and 9 shown in Table 1 were used to produce liquid crystal display devices of Examples 8 to 21; and the VHRs and ID thereof were measured. The liquid crystal display devices were subjected to the evaluation of screen burn-in. Tables 5 and 6 show results of the measurement and evaluation.

TABLE 4

| Liquid crystal composition 2 | | Liquid crystal composition 3 | |
|---|---|---|---|
| $T_{NI}/°$ C. | 76.0 | $T_{NI}/°$ C. | 84.8 |
| Δn | 0.103 | Δn | 0.103 |
| Δε | −2.9 | Δε | −2.9 |
| η/mPa · s | 19.8 | η/mPa · s | 21.4 |

TABLE 4-continued

| Liquid crystal composition 2 | | Liquid crystal composition 3 | |
|---|---|---|---|
| $γ_1$/mPa · s | 110 | $γ_1$/mPa · s | 119 |
| $γ_1/Δn^2 × 10^{-2}$ | 103 | $γ_1/Δn^2 × 10^{-2}$ | 112 |
| 3-Cy-Cy-2 | 24% | 3-Cy-Cy-2 | 24% |
| 3-Cy-Cy-4 | 10% | 3-Cy-Cy-4 | 11% |
| 3-Cy-Ph-O1 | 7% | 3-Cy-Ph5-O2 | 12% |
| 3-Cy-Ph5-O2 | 14% | 2-Cy-Ph-Ph5-O2 | 5% |
| 2-Cy-Ph-Ph5-O2 | 7% | 3-Cy-Ph-Ph5-O2 | 6% |
| 3-Cy-Ph-Ph5-O2 | 9% | 3-Cy-Ph-Ph5-O3 | 8% |
| 3-Cy-Cy-Ph5-O3 | 5% | 4-Cy-Cy-Ph5-O2 | 8% |
| 4-Cy-Cy-Ph5-O2 | 7% | 5-Cy-Cy-Ph5-O2 | 8% |
| 5-Cy-Cy-Ph5-O2 | 5% | 3-Ph-Ph5-Ph-2 | 6% |
| 3-Ph-Ph5-Ph-2 | 6% | 4-Ph-Ph5-Ph-2 | 6% |
| 4-Ph-Ph5-Ph-2 | 6% | 5-Ph-Ph-1 | 3% |
| | | 3-Cy-Cy-Ph-1 | 3% |

TABLE 5

| | Example 8 | Example 9 | Example 10 | Example 11 | Example 12 | Example 13 | Example 14 |
|---|---|---|---|---|---|---|---|
| Liquid crystal composition | Liquid crystal composition 2 | Liquid crystal composition 2 | Liquid crystal composition 2 | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 | Color filter 5 | Color filter 7 | Color filter 9 |
| VHR | 99.6 | 99.7 | 99.5 | 99.5 | 99.3 | 99.6 | 99.5 |
| ID | 17 | 13 | 28 | 29 | 43 | 21 | 25 |
| Screen burn-in | Excellent | Excellent | Excellent | Excellent | Excellent | Excellent | Excellent |

TABLE 6

| | Example 15 | Example 16 | Example 17 | Example 18 | Example 19 | Example 20 | Example 21 |
|---|---|---|---|---|---|---|---|
| Liquid crystal composition | Liquid crystal composition 3 | Liquid crystal composition 3 | Liquid crystal composition 3 | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 | Color filter 5 | Color filter 7 | Color filter 9 |
| VHR | 99.6 | 99.6 | 99.3 | 99.3 | 99.1 | 99.4 | 99.4 |
| ID | 24 | 19 | 42 | 44 | 63 | 28 | 36 |
| Screen burn-in | Excellent | Excellent | Excellent | Good | Good | Excellent | Excellent |

The liquid crystal display devices of Examples 8 to 21 each had a high VHR and small ID. Furthermore, in the evaluation of screen burn-in, no afterimage was observed, or an acceptable degree of slight afterimage was observed, if any.

Examples 22 to 42

As in Example 1, liquid crystal compositions shown in Table 7 were individually placed between the substrates, the color filters 1 to 5, 7, and 9 shown in Table 1 were used to produce liquid crystal display devices of Examples 22 and 42; and the VHRs and ID thereof were measured. The liquid crystal display devices were subjected to the evaluation of screen burn-in. Tables 8 to 10 show results of the measurement and evaluation.

TABLE 7

| Liquid crystal composition 4 | | Liquid crystal composition 5 | | Liquid crystal composition 6 | |
|---|---|---|---|---|---|
| $T_{NI}/°C$ | 74.9 | $T_{NI}/°C$ | 80.2 | $T_{NI}/°C$ | 85.7 |
| $\Delta n$ | 0.102 | $\Delta n$ | 0.105 | $\Delta n$ | 0.104 |
| $\Delta \varepsilon$ | −2.9 | $\Delta \varepsilon$ | −2.9 | $\Delta \varepsilon$ | −3.0 |
| $\eta/mPa \cdot s$ | 21.1 | $\eta/mPa \cdot s$ | 22.7 | $\eta/mPa \cdot s$ | 22.9 |
| $\gamma_1/mPa \cdot s$ | 116 | $\gamma_1/mPa \cdot s$ | 124 | $\gamma_1/mPa \cdot s$ | 126 |
| $\gamma_1/\Delta n^2 \times 10^{-2}$ | 111 | $\gamma_1/\Delta n^2 \times 10^{-2}$ | 112 | $\gamma_1/\Delta n^2 \times 10^{-2}$ | 116 |
| 3-Cy-Cy-2 | 22% | 3-Cy-Cy-2 | 20% | 3-Cy-Cy-2 | 20% |
| 3-Cy-Cy-4 | 11% | 3-Cy-Cy-4 | 10% | 3-Cy-Cy-4 | 10% |
| 3-Cy-Ph5-O2 | 7% | 3-Cy-Ph5-O2 | 7% | 3-Cy-Ph5-O2 | 7% |
| 3-Cy-Ph5-O4 | 8% | 3-Cy-Ph5-O4 | 7% | 3-Cy-Ph5-O4 | 7% |
| 2-Cy-Ph-Ph5-O2 | 6% | 2-Cy-Ph-Ph5-O2 | 6% | 2-Cy-Ph-Ph5-O2 | 6% |
| 3-Cy-Ph-Ph5-O2 | 7% | 3-Cy-Ph-Ph5-O2 | 7% | 3-Cy-Ph-Ph5-O2 | 7% |
| 3-Cy-Cy-Ph5-O3 | 7% | 3-Cy-Cy-Ph5-O3 | 7% | 3-Cy-Cy-Ph5-O3 | 7% |
| 4-Cy-Cy-Ph5-O2 | 7% | 4-Cy-Cy-Ph5-O2 | 8% | 4-Cy-Cy-Ph5-O2 | 8% |
| 5-Cy-Cy-Ph5-O2 | 7% | 5-Cy-Cy-Ph5-O2 | 7% | 5-Cy-Cy-Ph5-O2 | 7% |
| 3-Ph-Ph5-Ph-2 | 4% | 3-Ph-Ph5-Ph-2 | 4% | 3-Ph-Ph5-Ph-2 | 4% |
| 4-Ph-Ph5-Ph-2 | 4% | 4-Ph-Ph5-Ph-2 | 4% | 4-Ph-Ph5-Ph-2 | 4% |
| 5-Ph-Ph-1 | 8% | 5-Ph-Ph-1 | 8% | 5-Ph-Ph-1 | 5% |
| 3-Cy-Cy-Ph-1 | 2% | 3-Cy-Cy-Ph-1 | 5% | 3-Cy-Cy-Ph-1 | 8% |

TABLE 8

| | Example 22 | Example 23 | Example 24 | Example 25 | Example 26 | Example 27 | Example 28 |
|---|---|---|---|---|---|---|---|
| Liquid crystal composition | Liquid crystal composition 4 | Liquid crystal composition 4 | Liquid crystal composition 4 | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 | Color filter 5 | Color filter 7 | Color filter 9 |
| VHR | 99.6 | 99.7 | 99.4 | 99.4 | 99.2 | 99.5 | 99.5 |
| ID | 19 | 16 | 39 | 40 | 59 | 25 | 31 |
| Screen burn-in | Excellent | Excellent | Good | Good | Good | Excellent | Excellent |

TABLE 9

| | Example 29 | Example 30 | Example 31 | Example 32 | Example 33 | Example 34 | Example 35 |
|---|---|---|---|---|---|---|---|
| Liquid crystal composition | Liquid crystal composition 5 | Liquid crystal composition 5 | Liquid crystal composition 5 | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 | Color filter 5 | Color filter 7 | Color filter 9 |
| VHR | 99.7 | 99.8 | 99.5 | 99.5 | 99.3 | 99.6 | 99.6 |
| ID | 15 | 12 | 30 | 27 | 44 | 18 | 22 |
| Screen burn-in | Excellent | Excellent | Excellent | Excellent | Excellent | Excellent | Excellent |

TABLE 10

| | Example 36 | Example 37 | Example 38 | Example 39 | Example 40 | Example 41 | Example 42 |
|---|---|---|---|---|---|---|---|
| Liquid crystal composition | Liquid crystal composition 6 | Liquid crystal composition 6 | Liquid crystal composition 6 | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 | Color filter 5 | Color filter 7 | Color filter 9 |
| VHR | 99.7 | 99.7 | 99.4 | 99.3 | 99.2 | 99.5 | 99.5 |
| ID | 25 | 18 | 43 | 41 | 52 | 29 | 35 |
| Screen burn-in | Excellent | Excellent | Excellent | Excellent | Good | Excellent | Excellent |

The liquid crystal display devices of Examples 22 to 42 each had a high VHR and small ID. Furthermore, in the evaluation of screen burn-in, no afterimage was observed, or an acceptable degree of slight afterimage was observed, if any.

Examples 43 to 63

As in Example 1, liquid crystal compositions shown in Table 11 were individually placed between the substrates, the color filters 1 to 5, 7, and 9 shown in Table 1 were used to produce liquid crystal display devices of Examples 43 to 63; and the VHRs and ID thereof were measured. The liquid crystal display devices were subjected to the evaluation of screen burn-in. Tables 12 to 14 show results of the measurement and evaluation.

TABLE 11

| Liquid crystal composition 7 | | Liquid crystal composition 8 | | Liquid crystal composition 9 | |
|---|---|---|---|---|---|
| $T_{NI}/°C.$ | 75.1 | $T_{NI}/°C.$ | 80.4 | $T_{NI}/°C.$ | 85.1 |
| $\Delta n$ | 0.103 | $\Delta n$ | 0.103 | $\Delta n$ | 0.103 |
| $\Delta \varepsilon$ | −2.6 | $\Delta \varepsilon$ | −2.6 | $\Delta \varepsilon$ | −2.6 |
| $\eta/mPa \cdot s$ | 20.5 | $\eta/mPa \cdot s$ | 21.6 | $\eta/mPa \cdot s$ | 22.7 |
| $\gamma_1/mPa \cdot s$ | 117 | $\gamma_1/mPa \cdot s$ | 125 | $\gamma_1/mPa \cdot s$ | 130 |
| $\gamma_1/\Delta n^2 \times 10^{-2}$ | 110 | $\gamma_1/\Delta n^2 \times 10^{-2}$ | 117 | $\gamma_1/\Delta n^2 \times 10^{-2}$ | 122 |
| 3-Cy-Cy-2 | 15% | 3-Cy-Cy-2 | 15% | 3-Cy-Cy-2 | 10% |
| 3-Cy-Cy-4 | 12% | 3-Cy-Cy-4 | 12% | 3-Cy-Cy-4 | 15% |
| 3-Cy-Cy-5 | 7% | 3-Cy-Cy-5 | 7% | 3-Cy-Cy-5 | 12% |
| 3-Cy-Ph-O1 | 12% | 3-Cy-Ph-O1 | 12% | 3-Cy-Ph-O1 | 9% |
| 3-Cy-Ph5-O2 | 6% | 3-Cy-Ph5-O2 | 5% | 3-Cy-Ph5-O2 | 5% |
| 3-Cy-Ph5-O4 | 7% | 3-Cy-Ph5-O4 | 5% | 3-Cy-Ph5-O4 | 5% |
| 2-Cy-Ph-Ph5-O2 | 11% | 2-Cy-Ph-Ph5-O2 | 11% | 2-Cy-Ph-Ph5-O2 | 11% |
| 3-Cy-Ph-Ph5-O2 | 12% | 3-Cy-Ph-Ph5-O2 | 11% | 3-Cy-Ph-Ph5-O2 | 11% |
| 3-Cy-Cy-Ph5-O3 | 3% | 3-Cy-Cy-Ph5-O3 | 4% | 3-Cy-Cy-Ph5-O3 | 4% |
| 4-Cy-Cy-Ph5-O2 | 4% | 4-Cy-Cy-Ph5-O2 | 6% | 4-Cy-Cy-Ph5-O2 | 6% |
| 5-Cy-Cy-Ph5-O2 | 3% | 5-Cy-Cy-Ph5-O2 | 4% | 5-Cy-Cy-Ph5-O2 | 4% |
| 3-Ph-Ph5-Ph-2 | 4% | 3-Ph-Ph5-Ph-2 | 4% | 3-Ph-Ph5-Ph-2 | 4% |
| 4-Ph-Ph5-Ph-2 | 4% | 4-Ph-Ph5-Ph-2 | 4% | 4-Ph-Ph5-Ph-2 | 4% |

TABLE 12

| | Example 43 | Example 44 | Example 45 | Example 46 | Example 47 | Example 48 | Example 49 |
|---|---|---|---|---|---|---|---|
| Liquid crystal composition | Liquid crystal composition 7 | Liquid crystal composition 7 | Liquid crystal composition 7 | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 | Color filter 5 | Color filter 7 | Color filter 9 |
| VHR | 99.5 | 99.6 | 99.3 | 99.3 | 99.1 | 99.5 | 99.4 |
| ID | 27 | 20 | 46 | 42 | 64 | 30 | 36 |
| Screen burn-in | Excellent | Excellent | Excellent | Excellent | Good | Excellent | Excellent |

TABLE 13

| | Example 50 | Example 51 | Example 52 | Example 53 | Example 54 | Example 55 | Example 56 |
|---|---|---|---|---|---|---|---|
| Liquid crystal composition | Liquid crystal composition 8 | Liquid crystal composition 8 | Liquid crystal composition 8 | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 | Color filter 5 | Color filter 7 | Color filter 9 |
| VHR | 99.6 | 99.7 | 99.4 | 99.3 | 99.2 | 99.5 | 99.5 |
| ID | 19 | 13 | 39 | 49 | 68 | 27 | 33 |
| Screen burn-in | Excellent | Excellent | Excellent | Good | Good | Excellent | Excellent |

TABLE 14

|  | Example 57 | Example 58 | Example 59 | Example 60 | Example 61 | Example 62 | Example 63 |
|---|---|---|---|---|---|---|---|
| Liquid crystal composition | Liquid crystal composition 9 | Liquid crystal composition 9 | Liquid crystal composition 9 | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 | Color filter 5 | Color filter 7 | Color filter 9 |
| VHR | 99.5 | 99.5 | 99.2 | 99.2 | 99.0 | 99.4 | 99.3 |
| ID | 26 | 24 | 57 | 54 | 73 | 34 | 45 |
| Screen burn-in | Excellent | Excellent | Good | Good | Good | Excellent | Excellent |

The liquid crystal display devices of Examples 43 to 63 each had a high VHR and small ID. Furthermore, in the evaluation of screen burn-in, no afterimage was observed, or an acceptable degree of slight afterimage was observed, if any.

Examples 64 to 84

As in Example 1, liquid crystal compositions shown in Table 15 were individually placed between the substrates, the color filters 1 to 5, 7, and 9 shown in Table 1 were used to produce liquid crystal display devices of Examples 64 to 84; and the VHRs and ID thereof were measured. The liquid crystal display devices were subjected to the evaluation of screen burn-in. Tables 16 to 18 show results of the measurement and evaluation.

TABLE 15

| Liquid crystal composition 10 | | Liquid crystal composition 11 | | Liquid crystal composition 12 | |
|---|---|---|---|---|---|
| $T_{NI}/°C$ | 76.7 | $T_{NI}/°C$ | 80.3 | $T_{NI}/°C$ | 85.8 |
| $\Delta n$ | 0.109 | $\Delta n$ | 0.105 | $\Delta n$ | 0.104 |
| $\Delta \varepsilon$ | -3.0 | $\Delta \varepsilon$ | -3.1 | $\Delta \varepsilon$ | -3.2 |
| $\eta$/mPa·s | 22.4 | $\eta$/mPa·s | 21.8 | $\eta$/mPa·s | 22.0 |
| $\gamma_1$/mPa·s | 131 | $\gamma_1$/mPa·s | 126 | $\gamma_1$/mPa·s | 128 |
| $\gamma_1/\Delta n^2 \times 10^{-2}$ | 110 | $\gamma_1/\Delta n^2 \times 10^{-2}$ | 114 | $\gamma_1/\Delta n^2 \times 10^{-2}$ | 119 |
| 3-Cy-Cy-2 | 24% | 3-Cy-Cy-2 | 24% | 3-Cy-Cy-2 | 24% |
| 3-Cy-Cy-4 | 6% | 3-Cy-Cy-4 | 10% | 3-Cy-Cy-4 | 10% |
| 3-Cy-Ph-O1 | 5% | 3-Cy-Ph-O1 | 4% | 3-Cy-Ph-O1 | 4% |
| 3-Cy-Ph5-O4 | 6% | 3-Cy-Ph5-O4 | 6% | 3-Cy-Ph5-O4 | 6% |
| 3-Ph-Ph5-O2 | 6% | 3-Ph-Ph5-O2 | 6% | 3-Ph-Ph5-O2 | 6% |
| 2-Cy-Ph-Ph5-O2 | 8% | 2-Cy-Ph-Ph5-O2 | 8% | 2-Cy-Ph-Ph5-O2 | 8% |
| 3-Cy-Ph-Ph5-O2 | 8% | 3-Cy-Ph-Ph5-O2 | 8% | 3-Cy-Ph-Ph5-O2 | 8% |
| 3-Cy-Cy-Ph5-O3 | 7% | 3-Cy-Cy-Ph5-O3 | 7% | 3-Cy-Cy-Ph5-O3 | 7% |
| 4-Cy-Cy-Ph5-O2 | 9% | 4-Cy-Cy-Ph5-O2 | 9% | 4-Cy-Cy-Ph5-O2 | 9% |
| 5-Cy-Cy-Ph5-O2 | 7% | 5-Cy-Cy-Ph5-O2 | 7% | 5-Cy-Cy-Ph5-O2 | 7% |
| 3-Ph-Ph5-Ph-2 | 4% | 3-Ph-Ph5-Ph-2 | 4% | 3-Ph-Ph5-Ph-2 | 4% |
| 4-Ph-Ph5-Ph-2 | 4% | 4-Ph-Ph5-Ph-2 | 4% | 4-Ph-Ph5-Ph-2 | 4% |
| 5-Ph-Ph-1 | 6% | 5-Ph-Ph-1 | 3% | 3-Cy-Cy-Ph-1 | 3% |

TABLE 16

|  | Example 64 | Example 65 | Example 66 | Example 67 | Example 68 | Example 69 | Example 70 |
|---|---|---|---|---|---|---|---|
| Liquid crystal composition | Liquid crystal composition 10 | Liquid crystal composition 10 | Liquid crystal composition 10 | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 | Color filter 5 | Color filter 7 | Color filter 9 |
| VHR | 99.5 | 99.6 | 99.3 | 99.3 | 99.2 | 99.5 | 99.5 |
| ID | 22 | 17 | 40 | 43 | 57 | 26 | 28 |
| Screen burn-in | Excellent | Excellent | Excellent | Excellent | Excellent | Excellent | Excellent |

TABLE 17

|  | Example 71 | Example 72 | Example 73 | Example 74 | Example 75 | Example 76 | Example 77 |
| --- | --- | --- | --- | --- | --- | --- | --- |
| Liquid crystal composition | Liquid crystal composition 11 | Liquid crystal composition 11 | Liquid crystal composition 11 | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 | Color filter 5 | Color filter 7 | Color filter 9 |
| VHR | 99.5 | 99.6 | 99.4 | 99.4 | 99.2 | 99.5 | 99.5 |
| ID | 18 | 15 | 33 | 32 | 61 | 23 | 26 |
| Screen burn-in | Excellent | Excellent | Excellent | Excellent | Good | Excellent | Excellent |

TABLE 18

|  | Example 78 | Example 79 | Example 80 | Example 81 | Example 82 | Example 83 | Example 84 |
| --- | --- | --- | --- | --- | --- | --- | --- |
| Liquid crystal composition | Liquid crystal composition 12 | Liquid crystal composition 12 | Liquid crystal composition 12 | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 | Color filter 5 | Color filter 7 | Color filter 9 |
| VHR | 99.7 | 99.8 | 99.5 | 99.5 | 99.3 | 99.6 | 99.6 |
| ID | 16 | 13 | 30 | 32 | 49 | 22 | 27 |
| Screen burn-in | Excellent | Excellent | Excellent | Excellent | Excellent | Excellent | Excellent |

The liquid crystal display devices of Examples 64 to 84 each had a high VHR and small ID. Furthermore, in the evaluation of screen burn-in, no afterimage was observed, or an acceptable degree of slight afterimage was observed, if any.

Examples 85 to 105

As in Example 1, liquid crystal compositions shown in Table 19 were individually placed between the substrates, the color filters 1 to 5, 7, and 9 shown in Table 1 were used to produce liquid crystal display devices of Examples 85 to 105; and the VHRs and ID thereof were measured. The liquid crystal display devices were subjected to the evaluation of screen burn-in. Tables 20 to 22 show results of the measurement and evaluation.

TABLE 19

| Liquid crystal composition 13 | | Liquid crystal composition 14 | | Liquid crystal composition 15 | |
| --- | --- | --- | --- | --- | --- |
| $T_{NI}/°$ C. | 71.9 | $T_{NI}/°$ C. | 78.8 | $T_{NI}/°$ C. | 73.8 |
| $\Delta n$ | 0.116 | $\Delta n$ | 0.113 | $\Delta n$ | 0.113 |
| $\Delta \varepsilon$ | −3.6 | $\Delta \varepsilon$ | −3.5 | $\Delta \varepsilon$ | −3.9 |
| $\eta$/mPa·s | 21.2 | $\eta$/mPa·s | 21.1 | $\eta$/mPa·s | 21.8 |
| $\gamma_1$/mPa·s | 123 | $\gamma_1$/mPa·s | 122 | $\gamma_1$/mPa·s | 123 |
| $\gamma_1/\Delta n^2 \times 10^{-2}$ | 92 | $\gamma_1/\Delta n^2 \times 10^{-2}$ | 95 | $\gamma_1/\Delta n^2 \times 10^{-2}$ | 97 |
| 3-Cy-Cy-2 | 24% | 3-Cy-Cy-2 | 23% | 3-Cy-Cy-2 | 16% |
| 3-Cy-Ph-O1 | 7% | 3-Cy-Cy-4 | 5% | 3-Cy-Cy-4 | 9% |
| 2-Cy-Ph5-O2 | 6% | 3-Cy-Ph-O1 | 3% | 3-Cy-Ph-O1 | 6% |
| 3-Cy-Ph5-O4 | 6% | 2-Cy-Ph5-O2 | 5% | 2-Cy-Ph5-O2 | 6% |
| 3-Ph-Ph5-O2 | 5% | 3-Cy-Ph5-O4 | 5% | 3-Cy-Ph5-O4 | 6% |
| 5-Ph-Ph5-O2 | 5% | 3-Ph-Ph5-O2 | 5% | 3-Ph-Ph5-O2 | 6% |
| 2-Cy-Ph-Ph5-O2 | 7% | 5-Ph-Ph5-O2 | 5% | 5-Ph-Ph5-O2 | 6% |
| 3-Cy-Ph-Ph5-O2 | 9% | 2-Cy-Ph-Ph5-O2 | 7% | 2-Cy-Ph-Ph5-O2 | 5% |
| 3-Cy-Cy-Ph5-O3 | 5% | 3-Cy-Ph-Ph5-O2 | 7% | 3-Cy-Ph-Ph5-O2 | 7% |
| 4-Cy-Cy-Ph5-O2 | 5% | 3-Cy-Cy-Ph5-O3 | 5% | 3-Cy-Cy-Ph5-O3 | 5% |
| 5-Cy-Cy-Ph5-O2 | 4% | 4-Cy-Cy-Ph5-O2 | 6% | 4-Cy-Cy-Ph5-O2 | 6% |
| 3-Ph-Ph5-Ph-2 | 5% | 5-Cy-Cy-Ph5-O2 | 5% | 5-Cy-Cy-Ph5-O2 | 6% |
| 4-Ph-Ph5-Ph-2 | 6% | 3-Ph-Ph5-Ph-2 | 5% | 3-Ph-Ph5-Ph-2 | 5% |
| 3-Cy-Cy-Ph-1 | 6% | 4-Ph-Ph5-Ph-2 | 6% | 4-Ph-Ph5-Ph-2 | 5% |
|  |  | 3-Cy-Cy-Ph-1 | 8% | 3-Cy-Cy-Ph-1 | 6% |

TABLE 20

|  | Example 85 | Example 86 | Example 87 | Example 88 | Example 89 | Example 90 | Example 91 |
| --- | --- | --- | --- | --- | --- | --- | --- |
| Liquid crystal composition | Liquid crystal composition 13 | Liquid crystal composition 13 | Liquid crystal composition 13 | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 | Color filter 5 | Color filter 7 | Color filter 9 |
| VHR | 99.6 | 99.6 | 99.3 | 99.3 | 99.1 | 99.5 | 99.5 |
| ID | 26 | 20 | 42 | 47 | 70 | 36 | 38 |
| Screen burn-in | Excellent | Excellent | Excellent | Good | Good | Excellent | Excellent |

TABLE 21

|  | Example 92 | Example 93 | Example 94 | Example 95 | Example 96 | Example 97 | Example 98 |
| --- | --- | --- | --- | --- | --- | --- | --- |
| Liquid crystal composition | Liquid crystal composition 14 | Liquid crystal composition 14 | Liquid crystal composition 14 | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 | Color filter 5 | Color filter 7 | Color filter 9 |
| VHR | 99.5 | 99.6 | 99.3 | 99.3 | 99.1 | 99.4 | 99.3 |
| ID | 25 | 18 | 36 | 37 | 68 | 29 | 33 |
| Screen burn-in | Excellent | Excellent | Excellent | Excellent | Good | Excellent | Excellent |

TABLE 22

|  | Example 99 | Example 100 | Example 101 | Example 102 | Example 103 | Example 104 | Example 105 |
| --- | --- | --- | --- | --- | --- | --- | --- |
| Liquid crystal composition | Liquid crystal composition 15 | Liquid crystal composition 15 | Liquid crystal composition 15 | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 | Color filter 5 | Color filter 7 | Color filter 9 |
| VHR | 99.6 | 99.7 | 99.4 | 99.4 | 99.2 | 99.6 | 99.5 |
| ID | 19 | 14 | 34 | 37 | 56 | 22 | 30 |
| Screen burn-in | Excellent | Excellent | Excellent | Excellent | Good | Excellent | Excellent |

The liquid crystal display devices of Examples 85 to 105 each had a high VHR and small ID. Furthermore, in the evaluation of screen burn-in, no afterimage was observed, or an acceptable degree of slight afterimage was observed, if any.

Examples 106 to 126

As in Example 1, liquid crystal compositions shown in Table 23 were individually placed between the substrates, the color filters 1 to 5, 7, and 9 shown in Table 1 were used to produce liquid crystal display devices of Examples 106 to 126; and the VHRs and ID thereof were measured. The liquid crystal display devices were subjected to the evaluation of screen burn-in. Tables 24 to 26 show results of the measurement and evaluation.

TABLE 23

| Liquid crystal composition 16 | | Liquid crystal composition 17 | | Liquid crystal composition 18 | |
| --- | --- | --- | --- | --- | --- |
| $T_{NI}/°C$ | 75.9 | $T_{NI}/°C$ | 82.3 | $T_{NI}/°C$ | 85.7 |
| $\Delta n$ | 0.112 | $\Delta n$ | 0.111 | $\Delta n$ | 0.112 |
| $\Delta \varepsilon$ | −2.8 | $\Delta \varepsilon$ | −2.7 | $\Delta \varepsilon$ | −2.8 |
| $\eta/mPa \cdot s$ | 19.8 | $\eta/mPa \cdot s$ | 19.2 | $\eta/mPa \cdot s$ | 20.1 |
| $\gamma_1/mPa \cdot s$ | 121 | $\gamma_1/mPa \cdot s$ | 114 | $\gamma_1/mPa \cdot s$ | 119 |

TABLE 23-continued

| Liquid crystal composition 16 | | Liquid crystal composition 17 | | Liquid crystal composition 18 | |
|---|---|---|---|---|---|
| $\gamma_1/\Delta n^2 \times 10^{-2}$ | 96 | $\gamma_1/\Delta n^2 \times 10^{-2}$ | 94 | $\gamma_1/\Delta n^2 \times 10^{-2}$ | 95 |
| 3-Cy-Cy-2 | 19% | 3-Cy-Cy-2 | 21% | 3-Cy-Cy-2 | 19% |
| 3-Cy-Cy-4 | 12% | 3-Cy-Cy-4 | 12% | 3-Cy-Cy-4 | 12% |
| 3-Cy-Cy-5 | 5% | 3-Cy-Cy-5 | 5% | 3-Cy-Cy-5 | 4% |
| 3-Cy-Ph-O1 | 5% | 2-Cy-Ph5-O2 | 4% | 2-Cy-Ph5-O2 | 4% |
| 2-Cy-Ph5-O2 | 4% | 3-Cy-Ph5-O4 | 4% | 3-Cy-Ph5-O4 | 4% |
| 3-Cy-Ph5-O4 | 4% | 3-Ph-Ph5-O2 | 3% | 3-Ph-Ph5-O2 | 3% |
| 3-Ph-Ph5-O2 | 3% | 5-Ph-Ph5-O2 | 4% | 5-Ph-Ph5-O2 | 4% |
| 5-Ph-Ph5-O2 | 4% | 2-Cy-Ph-Ph5-O2 | 6% | 2-Cy-Ph-Ph5-O2 | 6% |
| 2-Cy-Ph-Ph5-O2 | 6% | 3-Cy-Ph-Ph5-O2 | 6% | 3-Cy-Ph-Ph5-O2 | 6% |
| 3-Cy-Ph-Ph5-O2 | 6% | 3-Cy-Cy-Ph5-O3 | 5% | 3-Cy-Cy-Ph5-O3 | 5% |
| 3-Cy-Cy-Ph5-O3 | 5% | 4-Cy-Cy-Ph5-O2 | 5% | 4-Cy-Cy-Ph5-O2 | 5% |
| 4-Cy-Cy-Ph5-O2 | 5% | 5-Cy-Cy-Ph5-O2 | 4% | 5-Cy-Cy-Ph5-O2 | 4% |
| 5-Cy-Cy-Ph5-O2 | 5% | 3-Ph-Ph5-Ph-2 | 7% | 3-Ph-Ph5-Ph-2 | 7% |
| 3-Ph-Ph5-Ph-2 | 8% | 4-Ph-Ph5-Ph-2 | 8% | 4-Ph-Ph5-Ph-2 | 8% |
| 4-Ph-Ph5-Ph-2 | 9% | 3-Cy-Cy-Ph-1 | 6% | 3-Cy-Cy-Ph-1 | 9% |

TABLE 24

| | Example 106 | Example 107 | Example 108 | Example 109 | Example 110 | Example 111 | Example 112 |
|---|---|---|---|---|---|---|---|
| Liquid crystal composition | Liquid crystal composition 16 | Liquid crystal composition 16 | Liquid crystal composition 16 | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 | Color filter 5 | Color filter 7 | Color filter 9 |
| VHR | 99.5 | 99.6 | 99.3 | 99.3 | 99.1 | 99.5 | 99.4 |
| ID | 24 | 19 | 42 | 40 | 66 | 28 | 35 |
| Screen burn-in | Excellent | Excellent | Good | Excellent | Good | Excellent | Excellent |

TABLE 25

| | Example 113 | Example 114 | Example 115 | Example 116 | Example 117 | Example 118 | Example 119 |
|---|---|---|---|---|---|---|---|
| Liquid crystal composition | Liquid crystal composition 17 | Liquid crystal imposition 17 | Liquid crystal composition 17 | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 | Color filter 5 | Color filter 7 | Color filter 9 |
| VHR | 99.5 | 99.5 | 99.3 | 99.3 | 99.0 | 99.4 | 99.4 |
| ID | 26 | 23 | 43 | 45 | 72 | 34 | 37 |
| Screen burn-in | Excellent | Excellent | Good | Good | Good | Excellent | Excellent |

TABLE 26

| | Example 120 | Example 121 | Example 122 | Example 123 | Example 124 | Example 125 | Example 126 |
|---|---|---|---|---|---|---|---|
| Liquid crystal composition | Liquid crystal composition 18 | Liquid crystal composition 18 | Liquid crystal composition 18 | Liquid crystal composition 18 | Liquid crystal composition 18 | Liquid crystal composition 18 | Liquid crystal composition 18 |
| Color filter | Color filter 1 | Color filter 2 | Color filter 3 | Color filter 4 | Color filter 5 | Color filter 7 | Color filter 9 |
| VHR | 99.6 | 99.7 | 99.4 | 99.3 | 99.1 | 99.5 | 99.5 |
| ID | 19 | 15 | 36 | 36 | 73 | 25 | 27 |
| Screen burn-in | Excellent | Excellent | Excellent | Excellent | Good | Excellent | Excellent |

The liquid crystal display devices of Examples 106 to 126 each had a high VHR and small ID. Furthermore, in the evaluation of screen burn-in, no afterimage was observed, or an acceptable degree of slight afterimage was observed, if any.

Examples 127 to 147

As in Example 1, liquid crystal compositions shown in Table 27 were individually placed between the substrates, the color filters 1 to 5, 7, and 9 shown in Table 1 were used to produce liquid crystal display devices of Examples 127 to 147; and the VHRs and ID thereof were measured. The liquid crystal display devices were subjected to the evaluation of screen burn-in. Tables 28 to 30 show results of the measurement and evaluation.

TABLE 27

| Liquid crystal composition 19 | | Liquid crystal composition 20 | | Liquid crystal composition 21 | |
|---|---|---|---|---|---|
| $T_{NI}/°$ C. | 77.1 | $T_{NI}/°$ C. | 82.7 | $T_{NI}/°$ C. | 86.4 |
| $\Delta n$ | 0.104 | $\Delta n$ | 0.107 | $\Delta n$ | 0.106 |
| $\Delta\varepsilon$ | −3.5 | $\Delta\varepsilon$ | −3.0 | $\Delta\varepsilon$ | −3.0 |
| $\eta$/mPa · s | 25.1 | $\eta$/mPa · s | 24.2 | $\eta$/mPa · s | 24.4 |
| $\gamma_1$/mPa · s | 141 | $\gamma_1$/mPa · s | 141 | $\gamma_1$/mPa · s | 142 |
| $\gamma_1/\Delta n^2 \times 10^{-2}$ | 131 | $\gamma_1/\Delta n^2 \times 10^{-2}$ | 123 | $\gamma_1/\Delta n^2 \times 10^{-2}$ | 126 |
| 3-Cy-Cy-2 | 22% | 3-Cy-Cy-2 | 24% | 3-Cy-Cy-2 | 24% |
| 3-Cy-Ph-O1 | 14% | 3-Cy-Cy-4 | 5% | 3-Cy-Cy-4 | 5% |
| 2-Cy-Ph5-O2 | 7% | 3-Cy-Ph-O1 | 6% | 3-Cy-Ph-O1 | 6% |
| 3-Cy-Ph5-O4 | 8% | 2-Cy-Ph5-O2 | 5% | 2-Cy-Ph5-O2 | 5% |
| 2-Cy-Ph-Ph5-O2 | 7% | 3-Cy-Ph5-O4 | 5% | 3-Cy-Ph5-O4 | 5% |
| 3-Cy-Ph-Ph5-O2 | 9% | 2-Cy-Ph-Ph5-O2 | 7% | 2-Cy-Ph-Ph5-O2 | 7% |
| 3-Cy-Cy-Ph5-O3 | 8% | 3-Cy-Ph-Ph5-O2 | 9% | 3-Cy-Ph-Ph5-O2 | 9% |
| 4-Cy-Cy-Ph5-O2 | 8% | 3-Cy-Cy-Ph5-O3 | 8% | 3-Cy-Cy-Ph5-O3 | 8% |
| 5-Cy-Cy-Ph5-O2 | 8% | 4-Cy-Cy-Ph5-O2 | 8% | 4-Cy-Cy-Ph5-O2 | 8% |
| 3-Ph-Ph5-Ph-2 | 5% | 5-Cy-Cy-Ph5-O2 | 8% | 5-Cy-Cy-Ph5-O2 | 8% |
| 4-Ph-Ph5-Ph-2 | 4% | 3-Ph-Ph5-Ph-2 | 5% | 3-Ph-Ph5-Ph-2 | 5% |
| | | 4-Ph-Ph5-Ph-2 | 5% | 4-Ph-Ph5-Ph-2 | 5% |
| | | 5-Ph-Ph-1 | 5% | 5-Ph-Ph-1 | 3% |
| | | | | 3-Cy-Cy-Ph-1 | 2% |

TABLE 28

| | Example 127 | Example 128 | Example 129 | Example 130 | Example 131 | Example 132 | Example 133 |
|---|---|---|---|---|---|---|---|
| Liquid crystal composition | Liquid crystal composition 19 | Liquid crystal composition 19 | Liquid crystal composition 19 | Liquid crystal composition 19 | Liquid crystal composition 19 | Liquid crystal composition 19 | Liquid crystal composition 19 |
| Color filter | Color filter 1 | Color filter 2 | Color filter 3 | Color filter 4 | Color filter 5 | Color filter 7 | Color filter 9 |
| VHR | 99.5 | 99.6 | 99.3 | 99.3 | 99.2 | 99.4 | 99.4 |
| ID | 21 | 17 | 38 | 35 | 60 | 24 | 26 |
| Screen burn-in | Excellent | Excellent | Excellent | Excellent | Good | Excellent | Excellent |

TABLE 29

| | Example 134 | Example 135 | Example 136 | Example 137 | Example 138 | Example 139 | Example 140 |
|---|---|---|---|---|---|---|---|
| Liquid crystal composition | Liquid crystal composition 20 | Liquid crystal composition 20 | Liquid crystal composition 20 | Liquid crystal composition 20 | Liquid crystal composition 20 | Liquid crystal composition 20 | Liquid crystal composition 20 |
| Color filter | Color filter 1 | Color filter 2 | Color filter 3 | Color filter 4 | Color filter 5 | Color filter 7 | Color filter 9 |
| VHR | 99.5 | 99.7 | 99.4 | 99.4 | 99.1 | 99.5 | 99.5 |
| ID | 31 | 14 | 41 | 39 | 70 | 34 | 36 |
| Screen burn-in | Excellent | Excellent | Excellent | Excellent | Good | Excellent | Excellent |

TABLE 30

| | Example 141 | Example 142 | Example 143 | Example 144 | Example 145 | Example 146 | Example 147 |
|---|---|---|---|---|---|---|---|
| Liquid crystal composition | Liquid crystal composition 21 | Liquid crystal composition 21 | Liquid crystal composition 21 | Liquid crystal composition 21 | Liquid crystal composition 21 | Liquid crystal composition 21 | Liquid crystal composition 21 |
| Color filter | Color filter 1 | Color filter 2 | Color filter 3 | Color filter 4 | Color filter 5 | Color filter 7 | Color filter 9 |
| VHR | 99.4 | 99.5 | 99.3 | 99.2 | 99.0 | 99.4 | 99.3 |
| ID | 27 | 24 | 46 | 48 | 74 | 34 | 42 |
| Screen burn-in | Excellent | Excellent | Good | Excellent | Good | Excellent | Excellent |

The liquid crystal display devices of Examples 127 to 147 each had a high VHR and small ID. In the evaluation of screen burn-in, no afterimage was observed, or an acceptable degree of slight afterimage was observed, if any.

Examples 148 to 168

As in Example 1, liquid crystal compositions shown in Table 31 were individually placed between the substrates, the color filters 1 to 5, 7, and 9 shown in Table 1 were used to produce liquid crystal display devices of Examples 148 to 168; and the VHRs and ID thereof were measured. The liquid crystal display devices were subjected to the evaluation of screen burn-in. Tables 32 to 34 show results of the measurement and evaluation.

TABLE 31

| Liquid crystal composition 22 | | Liquid crystal composition 23 | | Liquid crystal composition 24 | |
|---|---|---|---|---|---|
| $T_{NI}/°C$ | 75.5 | $T_{NI}/°C$ | 80.3 | $T_{NI}/°C$ | 85.0 |
| $\Delta n$ | 0.102 | $\Delta n$ | 0.101 | $\Delta n$ | 0.102 |
| $\Delta \varepsilon$ | -2.8 | $\Delta \varepsilon$ | -2.9 | $\Delta \varepsilon$ | -3.0 |
| $\eta/mPa \cdot s$ | 22.2 | $\eta/mPa \cdot s$ | 22.0 | $\eta/mPa \cdot s$ | 22.7 |
| $\gamma_1/mPa \cdot s$ | 121 | $\gamma_1/mPa \cdot s$ | 118 | $\gamma_1/mPa \cdot s$ | 122 |
| $\gamma_1/\Delta n^2 \times 10^{-2}$ | 117 | $\gamma_1/\Delta n^2 \times 10^{-2}$ | 117 | $\gamma_1/\Delta n^2 \times 10^{-2}$ | 118 |
| 3-Cy-Cy-2 | 14% | 3-Cy-Cy-2 | 17% | 3-Cy-Cy-2 | 16% |
| 3-Cy-Cy-4 | 12% | 3-Cy-Cy-4 | 12% | 3-Cy-Cy-4 | 12% |
| 3-Cy-Cy-5 | 5% | 3-Cy-Cy-5 | 5% | 3-Cy-Cy-5 | 5% |
| 3-Cy-Ph-O1 | 7% | 3-Cy-Ph-O1 | 6% | 3-Cy-Ph-O1 | 5% |
| 2-Cy-Ph5-O2 | 7% | 2-Cy-Ph5-O2 | 12% | 2-Cy-Ph5-O2 | 12% |
| 3-Cy-Ph5-O4 | 7% | 2-Cy-Ph-Ph5-O2 | 9% | 2-Cy-Ph-Ph5-O2 | 9% |
| 2-Cy-Ph-Ph5-O2 | 8% | 3-Cy-Ph-Ph5-O2 | 9% | 3-Cy-Ph-Ph5-O2 | 9% |
| 3-Cy-Ph-Ph5-O2 | 8% | 3-Cy-Cy-Ph5-O3 | 6% | 3-Cy-Cy-Ph5-O3 | 6% |
| 3-Cy-Cy-Ph5-O3 | 6% | 4-Cy-Cy-Ph5-O2 | 8% | 4-Cy-Cy-Ph5-O2 | 8% |
| 4-Cy-Cy-Ph5-O2 | 7% | 5-Cy-Cy-Ph5-O2 | 6% | 5-Cy-Cy-Ph5-O2 | 6% |
| 5-Cy-Cy-Ph5-O2 | 6% | 3-Ph-Ph5-Ph-2 | 3% | 3-Ph-Ph5-Ph-2 | 3% |
| 3-Ph-Ph5-Ph-2 | 3% | 4-Ph-Ph5-Ph-2 | 3% | 4-Ph-Ph5-Ph-2 | 3% |
| 4-Ph-Ph5-Ph-2 | 3% | 5-Ph-Ph-1 | 4% | 5-Ph-Ph-1 | 3% |
| 5-Ph-Ph-1 | 6% | | | 3-Cy-Cy-Ph-1 | 3% |
| 3-Cy-Cy-Ph-1 | 1% | | | | |

TABLE 32

| | Example 148 | Example 149 | Example 150 | Example 151 | Example 152 | Example 153 | Example 154 |
|---|---|---|---|---|---|---|---|
| Liquid crystal composition | Liquid crystal composition 22 | Liquid crystal composition 22 | Liquid crystal composition 22 | Liquid crystal composition 22 | Liquid crystal composition 22 | Liquid crystal composition 22 | Liquid crystal composition 22 |
| Color filter | Color filter 1 | Color filter 2 | Color filter 3 | Color filter 4 | Color filter 5 | Color filter 7 | Color filter 9 |
| VHR | 99.5 | 99.6 | 99.3 | 99.3 | 99.1 | 99.5 | 99.4 |
| ID | 23 | 19 | 38 | 39 | 62 | 24 | 31 |
| Screen burn-in | Excellent | Excellent | Excellent | Excellent | Good | Excellent | Excellent |

TABLE 33

|  | Example 155 | Example 156 | Example 157 | Example 158 | Example 159 | Example 160 | Example 161 |
| --- | --- | --- | --- | --- | --- | --- | --- |
| Liquid crystal composition | Liquid crystal composition 23 | Liquid crystal composition 23 | Liquid crystal composition 23 | Liquid crystal composition 23 | Liquid crystal composition 23 | Liquid crystal composition 23 | Liquid crystal composition 23 |
| Color filter | Color filter 1 | Color filter 2 | Color filter 3 | Color filter 4 | Color filter 5 | Color filter 7 | Color filter 9 |
| VHR | 99.4 | 99.5 | 99.3 | 99.2 | 99.0 | 99.3 | 99.3 |
| ID | 30 | 25 | 42 | 45 | 77 | 34 | 38 |
| Screen burn-in | Excellent | Excellent | Excellent | Good | Good | Excellent | Excellent |

TABLE 34

|  | Example 162 | Example 163 | Example 164 | Example 165 | Example 166 | Example 167 | Example 168 |
| --- | --- | --- | --- | --- | --- | --- | --- |
| Liquid crystal composition | Liquid crystal composition 24 | Liquid crystal composition 24 | Liquid crystal composition 24 | Liquid crystal composition 24 | Liquid crystal composition 24 | Liquid crystal composition 24 | Liquid crystal composition 24 |
| Color filter | Color filter 1 | Color filter 2 | Color filter 3 | Color filter 4 | Color filter 5 | Color filter 7 | Color filter 9 |
| VHR | 99.7 | 99.8 | 99.4 | 99.4 | 99.2 | 99.5 | 99.5 |
| ID | 17 | 13 | 38 | 40 | 52 | 22 | 23 |
| Screen burn-in | Excellent | Excellent | Excellent | Excellent | Good | Excellent | Excellent |

The liquid crystal display devices of Examples 148 to 168 each had a high VHR and small ID. Furthermore, in the evaluation of screen burn-in, no afterimage was observed, or an acceptable degree of slight afterimage was observed, if any.

Examples 169 to 189

As in Example 1, liquid crystal compositions shown in Table 35 were individually placed between the substrates, the color filters 1 to 5, 7, and 9 shown in Table 1 were used to produce liquid crystal display devices of Examples 169 to 189; and the VHRs and ID thereof were measured. The liquid crystal display devices were subjected to the evaluation of screen burn-in. Tables 36 to 38 show results of the measurement and evaluation.

TABLE 35

| Liquid crystal composition 25 | | Liquid crystal composition 26 | | Liquid crystal composition 27 | |
| --- | --- | --- | --- | --- | --- |
| $T_{NI}/°$ C. | 75.6 | $T_{NI}/°$ C. | 81.1 | $T_{NI}/°$ C. | 85.7 |
| $\Delta n$ | 0.104 | $\Delta n$ | 0.105 | $\Delta n$ | 0.105 |
| $\Delta \varepsilon$ | −2.8 | $\Delta \varepsilon$ | −2.8 | $\Delta \varepsilon$ | −2.9 |
| $\eta$/mPa·s | 20.2 | $\eta$/mPa·s | 20.8 | $\eta$/mPa·s | 21.0 |
| $\gamma_1$/mPa·s | 117 | $\gamma_1$/mPa·s | 119 | $\gamma_1$/mPa·s | 92 |
| $\gamma_1/\Delta n^2 \times 10^{-2}$ | 107 | $\gamma_1/\Delta n^2 \times 10^{-2}$ | 107 | $\gamma_1/\Delta n^2 \times 10^{-2}$ | 82 |
| 3-Cy-Cy-2 | 25% | 3-Cy-Cy-2 | 25% | 3-Cy-Cy-2 | 25% |
| 3-Cy-Cy-4 | 10% | 3-Cy-Cy-4 | 10% | 3-Cy-Cy-4 | 12% |
| 3-Cy-Ph-O1 | 4% | 3-Cy-Ph-O1 | 4% | 2-Cy-Ph5-O2 | 12% |
| 2-Cy-Ph5-O2 | 7% | 2-Cy-Ph5-O2 | 12% | 2-Cy-Ph-Ph5-O2 | 5% |
| 3-Cy-Ph5-O4 | 8% | 2-Cy-Ph-Ph5-O2 | 5% | 3-Cy-Ph-Ph5-O2 | 6% |
| 2-Cy-Ph-Ph5-O2 | 5% | 3-Cy-Ph-Ph5-O2 | 6% | 3-Cy-Cy-Ph5-O3 | 7% |
| 3-Cy-Ph-Ph5-O2 | 6% | 3-Cy-Cy-Ph5-O3 | 7% | 4-Cy-Cy-Ph5-O2 | 8% |
| 3-Cy-Cy-Ph5-O3 | 6% | 4-Cy-Cy-Ph5-O2 | 8% | 5-Cy-Cy-Ph5-O2 | 7% |
| 4-Cy-Cy-Ph5-O2 | 7% | 5-Cy-Cy-Ph5-O2 | 7% | 3-Ph-Ph5-Ph-2 | 8% |
| 5-Cy-Cy-Ph5-O2 | 6% | 3-Ph-Ph5-Ph-2 | 8% | 4-Ph-Ph5-Ph-2 | 8% |
| 3-Ph-Ph5-Ph-2 | 8% | 4-Ph-Ph5-Ph-2 | 8% | 3-Cy-Cy-Ph-1 | 2% |
| 4-Ph-Ph5-Ph-2 | 8% |  |  |  |  |

TABLE 36

|  | Example 169 | Example 170 | Example 171 | Example 172 | Example 173 | Example 174 | Example 175 |
|---|---|---|---|---|---|---|---|
| Liquid crystal composition | Liquid crystal composition 25 | Liquid crystal composition 25 | Liquid crystal composition 25 | Liquid crystal composition 25 | Liquid crystal composition 25 | Liquid crystal composition 25 | Liquid crystal composition 25 |
| Color filter | Color filter 1 | Color filter 2 | Color filter 3 | Color filter 4 | Color filter 5 | Color filter 7 | Color filter 9 |
| VHR | 99.6 | 99.7 | 99.4 | 99.4 | 99.2 | 99.5 | 99.4 |
| ID | 27 | 18 | 38 | 42 | 57 | 30 | 34 |
| Screen burn-in | Excellent | Excellent | Excellent | Good | Good | Excellent | Excellent |

TABLE 37

|  | Example 176 | Example 177 | Example 178 | Example 179 | Example 180 | Example 181 | Example 182 |
|---|---|---|---|---|---|---|---|
| Liquid crystal composition | Liquid crystal composition 26 | Liquid crystal composition 26 | Liquid crystal composition 26 | Liquid crystal composition 26 | Liquid crystal composition 26 | Liquid crystal composition 26 | Liquid crystal composition 26 |
| Color filter | Color filter 1 | Color filter 2 | Color filter 3 | Color filter 4 | Color filter 5 | Color filter 7 | Color filter 9 |
| VHR | 99.5 | 99.6 | 99.3 | 99.3 | 99.1 | 99.5 | 99.4 |
| ID | 29 | 21 | 39 | 40 | 64 | 29 | 34 |
| Screen burn-in | Excellent | Excellent | Excellent | Excellent | Good | Excellent | Excellent |

TABLE 38

|  | Example 183 | Example 184 | Example 185 | Example 186 | Example 187 | Example 188 | Example 189 |
|---|---|---|---|---|---|---|---|
| Liquid crystal composition | Liquid crystal composition 27 | Liquid crystal composition 27 | Liquid crystal composition 27 | Liquid crystal composition 27 | Liquid crystal composition 27 | Liquid crystal composition 27 | Liquid crystal composition 27 |
| Color filter | Color filter 1 | Color filter 2 | Color filter 3 | Color filter 4 | Color filter 5 | Color filter 7 | Color filter 9 |
| VHR | 99.6 | 99.6 | 99.3 | 99.3 | 99.0 | 99.5 | 99.3 |
| ID | 20 | 19 | 41 | 44 | 71 | 26 | 37 |
| Screen burn-in | Excellent | Excellent | Good | Good | Good | Excellent | Excellent |

The liquid crystal display devices of Examples 169 to 189 each had a high VHR and small ID. Furthermore, in the evaluation of screen burn-in, no afterimage was observed, or an acceptable degree of slight afterimage was observed, if any.

Examples 190 to 196

The liquid crystal composition 1 was mixed with 0.3 mass % of 2-methyl-acrylic acid 4-{2-[4-(2-acryloyloxy-ethyl)-phenoxycarbonyl]-ethyl}-biphenyl-4'-yl ester to produce a liquid crystal composition 28. The liquid crystal composition 28 was placed in the VA cell used in Example 1 and then polymerized by being irradiated with ultraviolet for 600 seconds (3.0 J/cm$^2$) while a driving voltage was applied between the electrodes. Then, the color filters 1 to 5, 7, and 9 shown in Table 1 were used to produce liquid crystal display devices of Examples 190 to 196; and the VHRs and ID thereof were measured. The liquid crystal display devices were subjected to the evaluation of screen burn-in. Table 39 shows results of the measurement and evaluation.

TABLE 39

|  | Example 190 | Example 191 | Example 192 | Example 193 | Example 194 | Example 195 | Example 196 |
|---|---|---|---|---|---|---|---|
| Liquid crystal composition | Liquid crystal composition 28 | Liquid crystal composition 28 | Liquid crystal composition 28 | Liquid crystal composition 28 | Liquid crystal composition 28 | Liquid crystal composition 28 | Liquid crystal composition 28 |
| Color filter | Color filter 1 | Color filter 2 | Color filter 3 | Color filter 4 | Color filter 5 | Color filter 7 | Color filter 9 |
| VHR | 99.4 | 99.5 | 99.2 | 99.2 | 99.0 | 99.3 | 99.3 |
| ID | 28 | 24 | 40 | 39 | 63 | 33 | 36 |
| Screen burn-in | Excellent | Excellent | Excellent | Excellent | Good | Excellent | Excellent |

The liquid crystal display devices of Examples 190 to 196 each had a high VHR and small ID. Furthermore, in the evaluation of screen burn-in, no afterimage was observed, or an acceptable degree of slight afterimage was observed, if any.

Examples 197 to 203

The liquid crystal composition 13 was mixed with 0.3 mass % of bismethacrylic acid biphenyl-4,4'-diyl ester to produce a liquid crystal composition 29. The liquid crystal composition 29 was placed in the VA cell used in Example 1 and then polymerized by being irradiated with ultraviolet for 600 seconds (3.0 J/cm$^2$) while a driving voltage was applied between the electrodes. Then, the color filters 1 to 5, 7, and 9 shown in Table 1 were used to produce liquid crystal display devices of Examples 197 to 203; and the VHRs and ID thereof were measured. The liquid crystal display devices were subjected to the evaluation of screen burn-in. Table 40 shows results of the measurement and evaluation.

TABLE 40

|  | Example 197 | Example 198 | Example 199 | Example 200 | Example 201 | Example 202 | Example 203 |
| --- | --- | --- | --- | --- | --- | --- | --- |
| Liquid crystal composition | Liquid crystal composition 29 | Liquid crystal composition 29 | Liquid crystal composition 29 | Liquid crystal composition 29 | Liquid crystal composition 29 | Liquid crystal composition 29 | Liquid crystal composition 29 |
| Color filter | Color filter 1 | Color filter 2 | Color filter 3 | Color filter 4 | Color filter 5 | Color filter 7 | Color filter 9 |
| VHR | 99.4 | 99.5 | 99.2 | 99.2 | 99.0 | 99.3 | 99.3 |
| ID | 35 | 30 | 46 | 46 | 59 | 40 | 43 |
| Screen burn-in | Excellent | Excellent | Good | Good | Good | Excellent | Excellent |

The liquid crystal display devices of Examples 197 to 203 each had a high VHR and small ID. In the evaluation of screen burn-in, no afterimage was observed, or an acceptable degree of slight afterimage was observed, if any.

Examples 204 to 210

The liquid crystal composition 19 was mixed with 0.3 mass % of bismethacrylic acid 3-fluorobiphenyl-4,4'-diyl ester to produce a liquid crystal composition 30. The liquid crystal composition 30 was placed in the VA cell used in Example 1 and then polymerized by being irradiated with ultraviolet for 600 seconds (3.0 J/cm$^2$) while a driving voltage was applied between the electrodes. Then, the color filters 1 to 5, 7, and 9 shown in Table 1 were used to produce liquid crystal display devices of Examples 204 to 210; and the VHRs and ID thereof were measured. The liquid crystal display devices were subjected to the evaluation of screen burn-in. Table 41 shows results of the measurement and evaluation.

TABLE 41

|  | Example 204 | Example 205 | Example 206 | Example 207 | Example 208 | Example 209 | Example 210 |
| --- | --- | --- | --- | --- | --- | --- | --- |
| Liquid crystal composition | Liquid crystal composition 30 | Liquid crystal composition 30 | Liquid crystal composition 30 | Liquid crystal composition 30 | Liquid crystal composition 30 | Liquid crystal composition 30 | Liquid crystal composition 30 |
| Color filter | Color filter 1 | Color filter 2 | Color filter 3 | Color filter 4 | Color filter 5 | Color filter 7 | Color filter 9 |
| VHR | 99.5 | 99.6 | 99.4 | 99.3 | 99.1 | 99.5 | 99.4 |
| ID | 27 | 22 | 44 | 45 | 66 | 32 | 39 |
| Screen burn-in | Excellent | Excellent | Good | Good | Good | Excellent | Excellent |

The liquid crystal display devices of Examples 204 to 210 each had a high VHR and small ID. Furthermore, in the evaluation of screen burn-in, no afterimage was observed, or an acceptable degree of slight afterimage was observed, if any.

Comparative Examples 1 to 21

As in Example 1, comparative liquid crystal compositions shown in Table 42 were individually placed between the substrates; the color filters 1 to 5, 7, and 9 shown in Table 1 were used to produce liquid crystal display devices of Comparative Examples 1 to 21; and the VHRs and ID thereof were measured. The liquid crystal display devices were subjected to the evaluation of screen burn-in. Tables 43 to 45 show results of the measurement and evaluation.

TABLE 42

| Comparative liquid crystal composition 1 | | Comparative liquid crystal composition 2 | | Comparative liquid crystal composition 3 | |
|---|---|---|---|---|---|
| $T_{NI}/°$ C. | 75.5 | $T_{NI}/°$ C. | 80.7 | $T_{NI}/°$ C. | 85.8 |
| $\Delta n$ | 0.104 | $\Delta n$ | 0.104 | $\Delta n$ | 0.104 |
| $\Delta \varepsilon$ | −2.88 | $\Delta \varepsilon$ | −2.88 | $\Delta \varepsilon$ | −2.95 |
| $\eta$/mPa · s | 22.5 | $\eta$/mPa · s | 22.3 | $\eta$/mPa · s | 22.4 |
| $\gamma_1$/mPa · s | 123 | $\gamma_1$/mPa · s | 122 | $\gamma_1$/mPa · s | 124 |
| $\gamma_1/\Delta n^2 \times 10^{-2}$ | 114 | $\gamma_1/\Delta n^2 \times 10^{-2}$ | 113 | $\gamma_1/\Delta n^2 \times 10^{-2}$ | 114 |
| 3-Cy-Cy-2 | 24% | 3-Cy-Cy-2 | 24% | 3-Cy-Cy-2 | 24% |
| 3-Cy-Cy-4 | 4% | 3-Cy-Cy-4 | 4% | 3-Cy-Cy-4 | 4% |
| 3-Cy-Ph5-O2 | 7% | 3-Cy-Ph5-O2 | 7% | 3-Cy-Ph5-O2 | 7% |
| 3-Cy-Ph5-O4 | 8% | 3-Cy-Ph5-O4 | 8% | 3-Cy-Ph5-O4 | 8% |
| 2-Cy-Ph-Ph5-O2 | 4% | 2-Cy-Ph-Ph5-O2 | 5% | 2-Cy-Ph-Ph5-O2 | 6% |
| 3-Cy-Ph-Ph5-O2 | 5% | 3-Cy-Ph-Ph5-O2 | 6% | 3-Cy-Ph-Ph5-O2 | 7% |
| 3-Cy-Cy-Ph5-O3 | 8% | 3-Cy-Cy-Ph5-O3 | 7% | 3-Cy-Cy-Ph5-O3 | 7% |
| 4-Cy-Cy-Ph5-O2 | 10% | 4-Cy-Cy-Ph5-O2 | 9% | 4-Cy-Cy-Ph5-O2 | 7% |
| 5-Cy-Cy-Ph5-O2 | 8% | 5-Cy-Cy-Ph5-O2 | 7% | 5-Cy-Cy-Ph5-O2 | 7% |
| 3-Ph-Ph5-Ph-2 | 4% | 3-Ph-Ph5-Ph-2 | 4% | 3-Ph-Ph5-Ph-2 | 4% |
| 4-Ph-Ph5-Ph-2 | 4% | 4-Ph-Ph5-Ph-2 | 4% | 4-Ph-Ph5-Ph-2 | 4% |
| 5-Ph-Ph-1 | 10% | 5-Ph-Ph-1 | 7% | 5-Ph-Ph-1 | 4% |
| 3-Cy-Cy-Ph-1 | 4% | 3-Cy-Cy-Ph-1 | 8% | 3-Cy-Cy-Ph-1 | 11% |

TABLE 43

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Liquid crystal composition | Comparative liquid crystal composition 1 | Comparative liquid crystal composition 1 | Comparative liquid crystal composition 1 | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 | Color filter 5 | Color filter 7 | Color filter 9 |
| VHR | 98.2 | 98.3 | 97.7 | 97.6 | 97.2 | 98.0 | 97.7 |
| ID | 153 | 142 | 173 | 177 | 220 | 160 | 166 |
| Screen burn-in | Poor | Poor | Poor | Poor | Poor | Poor | Poor |

TABLE 44

| | Comparative Example 8 | Comparative Example 9 | Comparative Example 10 | Comparative Example 11 | Comparative Example 12 | Comparative Example 13 | Comparative Example 14 |
|---|---|---|---|---|---|---|---|
| Liquid crystal composition | Comparative liquid crystal composition 2 | Comparative liquid crystal composition 2 | Comparative liquid crystal composition 2 | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 | Color filter 5 | Color filter 7 | Color filter 9 |
| VHR | 98.4 | 98.4 | 97.6 | 97.7 | 97.1 | 98.2 | 97.8 |
| ID | 144 | 140 | 182 | 182 | 183 | 216 | 179 |
| Screen burn-in | Bad | Bad | Poor | Poor | Poor | Poor | Poor |

TABLE 45

|  | Comparative Example 15 | Comparative Example 16 | Comparative Example 17 | Comparative Example 18 | Comparative Example 19 | Comparative Example 20 | Comparative Example 21 |
|---|---|---|---|---|---|---|---|
| Liquid crystal composition | Comparative liquid crystal composition 3 | Comparative liquid crystal composition 3 | Comparative liquid crystal composition 3 | Comparative liquid crystal composition 3 | Comparative liquid crystal composition 3 | Comparative liquid crystal composition 3 | Comparative liquid crystal composition 3 |
| Color filter | Color filter 1 | Color filter 2 | Color filter 3 | Color filter 4 | Color filter 5 | Color filter 7 | Color filter 9 |
| VHR | 98.1 | 98.4 | 97.5 | 97.4 | 97.3 | 98.0 | 97.8 |
| ID | 145 | 137 | 186 | 189 | 189 | 152 | 165 |
| Screen burn-in | Bad | Bad | Poor | Poor | Poor | Poor | Poor |

Each of the liquid crystal display devices of Comparative Examples 1 to 21 had a lower VHR and larger ID than the liquid crystal display device of the present invention. Moreover, in the evaluation of screen burn-in, an unacceptable degree of afterimage was observed.

Comparative Examples 22 to 42

As in Example 1, comparative liquid crystal compositions shown in Table 46 were individually placed between the substrates; the color filters 1 to 5, 7, and 9 shown in Table 1 were used to produce liquid crystal display devices of Comparative Examples 22 to 42; and the VHRs and ID thereof were measured. The liquid crystal display devices were subjected to the evaluation of screen burn-in. Tables 47 to 49 show results of the measurement and evaluation.

TABLE 46

| Comparative liquid crystal composition 4 | | Comparative liquid crystal composition 5 | | Comparative liquid crystal composition 6 | |
|---|---|---|---|---|---|
| $T_{NI}/°$ C. | 73.6 | $T_{NI}/°$ C. | 80.9 | $T_{NI}/°$ C. | 84.7 |
| $\Delta n$ | 0.099 | $\Delta n$ | 0.094 | $\Delta n$ | 0.085 |
| $\Delta \varepsilon$ | −2.15 | $\Delta \varepsilon$ | −2.16 | $\Delta \varepsilon$ | −2.13 |
| $\eta$/mPa · s | 17.7 | $\eta$/mPa · s | 17.0 | $\eta$/mPa · s | 17.5 |
| $\gamma_1$/mPa · s | 104 | $\gamma_1$/mPa · s | 97 | $\gamma_1$/mPa · s | 98 |
| $\gamma_1/\Delta n^2 \times 10^{-2}$ | 106 | $\gamma_1/\Delta n^2 \times 10^{-2}$ | 109 | $\gamma_1/\Delta n^2 \times 10^{-2}$ | 136 |
| 3-Cy-Cy-2 | 20% | 3-Cy-Cy-2 | 24% | 3-Cy-Cy-2 | 21% |
| 3-Cy-Cy-4 | 12% | 3-Cy-Cy-4 | 12% | 3-Cy-Cy-4 | 15% |
| 3-Cy-Cy-5 | 7% | 3-Cy-Cy-5 | 15% | 3-Cy-Cy-5 | 15% |
| 3-Cy-Ph-O1 | 12% | 3-Cy-Ph5-O2 | 5% | 3-Cy-Ph5-O2 | 5% |
| 3-Cy-Ph5-O2 | 5% | 3-Cy-Ph5-O4 | 5% | 3-Cy-Ph5-O4 | 5% |
| 3-Cy-Ph5-O4 | 5% | 2-Cy-Ph-Ph5-O2 | 11% | 2-Cy-Ph-Ph5-O2 | 4% |
| 2-Cy-Ph-Ph5-O2 | 11% | 3-Cy-Ph-Ph5-O2 | 11% | 3-Cy-Ph-Ph5-O2 | 5% |
| 3-Cy-Ph-Ph5-O2 | 11% | 3-Cy-Cy-Ph5-O3 | 3% | 3-Cy-Cy-Ph5-O3 | 7% |
| 3-Cy-Cy-Ph5-O3 | 3% | 4-Cy-Cy-Ph5-O2 | 3% | 4-Cy-Cy-Ph5-O2 | 8% |
| 4-Cy-Cy-Ph5-O2 | 3% | 5-Cy-Cy-Ph5-O2 | 3% | 5-Cy-Cy-Ph5-O2 | 7% |
| 5-Cy-Cy-Ph5-O2 | 3% | 3-Ph-Ph5-Ph-2 | 4% | 3-Ph-Ph5-Ph-2 | 4% |
| 3-Ph-Ph5-Ph-2 | 4% | 4-Ph-Ph5-Ph-2 | 4% | 4-Ph-Ph5-Ph-2 | 4% |
| 4-Ph-Ph5-Ph-2 | 4% | | | | |

TABLE 47

|  | Comparative Example 22 | Comparative Example 23 | Comparative Example 24 | Comparative Example 25 | Comparative Example 26 | Comparative Example 27 | Comparative Example 28 |
|---|---|---|---|---|---|---|---|
| Liquid crystal composition | Comparative liquid crystal composition 4 | Comparative liquid crystal composition 4 | Comparative liquid crystal composition 4 | Comparative liquid crystal composition 4 | Comparative liquid crystal composition 4 | Comparative liquid crystal composition 4 | Comparative liquid crystal composition 4 |
| Color filter | Color filter 1 | Color filter 2 | Color filter 3 | Color filter 4 | Color filter 5 | Color filter 7 | Color filter 9 |
| VHR | 98.1 | 98.3 | 97.5 | 97.5 | 97.2 | 97.8 | 97.7 |
| ID | 161 | 146 | 177 | 176 | 208 | 169 | 170 |
| Screen burn-in | Poor | Bad | Poor | Poor | Poor | Poor | Poor |

TABLE 48

|  | Comparative Example 29 | Comparative Example 30 | Comparative Example 31 | Comparative Example 32 | Comparative Example 33 | Comparative Example 34 | Comparative Example 35 |
| --- | --- | --- | --- | --- | --- | --- | --- |
| Liquid crystal composition | Comparative liquid crystal composition 5 | Comparative liquid crystal composition 5 | Comparative liquid crystal composition 5 | Comparative liquid crystal composition 5 | Comparative liquid crystal composition 5 | Comparative liquid crystal composition 5 | Comparative liquid crystal composition 5 |
| Color filter | Color filter 1 | Color filter 2 | Color filter 3 | Color filter 4 | Color filter 5 | Color filter 7 | Color filter 9 |
| VHR | 98.3 | 98.5 | 97.7 | 97.8 | 97.4 | 98.2 | 98.0 |
| ID | 152 | 133 | 183 | 180 | 212 | 160 | 174 |
| Screen burn-in | Bad | Bad | Poor | Poor | Poor | Poor | Poor |

TABLE 49

|  | Comparative Example 36 | Comparative Example 37 | Comparative Example 38 | Comparative Example 39 | Comparative Example 40 | Comparative Example 41 | Comparative Example 42 |
| --- | --- | --- | --- | --- | --- | --- | --- |
| Liquid crystal composition | Comparative liquid crystal composition 6 | Comparative liquid crystal composition 6 | Comparative liquid crystal composition 6 | Comparative liquid crystal composition 6 | Comparative liquid crystal composition 6 | Comparative liquid crystal composition 6 | Comparative liquid crystal composition 6 |
| Color filter | Color filter 1 | Color filter 2 | Color filter 3 | Color filter 4 | Color filter 5 | Color filter 7 | Color filter 9 |
| VH R | 98.3 | 98.5 | 97.6 | 97.6 | 97.2 | 98.0 | 98.0 |
| ID | 138 | 129 | 179 | 180 | 218 | 166 | 172 |
| Screen burn-in | Bad | Bad | Poor | Poor | Poor | Poor | Poor |

Each of the liquid crystal display devices of Comparative Examples 22 to 42 had a lower VHR and larger ID than the liquid crystal display device of the present invention. Moreover, in the evaluation of screen burn-in, an unacceptable degree of afterimage was observed.

Comparative Examples 43 to 63

As in Example 1, comparative liquid crystal compositions shown in Table 50 were individually placed between the substrates; the color filters 1 to 5, 7, and 9 shown in Table 1 were used to produce liquid crystal display devices of Comparative Examples 43 to 63; and the VHRs and ID thereof were measured. The liquid crystal display devices were subjected to the evaluation of screen burn-in. Tables 51 to 53 show results of the measurement and evaluation.

TABLE 50

| Comparative liquid crystal composition 7 | | Comparative liquid crystal composition 8 | | Comparative liquid crystal composition 9 | |
| --- | --- | --- | --- | --- | --- |
| $T_{NI}/°$ C. | 77.1 | $T_{NI}/°$ C. | 80.8 | $T_{NI}/°$ C. | 86.3 |
| $\Delta n$ | 0.109 | $\Delta n$ | 0.108 | $\Delta n$ | 0.107 |
| $\Delta \varepsilon$ | -2.10 | $\Delta \varepsilon$ | -2.20 | $\Delta \varepsilon$ | -2.27 |
| $\eta$/mPa · s | 21.6 | $\eta$/mPa · s | 22.1 | $\eta$/mPa · s | 22.3 |
| $\gamma_1$/mPa · s | 130 | $\gamma_1$/mPa · s | 133 | $\gamma_1$/mPa · s | 134 |
| $\gamma_1/\Delta n^2 \times 10^{-2}$ | 109 | $\gamma_1/\Delta n^2 \times 10^{-2}$ | 114 | $\gamma_1/\Delta n^2 \times 10^{-2}$ | 118 |
| 3-Cy-Cy-2 | 24% | 3-Cy-Cy-2 | 24% | 3-Cy-Cy-2 | 24% |
| 3-Cy-Cy-4 | 7% | 3-Cy-Cy-4 | 7% | 3-Cy-Cy-4 | 7% |
| 3-Cy-Ph-O1 | 5% | 3-Cy-Ph-O1 | 5% | 3-Cy-Ph-O1 | 5% |
| 2-Cy-Ph5-O2 | 2% | 2-Cy-Ph5-O2 | 2% | 2-Cy-Ph5-O2 | 2% |
| 3-Cy-Ph5-O4 | 2% | 3-Cy-Ph5-O4 | 2% | 3-Cy-Ph5-O4 | 2% |
| 2-Cy-Ph-Ph5-O2 | 8% | 2-Cy-Ph-Ph5-O2 | 8% | 2-Cy-Ph-Ph5-O2 | 8% |
| 3-Cy-Ph-Ph5-O2 | 8% | 3-Cy-Ph-Ph5-O2 | 8% | 3-Cy-Ph-Ph5-O2 | 8% |
| 3-Cy-Cy-Ph5-O3 | 7% | 3-Cy-Cy-Ph5-O3 | 8% | 3-Cy-Cy-Ph5-O3 | 8% |
| 4-Cy-Cy-Ph5-O2 | 9% | 4-Cy-Cy-Ph5-O2 | 8% | 4-Cy-Cy-Ph5-O2 | 8% |
| 5-Cy-Cy-Ph5-O2 | 7% | 5-Cy-Cy-Ph5-O2 | 8% | 5-Cy-Cy-Ph5-O2 | 8% |
| 3-Ph-Ph5-Ph2 | 4% | 3-Ph-Ph5-Ph-2 | 4% | 3-Ph-Ph5-Ph-2 | 4% |
| 4-Ph-Ph5-Ph-2 | 4% | 4-Ph-Ph5-Ph-2 | 4% | 4-Ph-Ph5-Ph-2 | 4% |
| 5-Ph-Ph-1 | 13% | 5-Ph-Ph-1 | 11% | 5-Ph-Ph-1 | 8% |
|  |  | 3-Cy-Cy-Ph-1 | 1% | 3-Cy-Cy-Ph-1 | 4% |

TABLE 51

|  | Comparative Example 43 | Comparative Example 44 | Comparative Example 45 | Comparative Example 46 | Comparative Example 47 | Comparative Example 48 | Comparative Example 49 |
|---|---|---|---|---|---|---|---|
| Liquid crystal composition | Comparative liquid crystal composition 7 | Comparative liquid crystal composition 7 | Comparative liquid crystal composition 7 | Comparative liquid crystal composition 7 | Comparative liquid crystal composition 7 | Comparative liquid crystal composition 7 | Comparative liquid crystal composition 7 |
| Color filter | Color filter 1 | Color filter 2 | Color filter 3 | Color filter 4 | Color filter 5 | Color filter 7 | Color filter 9 |
| VHR | 98.2 | 98.4 | 97.6 | 97.6 | 97.3 | 98.0 | 97.7 |
| ID | 145 | 139 | 175 | 178 | 224 | 154 | 161 |
| Screen burn-in | Bad | Bad | Poor | Poor | Poor | Poor | Poor |

TABLE 52

|  | Comparative Example 50 | Comparative Example 51 | Comparative Example 52 | Comparative Example 53 | Comparative Example 54 | Comparative Example 55 | Comparative Example 56 |
|---|---|---|---|---|---|---|---|
| Liquid crystal composition | Comparative liquid crystal composition 8 | Comparative liquid crystal composition 8 | Comparative liquid crystal composition 8 | Comparative liquid crystal composition 8 | Comparative liquid crystal composition 8 | Comparative liquid crystal composition 8 | Comparative liquid crystal composition 8 |
| Color filter | Color filter 1 | Color filter 2 | Color filter 3 | Color filter 4 | Color filter 5 | Color filter 7 | Color filter 9 |
| VHR | 98.4 | 98.6 | 97.5 | 97.6 | 97.3 | 98.1 | 97.9 |
| ID | 133 | 129 | 170 | 174 | 224 | 151 | 163 |
| Screen burn-in | Poor | Bad | Poor | Poor | Poor | Poor | Poor |

TABLE 53

|  | Comparative Example 57 | Comparative Example 58 | Comparative Example 59 | Comparative Example 60 | Comparative Example 61 | Comparative Example 62 | Comparative Example 63 |
|---|---|---|---|---|---|---|---|
| Liquid crystal composition | Comparative liquid crystal composition 9 | Comparative liquid crystal composition 9 | Comparative liquid crystal composition 9 | Comparative liquid crystal composition 9 | Comparative liquid crystal composition 9 | Comparative liquid crystal composition 9 | Comparative liquid crystal composition 9 |
| Color filter | Color filter 1 | Color filter 2 | Color filter 3 | Color filter 4 | Color filter 5 | Color filter 7 | Color filter 9 |
| VHR | 98.3 | 98.4 | 97.7 | 97.7 | 97.1 | 98.0 | 97.8 |
| ID | 153 | 144 | 181 | 184 | 229 | 172 | 176 |
| Screen burn-in | Poor | Poor | Poor | Poor | Poor | Poor | Poor |

Each of the liquid crystal display devices of Comparative Examples 43 to 63 had a lower VHR and larger ID than the liquid crystal display device of the present invention. Moreover, in the evaluation of screen burn-in, an unacceptable degree of afterimage was observed.

Comparative Examples 64 to 77

As in Example 1, comparative liquid crystal compositions shown in Table 54 were individually placed between the substrates; the color filters 1 to 5, 7, and 9 shown in Table 1 were used to produce liquid crystal display devices of Comparative Examples 64 to 77; and the VHRs and ID thereof were measured. The liquid crystal display devices were subjected to the evaluation of screen burn-in. Tables 55 and 56 show results of the measurement and evaluation.

TABLE 54

| Comparative liquid crystal composition 10 | | Comparative liquid crystal composition 11 | |
|---|---|---|---|
| $T_{NI}/°C.$ | 62.2 | $T_{NI}/°C.$ | 72.4 |
| $\Delta n$ | 0.087 | $\Delta n$ | 0.088 |

TABLE 54-continued

| Comparative liquid crystal composition 10 | | Comparative liquid crystal composition 11 | |
|---|---|---|---|
| $\Delta\varepsilon$ | −4.1 | $\Delta\varepsilon$ | −4.2 |
| $\eta/mPa \cdot s$ | 21.3 | $\eta/mPa \cdot s$ | 23.8 |
| $\gamma_1/mPa \cdot s$ | 97 | $\gamma_1/mPa \cdot s$ | 106 |
| $\gamma_1/\Delta n^2 \times 10^{-2}$ | 129 | $\gamma_1/\Delta n^2 \times 10^{-2}$ | 138 |
| 3-Cy-Cy-2 | 12% | 3-Cy-Cy-4 | 20% |
| 3-Cy-Cy-4 | 12% | 3-Cy-Cy-5 | 15% |
| 3-Cy-Cy-5 | 5% | 2-Cy-Ph5-O2 | 16% |
| 3-Cy-Ph-O1 | 6% | 3-Cy-Ph5-O4 | 16% |
| 2-Cy-Ph5-O2 | 16% | 2-Cy-Ph-Ph5-O2 | 7% |
| 3-Cy-Ph5-O4 | 16% | 3-Cy-Ph-Ph5-O2 | 8% |
| 2-Cy-Ph-Ph5-O2 | 7% | 3-Cy-Cy-Ph5-O3 | 5% |
| 3-Cy-Ph-Ph5-O2 | 8% | 4-Cy-Cy-Ph5-O2 | 5% |
| 3-Cy-Cy-Ph5-O3 | 5% | 5-Cy-Cy-Ph5-O2 | 5% |
| 4-Cy-Cy-Ph5-O2 | 5% | 3-Cy-Cy-Ph-1 | 3% |
| 5-Cy-Cy-Ph5-O2 | 5% | | |
| 3-Cy-Cy-Ph-1 | 3% | | |

TABLE 55

|  | Comparative Example 64 | Comparative Example 65 | Comparative Example 66 | Comparative Example 67 | Comparative Example 68 | Comparative Example 69 | Comparative Example 70 |
| --- | --- | --- | --- | --- | --- | --- | --- |
| Liquid crystal composition | Comparative liquid crystal composition 10 | Comparative liquid crystal composition 10 | Comparative liquid crystal composition 10 | Comparative liquid crystal composition 10 | Comparative liquid crystal composition 10 | Comparative liquid crystal composition 10 | Comparative liquid crystal composition 10 |
| Color filter | Color filter 1 | Color filter 2 | Color filter 3 | Color filter 4 | Color filter 5 | Color filter 7 | Color filter 9 |
| VHR | 98.5 | 98.6 | 97.6 | 97.5 | 97.3 | 98.3 | 98.1 |
| ID | 136 | 128 | 174 | 174 | 212 | 148 | 150 |
| Screen burn-in | Bad | Bad | Poor | Poor | Poor | Poor | Poor |

TABLE 56

|  | Comparative Example 71 | Comparative Example 72 | Comparative Example 73 | Comparative Example 74 | Comparative Example 75 | Comparative Example 76 | Comparative Example 77 |
| --- | --- | --- | --- | --- | --- | --- | --- |
| Liquid crystal composition | Comparative liquid crystal composition 11 | Comparative liquid crystal composition 11 | Comparative liquid crystal composition 11 | Comparative liquid crystal composition 11 | Comparative liquid crystal composition 11 | Comparative liquid crystal composition 11 | Comparative liquid crystal composition 11 |
| Color filter | Color filter 1 | Color filter 2 | Color filter 3 | Color filter 4 | Color filter 5 | Color filter 7 | Color filter 9 |
| VHR | 98.2 | 98.3 | 97.5 | 97.5 | 97.0 | 97.9 | 97.8 |
| ID | 156 | 149 | 187 | 190 | 234 | 173 | 175 |
| Screen burn-in | Poor | Poor | Poor | Poor | Poor | Poor | Poor |

Each of the liquid crystal display devices of Comparative Examples 64 to 77 had a lower VHR and larger ID than the liquid crystal display device of the present invention. Moreover, in the evaluation of screen burn-in, an unacceptable degree of afterimage was observed.

Comparative Examples 78 to 98

As in Example 1, comparative liquid crystal compositions shown in Table 57 were individually placed between the substrates; the color filters 1 to 5, 7, and 9 shown in Table 1 were used to produce liquid crystal display devices of Comparative Examples 78 to 98; and the VHRs and ID thereof were measured. The liquid crystal display devices were subjected to the evaluation of screen burn-in. Tables 58 to 60 show results of the measurement and evaluation.

TABLE 57

| Comparative liquid crystal composition 12 | | Comparative liquid crystal composition 13 | | Comparative liquid crystal composition 14 | |
| --- | --- | --- | --- | --- | --- |
| $T_{NI}/°C$ | 74.9 | $T_{NI}/°C$ | 79.6 | $T_{NI}/°C$ | 85.4 |
| $\Delta n$ | 0.103 | $\Delta n$ | 0.104 | $\Delta n$ | 0.107 |
| $\Delta \varepsilon$ | −2.34 | $\Delta \varepsilon$ | −2.39 | $\Delta \varepsilon$ | −2.46 |
| $\eta/mPa \cdot s$ | 18.4 | $\eta/mPa \cdot s$ | 18.9 | $\eta/mPa \cdot s$ | 20.0 |
| $\gamma_1/mPa \cdot s$ | 106 | $\gamma_1/mPa \cdot s$ | 108 | $\gamma_1/mPa \cdot s$ | 114 |
| $\gamma_1/\Delta n^2 \times 10^{-2}$ | 99 | $\gamma_1/\Delta n^2 \times 10^{-2}$ | 99 | $\gamma_1/\Delta n^2 \times 10^{-2}$ | 99 |
| 3-Cy-Cy-2 | 20% | 3-Cy-Cy-2 | 20% | 3-Cy-Cy-2 | 18% |
| 3-Cy-Cy-4 | 12% | 3-Cy-Cy-4 | 12% | 3-Cy-Cy-4 | 12% |
| 3-Cy-Cy-5 | 5% | 3-Cy-Cy-5 | 5% | 3-Cy-Cy-5 | 5% |
| 3-Cy-Ph-O1 | 5% | 3-Cy-Ph-O1 | 2% | 2-Cy-Ph5-O2 | 7% |
| 2-Cy-Ph5-O2 | 7% | 2-Cy-Ph5-O2 | 7% | 3-Cy-Ph5-O4 | 8% |
| 3-Cy-Ph5-O4 | 8% | 3-Cy-Ph5-O4 | 8% | 2-Cy-Ph-Ph5-O2 | 6% |
| 2-Cy-Ph-Ph5-O2 | 6% | 2-Cy-Ph-Ph5-O2 | 6% | 3-Cy-Ph-Ph5-O2 | 6% |
| 3-Cy-Ph-Ph5-O2 | 6% | 3-Cy-Ph-Ph5-O2 | 6% | 3-Cy-Cy-Ph5-O3 | 4% |
| 3-Cy-Cy-Ph5-O3 | 4% | 3-Cy-Cy-Ph5-O3 | 4% | 4-Cy-Cy-Ph5-O2 | 4% |
| 4-Cy-Cy-Ph5-O2 | 4% | 4-Cy-Cy-Ph5-O2 | 4% | 5-Cy-Cy-Ph5-O2 | 4% |
| 5-Cy-Cy-Ph5-O2 | 4% | 5-Cy-Cy-Ph5-O2 | 4% | 3-Ph-Ph5-Ph-2 | 7% |
| 3-Ph-Ph5-Ph-2 | 7% | 3-Ph-Ph5-Ph-2 | 7% | 4-Ph-Ph5-Ph-2 | 8% |
| 4-Ph-Ph5-Ph-2 | 8% | 4-Ph-Ph5-Ph-2 | 8% | 3-Cy-Cy-Ph-1 | 11% |
| 3-Cy-Cy-Ph-1 | 4% | 3-Cy-Cy-Ph-1 | 7% | | |

TABLE 58

| | Comparative Example 78 | Comparative Example 79 | Comparative Example 80 | Comparative Example 81 | Comparative Example 82 | Comparative Example 83 | Comparative Example 84 |
|---|---|---|---|---|---|---|---|
| Liquid crystal composition | Comparative liquid crystal composition 12 | Comparative liquid crystal composition 12 | Comparative liquid crystal composition 12 | Comparative liquid crystal composition 12 | Comparative liquid crystal composition 12 | Comparative liquid crystal composition 12 | Comparative liquid crystal composition 12 |
| Color filter | Color filter 1 | Color filter 2 | Color filter 3 | Color filter 4 | Color filter 5 | Color filter 7 | Color filter 9 |
| VHR | 98.2 | 98.4 | 97.7 | 97.6 | 97.2 | 98.1 | 97.9 |
| ID | 159 | 142 | 183 | 180 | 211 | 164 | 173 |
| Screen burn-in | Poor | Bad | Poor | Poor | Poor | Poor | Poor |

TABLE 59

| | Comparative Example 85 | Comparative Example 86 | Comparative Example 87 | Comparative Example 88 | Comparative Example 89 | Comparative Example 90 | Comparative Example 91 |
|---|---|---|---|---|---|---|---|
| Liquid crystal composition | Comparative liquid crystal composition 13 | Comparative liquid crystal composition 13 | Comparative liquid crystal composition 13 | Comparative liquid crystal composition 13 | Comparative liquid crystal composition 13 | Comparative liquid crystal composition 13 | Comparative liquid crystal composition 13 |
| Color filter | Color filter 1 | Color filter 2 | Color filter 3 | Color filter 4 | Color filter 5 | Color filter 7 | Color filter 9 |
| VHR | 98.2 | 98.3 | 97.5 | 97.5 | 97.0 | 97.9 | 97.8 |
| ID | 162 | 151 | 194 | 193 | 235 | 178 | 184 |
| Screen burn-in | Poor | Poor | Poor | Poor | Poor | Poor | Poor |

TABLE 60

| | Comparative Example 92 | Comparative Example 93 | Comparative Example 94 | Comparative Example 95 | Comparative Example 96 | Comparative Example 97 | Comparative Example 98 |
|---|---|---|---|---|---|---|---|
| Liquid crystal composition | Comparative liquid crystal composition 14 | Comparative liquid crystal composition 14 | Comparative liquid crystal composition 14 | Comparative liquid crystal composition 14 | Comparative liquid crystal composition 14 | Comparative liquid crystal composition 14 | Comparative liquid crystal composition 14 |
| Color filter | Color filter 1 | Color filter 2 | Color filter 3 | Color filter 4 | Color filter 5 | Color filter 7 | Color filter 9 |
| VHR | 98.3 | 98.4 | 97.8 | 97.7 | 97.3 | 98.2 | 98.0 |
| ID | 155 | 140 | 185 | 189 | 217 | 162 | 178 |
| Screen burn-in | Poor | Bad | Poor | Poor | Poor | Poor | Poor |

Each of the liquid crystal display devices of Comparative Examples 78 to 98 had a lower VHR and larger ID than the liquid crystal display device of the present invention. Furthermore, in the evaluation of screen burn-in, an unacceptable degree of afterimage was observed.

Comparative Examples 99 to 105

As in Example 1, a comparative liquid crystal composition shown in Table 61 was placed between the substrates; the color filters 1 to 5, 7, and 9 shown in Table 1 were used to produce liquid crystal display devices of Comparative Examples 99 to 105; and the VHRs and ID thereof were measured. The liquid crystal display devices were subjected to the evaluation of screen burn-in. Table 62 shows results of the measurement and evaluation.

TABLE 61

| Comparative liquid crystal composition 15 | |
|---|---|
| $T_{NI}/°C$ | 86.3 |
| $\Delta n$ | 0.105 |
| $\Delta \varepsilon$ | -3.41 |
| $\eta/mPa \cdot s$ | 26.4 |
| $\gamma_1/mPa \cdot s$ | 149 |
| $\gamma_1/\Delta n^2 \times 10^{-2}$ | 135 |
| 3-Cy-Cy-2 | 24% |
| 3-Cy-Ph-O1 | 11% |
| 2-Cy-Ph5-O2 | 10% |
| 2-Cy-Ph-Ph5-O2 | 7% |
| 3-Cy-Ph-Ph5-O2 | 9% |
| 3-Cy-Cy-Ph5-O3 | 10% |
| 4-Cy-Cy-Ph5-O2 | 10% |
| 5-Cy-Cy-Ph5-O2 | 10% |
| 3-Ph-Ph5-Ph-2 | 4% |
| 4-Ph-Ph5-Ph-2 | 4% |
| 5-Ph-Ph-1 | 1% |

TABLE 62

|  | Comparative Example 99 | Comparative Example 100 | Comparative Example 101 | Comparative Example 102 | Comparative Example 103 | Comparative Example 104 | Comparative Example 105 |
|---|---|---|---|---|---|---|---|
| Liquid crystal composition | Comparative liquid crystal composition 15 | Comparative liquid crystal composition 15 | Comparative liquid crystal composition 15 | Comparative liquid crystal composition 15 | Comparative liquid crystal composition 15 | Comparative liquid crystal composition 15 | Comparative liquid crystal composition 15 |
| Color filter | Color filter 1 | Color filter 2 | Color filter 3 | Color filter 4 | Color filter 5 | Color filter 7 | Color filter 9 |
| VHR | 98.4 | 98.5 | 97.8 | 97.7 | 97.4 | 98.3 | 98.1 |
| ID | 142 | 132 | 175 | 178 | 199 | 150 | 169 |
| Screen burn-in | Bad | Bad | Poor | Poor | Poor | Poor | Poor |

Each of the liquid crystal display devices of Comparative Examples 99 to 105 had a lower VHR and larger ID than the liquid crystal display device of the present invention. Furthermore, in the evaluation of screen burn-in, an unacceptable degree of afterimage was observed.

Comparative Examples 106 to 129

The liquid crystal compositions 1, 2, 8, 13, 14, 19, 20, and 26 were individually placed in the VA cell used in Example 1; the color filters 6, 8, and 10 shown in Table 1 were used to produce liquid crystal display devices of Comparative Examples 106 to 129; and the VHRs and ID thereof were measured. The liquid crystal display devices were subjected to the evaluation of screen burn-in. Tables 63 to 65 show results of the measurement and evaluation.

TABLE 63

|  | Comparative Example 106 | Comparative Example 107 | Comparative Example 108 | Comparative Example 109 | Comparative Example 110 | Comparative Example 111 | Comparative Example 112 | Comparative Example 113 |
|---|---|---|---|---|---|---|---|---|
| Liquid crystal composition | Liquid crystal composition 1 | Liquid crystal composition 2 | Liquid crystal composition 8 | Liquid crystal composition 13 | Liquid crystal composition 14 | Liquid crystal composition 19 | Liquid crystal composition 20 | Liquid crystal composition 26 |
| Color filter | Color filter 6 | Color filter 6 | Color filter 6 | Color filter 6 | Color filter 6 | Color filter 6 | Color filter 6 | Color filter 6 |
| VHR | 98.1 | 98.4 | 98.3 | 98.0 | 98.2 | 98.1 | 98.0 | 97.9 |
| ID | 160 | 162 | 165 | 175 | 154 | 161 | 166 | 176 |
| Screen burn-in | Poor | Poor | Poor | Poor | Poor | Poor | Poor | Poor |

TABLE 64

|  | Comparative Example 114 | Comparative Example 115 | Comparative Example 116 | Comparative Example 117 | Comparative Example 118 | Comparative Example 119 | Comparative Example 120 | Comparative Example 121 |
|---|---|---|---|---|---|---|---|---|
| Liquid crystal composition | Liquid crystal composition 1 | Liquid crystal composition 2 | Liquid crystal composition 8 | Liquid crystal composition 13 | Liquid crystal composition 14 | Liquid crystal composition 19 | Liquid crystal composition 20 | Liquid crystal composition 26 |
| Color filter | Color filter 8 | Color filter 8 | Color filter 8 | Color filter 8 | Color filter 8 | Color filter 8 | Color filter 8 | Color filter 8 |
| VHR | 98.2 | 98.3 | 98.3 | 98.1 | 98.2 | 98.2 | 98.0 | 98.0 |
| ID | 155 | 157 | 160 | 167 | 149 | 153 | 162 | 172 |
| Screen burn-in | Poor | Poor | Poor | Poor | Bad | Bad | Poor | Poor |

TABLE 65

|  | Comparative Example 122 | Comparative Example 123 | Comparative Example 124 | Comparative Example 125 | Comparative Example 126 | Comparative Example 127 | Comparative Example 128 | Comparative Example 129 |
| --- | --- | --- | --- | --- | --- | --- | --- | --- |
| Liquid crystal composition | Liquid crystal composition 1 | Liquid crystal composition 2 | Liquid crystal composition 8 | Liquid crystal composition 13 | Liquid crystal composition 14 | Liquid crystal composition 19 | Liquid crystal composition 20 | Liquid crystal composition 26 |
| Color filter | Color filter 10 | Color filter 10 | Color filter 10 | Color filter 10 | Color filter 10 | Color filter 10 | Color filter 10 | Color filter 10 |
| VHR | 97.8 | 98.6 | 98.0 | 97.9 | 98.0 | 98.0 | 97.8 | 97.9 |
| ID | 187 | 179 | 172 | 181 | 174 | 177 | 178 | 180 |
| Screen burn-in | Poor | Poor | Poor | Poor | Poor | Poor | Poor | Poor |

Each of the liquid crystal display devices of Comparative Examples 106 to 129 had a lower VHR and larger ID than the liquid crystal display device of the present invention. Moreover, in the evaluation of screen burn-in, an unacceptable degree of afterimage was observed.

Examples 211 to 231

As in Example 1, liquid crystal compositions shown in Table 66 were individually placed between the substrates; the color filters 1 to 5, 7, and 9 shown in Table 1 were used to produce liquid crystal display devices of Examples 211 to 231; and the VHRs and ID thereof were measured. The liquid crystal display devices were subjected to the evaluation of screen burn-in. Tables 67 to 69 show results of the measurement and evaluation.

TABLE 66

| Liquid crystal composition 31 | | Liquid crystal composition 32 | | Liquid crystal composition 33 | |
| --- | --- | --- | --- | --- | --- |
| TNI/° C. | 75.5 | TNI/° C. | 75.4 | TNI/° C. | 83.1 |
| Δn | 0.103 | Δn | 0.109 | Δn | 0.114 |
| Δε | −3.1 | Δε | −3.1 | Δε | −2.9 |
| η/mPa · s | 15.8 | η/mPa · s | 14.9 | η/mPa · s | 14.8 |
| γ1/mPa · s | 113 | γ1/mPa · s | 110 | γ1/mPa · s | 92 |
| γ1/Δn2 × 10−2 | 113 | γ1/Δn2 × 10−2 | 92 | γ1/Δn2 × 10−2 | 71 |
| 3-Cy-Cy-2 | 13% | 2-Cy-Cy-V1 | 20% | V2-Ph-Ph-1 | 5% |
| 3-Cy-Cy-V1 | 12% | 3-Cy-Cy-V1 | 13% | 3-Cy-Cy-V | 39% |
| 3-Cy-Cy-4 | 5% | 3-Ph-Ph-1 | 10% | 3-Cy-1O-Ph5-O2 | 5% |
| 3-Ph-Ph-1 | 3% | 5-Ph-Ph-1 | 5% | 2-Cy-Cy-1O-Ph5-O2 | 11% |
| 5-Ph-Ph-1 | 12% | 3-Cy-Ph-Ph-2 | 6% | 3-Cy-Cy-1O-Ph5-O1 | 11% |
| 3-Cy-Cy-Ph-1 | 3% | 1V-Cy-1O-Ph5-O2 | 8% | 3-Cy-Cy-1O-Ph5-O2 | 6% |
| V-Cy-Ph-Ph-3 | 6% | 2-Cy-Cy-1O-Ph5-O2 | 10% | 2-Cy-Ph-Ph5-O2 | 6% |
| 3-Cy-1O-Ph5-O2 | 11% | 3-Cy-Cy-1O-Ph5-O2 | 10% | 3-Ph-Ph5-Ph-1 | 8% |
| 2-Cy-Cy-1O-Ph5-O2 | 12% | V-Cy-Cy-1O-Ph5-O2 | 10% | 3-Ph-Ph5-Ph-2 | 9% |
| 3-Cy-Cy-1O-Ph5-O2 | 12% | 1V-Cy-Cy-1O-Ph5-O2 | 4% | | |
| 4-Cy-Cy-1O-Ph5-O2 | 2% | 3-Ph-Ph5-Ph-2 | 4% | | |
| V-Cy-Cy-1O-Ph5-O2 | 3% | | | | |
| 1V-Cy-Cy-1O-Ph5-O2 | 6% | | | | |

TABLE 67

|  | Example 211 | Example 212 | Example 213 | Example 214 | Example 215 | Example 216 | Example 217 |
| --- | --- | --- | --- | --- | --- | --- | --- |
| Liquid crystal composition | Liquid crystal composition 31 | Liquid crystal composition 31 | Liquid crystal composition 31 | Liquid crystal composition 31 | Liquid crystal composition 31 | Liquid crystal composition 31 | Liquid crystal composition 31 |
| Color filter | Color filter 1 | Color filter 2 | Color filter 3 | Color filter 4 | Color filter 5 | Color filter 7 | Color filter 9 |
| VHR | 99.4 | 99.6 | 99.3 | 99.3 | 99.1 | 99.4 | 99.4 |
| ID | 32 | 17 | 47 | 43 | 74 | 33 | 37 |
| Screen burn-in | Excellent | Excellent | Excellent | Excellent | Good | Excellent | Excellent |

TABLE 68

|  | Example 218 Liquid crystal composition 32 | Example 219 Liquid crystal composition 32 | Example 220 Liquid crystal composition 32 | Example 221 Liquid crystal composition 32 | Example 222 Liquid crystal composition 32 | Example 223 Liquid crystal composition 32 | Example 224 Liquid crystal composition 32 |
|---|---|---|---|---|---|---|---|
| Liquid crystal composition | | | | | | | |
| Color filter | Color filter 1 | Color filter 2 | Color filter 3 | Color filter 4 | Color filter 5 | Color filter 7 | Color filter 9 |
| VHR | 99.5 | 99.5 | 99.3 | 99.3 | 99.0 | 99.5 | 99.4 |
| ID | 40 | 32 | 51 | 55 | 75 | 42 | 46 |
| Screen burn-in | Excellent | Excellent | Good | Good | Good | Excellent | Excellent |

TABLE 69

|  | Example 225 | Example 226 | Example 227 | Example 228 | Example 229 | Example 230 | Example 231 |
|---|---|---|---|---|---|---|---|
| Liquid crystal composition | Liquid crystal composition 33 | Liquid crystal composition 33 | Liquid crystal composition 33 | Liquid crystal composition 33 | Liquid crystal composition 33 | Liquid crystal composition 33 | Liquid crystal composition 33 |
| Color filter | Color filter 1 | Color filter 2 | Color filter 3 | Color filter 4 | Color filter 5 | Color filter 7 | Color filter 9 |
| VHR | 99.4 | 99.4 | 99.2 | 99.2 | 99.0 | 99.3 | 99.3 |
| ID | 37 | 34 | 48 | 51 | 72 | 40 | 44 |
| Screen burn-in | Excellent | Excellent | Excellent | Excellent | Good | Excellent | Excellent |

The liquid crystal display devices of Examples 211 to 231 each had a high VHR and small ID. Furthermore, in the evaluation of screen burn-in, no afterimage was observed, or an acceptable degree of slight afterimage was observed, if any.

Comparative Examples 232 to 238 and Examples 239 to 245

As in Example 1, liquid crystal compositions shown in Table 70 were individually placed between the substrates; the color filters 1 to 5, 7, and 9 shown in Table 1 were used to produce liquid crystal display devices of Comparative Examples 232 to 238 and Examples 239 to 245; and the VHRs and ID thereof were measured. The liquid crystal display devices were subjected to the evaluation of screen burn-in. Tables 71 and 72 show results of the measurement and evaluation.

TABLE 70

| Liquid crystal composition 34 | | Liquid crystal composition 35 | |
|---|---|---|---|
| TNI/° C. | 76.3 | TNI/° C. | 76.6 |
| $\Delta n$ | 0.106 | $\Delta n$ | 0.109 |
| $\Delta \varepsilon$ | −3.0 | $\Delta \varepsilon$ | −3.2 |
| $\eta$/mPa · s | 16.6 | $\eta$/mPa · s | 13.9 |
| $\gamma 1$/mPa · s | 106 | $\gamma 1$/mPa · s | 95 |
| $\gamma 1/\Delta n2 \times 10{-}2$ | 95 | $\gamma 1/\Delta n2 \times 10{-}2$ | 80 |
| 3-Cy-Cy-2 | 17% | 1V-Cy-1O-Ph5-O2 | 12% |
| 3-Cy-Ph-Ph-2 | 12% | 1V-Cy-Cy-1O-Ph5-O2 | 12% |
| 3-Cy-1O-Ph5-O1 | 11% | 3-Cy-1O-Ph5-O2 | 2% |
| 3-Cy-1O-Ph5-O2 | 17% | 2-Cy-Cy-1O-Ph5-O2 | 5% |
| 3-Nd-Ph5-Ph-2 | 4% | 3-Cy-Cy-1O-Ph5-O2 | 4% |
| 3-Cy-Cy-V | 5% | 3-Cy-Ph-Ph5-O2 | 4% |
| 3-Cy-Cy-V1 | 10% | 3-Cy-Cy-V | 38% |
| V-Cy-Ph-Ph-3 | 12% | 3-Cy-Cy-V1 | 3% |
| V-Cy-Cy-1O-Ph5-O3 | 12% | 3-Ph-Ph-1 | 3% |
| | | V2-Ph-Ph5-Ph-2V | 12% |
| | | 1V2-Ph-Ph5-Ph2-V1 | 5% |

TABLE 71

|  | Example 232 | Example 233 | Example 234 | Example 235 | Example 236 | Example 237 | Example 238 |
|---|---|---|---|---|---|---|---|
| Liquid crystal composition | Liquid crystal composition 34 | Liquid crystal composition 34 | Liquid crystal composition 34 | Liquid crystal composition 34 | Liquid crystal composition 34 | Liquid crystal composition 34 | Liquid crystal composition 34 |
| Color filter | Color filter 1 | Color filter 2 | Color filter 3 | Color filter 4 | Color filter 5 | Color filter 7 | Color filter 9 |
| VHR | 99.4 | 99.5 | 99.2 | 99.2 | 99.1 | 99.3 | 99.3 |
| ID | 29 | 25 | 49 | 45 | 69 | 36 | 39 |
| Screen burn-in | Excellent | Excellent | Good | Excellent | Good | Excellent | Excellent |

TABLE 72

| | Example 239 | Example 240 | Example 241 | Example 242 | Example 243 | Example 244 | Example 245 |
|---|---|---|---|---|---|---|---|
| Liquid crystal composition | Liquid crystal composition 35 | Liquid crystal composition 35 | Liquid crystal composition 35 | Liquid crystal composition 35 | Liquid crystal composition 35 | Liquid crystal composition 35 | Liquid crystal composition 35 |
| Color filter | Color filter 1 | Color filter 2 | Color filter 3 | Color filter 4 | Color filter 5 | Color filter 7 | Color filter 9 |
| VHR | 99.5 | 99.6 | 99.3 | 99.3 | 99.1 | 99.4 | 99.4 |
| ID | 25 | 19 | 48 | 49 | 70 | 33 | 41 |
| Screen burn-in | Excellent | Excellent | Excellent | Excellent | Good | Excellent | Excellent |

The liquid crystal display devices of Comparative Examples 232 to 238 and Examples 239 to 245 each had a high VHR and small ID. Furthermore, in the evaluation of screen burn-in, no afterimage was observed, or an acceptable degree of slight afterimage was observed, if any.

The invention claimed is:

1. A liquid crystal display device comprising a first substrate, a second substrate, a liquid crystal composition layer disposed between the first substrate and the second substrate, a color filter including a black matrix and at least RGB three-color pixels, a pixel electrode, and a common electrode, wherein
the liquid crystal composition layer contains a liquid crystal composition containing a compound represented by General Formula (I) in an amount of 30 to 50%

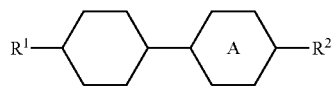

(I)

where $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; and A represents a 1,4-phenylene group or a trans-1,4-cyclohexylene group, a compound represented by General Formula (II-1) in an amount of 5 to 30%

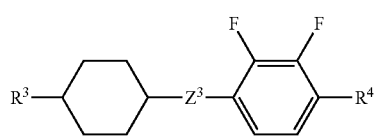

(II-1)

where $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; and $Z^3$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—, and a compound represented by General Formula (II-2) in an amount of 25 to 45%

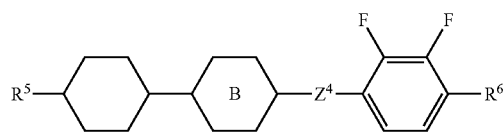

(II-2)

where $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or trans-1,4-cyclohexylene group which is optionally substituted with a fluorine atom; and $Z^4$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—; and
the color filter contains an organic pigment having a slope parameter of not more than 1.5, wherein
the slope parameter is calculated by submitting the organic pigment contained in the color filter to a scattering profile analysis including a step (A) of measuring the ultra-small angle X-ray profile of the organic pigment on the basis of ultra-small angle X-ray scattering, a step (B) of calculating a point of curvature on the scattering profile, a step (C) of calculating an analysis region (c1) determined from the point of curvature, and a step (D) of calculating a slope parameter in the analysis region c1, the slope parameter in the analysis region (c1) is not more than 1.5, having
wherein among the whole particles of the organic pigment contained in the color filter have a particle size ranging from 100 nm to 1000 nm and a volume fraction of not more than 7%.

2. The liquid crystal display device according to claim 1, wherein the organic pigment has a maximum light transmittance for light having a wavelength from 600 nm to 700 nm.

3. The liquid crystal display device according to claim 1, wherein the organic pigment has a maximum light transmittance for light having a wavelength from 500 nm to 600 nm.

4. The liquid crystal display device according to claim 1, wherein the organic pigment has a maximum light transmittance for light having a wavelength from 400 nm to 500 nm.

5. The liquid crystal display device according to claim 1, wherein the organic pigment is dispersed in a coating formed on a glass substrate.

6. The liquid crystal display device according to claim 1, wherein the liquid crystal composition layer further contains a compound represented by General Formula (III) in an amount of 3 to 35%

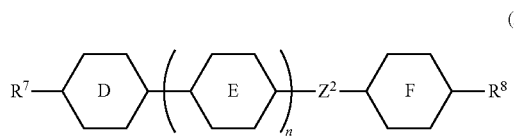
(III)

where $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; D, E, and F each independently represent a 1,4-phenylene group or trans-1,4-cyclohexylene which is optionally substituted with a fluorine atom; $Z^2$ represents a single bond, —OCH$_2$—, —OCO—, —CH$_2$O—, or —COO—; n represents 0, 1, or 2; and the compound represented by General Formula (III) excludes the compounds represented by General Formulae (I), (II-1), and (II-2).

7. The liquid crystal display device according to claim 1, wherein at least one compound represented by General Formula (I) in which A represents a trans-1,4-cyclohexylene group and at least one compound represented by General Formula (I) in which A represents a 1,4-phenylene group are used.

8. The liquid crystal display device according to claim 1, wherein at least one compound represented by General Formula (II-2) in which B represents a 1,4-phenylene group and at least one compound represented by General Formula (II-2) in which B represents a trans-1,4-cyclohexylene group are used.

9. The liquid crystal display device according to claim 6, wherein the amount of the compounds represented by General Formulae (II-1), (II-2), and (III) is in the range of 35 to 70%.

10. The liquid crystal display device according to claim 1, wherein in the liquid crystal composition contained in the liquid crystal composition layer, Z obtained from the below equation is not more than 13000

$$Z=\gamma 1/\Delta n^2$$

where γ1 represents rotational viscosity, and Δn represents refractive index anisotropy, γ1 is not more than 150, and Δn is in the range of 0.08 to 0.13.

11. The liquid crystal display device according to claim 1, wherein an upper limit of a temperature of a nematic liquid crystal phase of the liquid crystal composition contained in the liquid crystal composition layer is in a range of 60 to 120° C., a lower limit is not more than −20° C., and a difference between the upper limit and the lower limit is from 100 to 150.

12. The liquid crystal display device according to claim 1, wherein the liquid crystal composition contained in the liquid crystal composition layer has a specific resistance not less than $10^{12}$ (Ω·m).

13. The liquid crystal display device according to claim 1, wherein the liquid crystal composition layer is a polymer formed through polymerization of the liquid crystal composition further containing a polymerizable compound represented by General Formula (V)

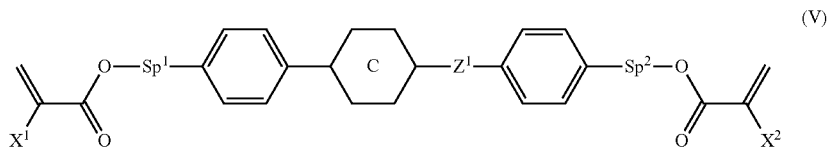
(V)

where $X^1$ and $X^2$ each independently represent a hydrogen atom or a methyl group; $Sp^1$ and $Sp^2$ each independently represent a single bond, an alkylene group having 1 to 8 carbon atoms, or —O—(CH$_2$)$_s$— where s represents an integer from 2 to 7, and the oxygen atom is bonded to an aromatic ring; $Z^1$ represents —OCH$_2$—, —CH$_2$O—, —COO—, —OCO—, —CH$_2$CH$_2$—, —CF$_2$CF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$═CY$^2$— where $Y^1$ and $Y^2$ each independently represent a fluorine atom or a hydrogen atom, —C≡C—, or a single bond; and C represents a 1,4-phenylene group, a trans-1,4-cyclohexylene group, or a single bond, and in each 1,4-phenylene group in the formula, any hydrogen atom is optionally substituted with a fluorine atom.

14. The liquid crystal display device according to claim 13, wherein in General Formula (V), C represents a single bond, and $Z^1$ represents a single bond.

* * * * *